US012300402B2

(12) United States Patent
Kusuma et al.

(10) Patent No.: US 12,300,402 B2
(45) Date of Patent: May 13, 2025

(54) SHIELD-SUPPORTING FILLER FOR DATA COMMUNICATIONS CABLES

(71) Applicant: Belden Inc., St. Louis, MO (US)

(72) Inventors: Roy Kusuma, Carmel, IN (US); William Thomas Clark, Richmond, IN (US)

(73) Assignee: Belden Inc., St. Louis, MO (US)

( * ) Notice: Subject to any disclaimer, the term of this patent is extended or adjusted under 35 U.S.C. 154(b) by 0 days.

(21) Appl. No.: 17/307,503

(22) Filed: May 4, 2021

(65) Prior Publication Data

US 2021/0350956 A1 Nov. 11, 2021

Related U.S. Application Data

(60) Provisional application No. 63/021,537, filed on May 7, 2020.

(51) Int. Cl.
*H01B 11/04* (2006.01)
*H01B 11/08* (2006.01)
*H01B 11/10* (2006.01)

(52) U.S. Cl.
CPC ....... *H01B 11/085* (2013.01); *H01B 11/1008* (2013.01)

(58) Field of Classification Search
CPC ....... H01B 11/04
USPC ....... 174/113 C
See application file for complete search history.

(56) References Cited

U.S. PATENT DOCUMENTS 6,297,454 B1 * 10/2001 Gareis ........ H01B 11/06 174/113 C
7,196,271 B2 3/2007 Cornibert et al.
9,824,794 B1 11/2017 McNutt et al.
9,875,825 B2 * 1/2018 Glew ........ H01B 11/08
10,553,333 B2 * 2/2020 Kaczmarski ........ H01B 11/06
2005/0092515 A1 5/2005 Kenny et al.
(Continued)

FOREIGN PATENT DOCUMENTS

EP 3 462 464 4/2019

OTHER PUBLICATIONS

International Search Report and Written Opinion as issued on PCT PCT/US2021/030616 dated Jul. 9, 2021.

*Primary Examiner* — Chau N Nguyen
(74) *Attorney, Agent, or Firm* — Foley & Lardner LLP

(57) ABSTRACT

Methods of design, manufacture and implementations of balanced twisted pair cables with a barrier tape or shield, with tuned attenuation, impedance, and coupling properties. A filler is included within the cable to separate the pairs and provide a support base for the shield, allowing for optimized ground plane uniformity and stability for tuned attenuation, impedance, and coupling properties. The filler orientation, shape, and size provides support for the shield such that a gap is provided between the shield and the twisted pairs with a given minimum size without increasing the maximum cable core size. The length of arms of the filler may be adjusted to fine-tune the size and shape of this gap and control air-dielectric volume and radial contact or spacing between any pair(s) and the shield, tuning electrical performance characteristics caused by non-linear effects of electromagnetic interactions at short ranges between the pairs, shield, filler, or other components.

31 Claims, 49 Drawing Sheets

(56) References Cited

U.S. PATENT DOCUMENTS

| | | | | |
|---|---|---|---|---|
| 2007/0026742 | A1* | 2/2007 | Park | H01B 11/04 439/676 |
| 2007/0044994 | A1* | 3/2007 | Park | H01B 11/06 174/113 C |
| 2007/0144762 | A1 | 6/2007 | Stutzman et al. | |
| 2007/0163800 | A1* | 7/2007 | Clark | H01B 11/04 174/113 C |
| 2008/0164049 | A1* | 7/2008 | Vexler | H01B 11/06 174/113 R |
| 2015/0107872 | A1 | 4/2015 | Wehrli et al. | |

* cited by examiner

| Frequency (MHz) | Limit | FOP | Supported | Over-extended |
|---|---|---|---|---|
| 0.3 | -1.45602 | -0.611 | -0.489 | -0.489 |
| 1.112 | -2.16641 | -1.934 | -1.912 | -1.912 |
| 1.924 | -2.72223 | -2.562 | -2.518 | -2.494 |
| 2.736 | -3.18647 | -3.04 | -2.98 | -2.941 |
| 3.549 | -3.59366 | -3.452 | -3.385 | -3.329 |
| 4.361 | -3.96011 | -3.813 | -3.744 | -3.678 |
| 5.173 | -4.29644 | -4.152 | -4.074 | -3.999 |
| 5.985 | -4.60915 | -4.452 | -4.373 | -4.284 |
| 6.797 | -4.90268 | -4.733 | -4.646 | -4.55 |
| 7.609 | -5.18024 | -4.994 | -4.906 | -4.805 |
| 8.421 | -5.44423 | -5.245 | -5.148 | -5.049 |
| 9.233 | -5.69652 | -5.5 | -5.389 | -5.285 |
| 10.046 | -5.93886 | -5.725 | -5.614 | -5.509 |
| 10.858 | -6.17185 | -5.95 | -5.838 | -5.725 |
| 11.67 | -6.39675 | -6.167 | -6.049 | -5.932 |
| 12.482 | -6.61438 | -6.377 | -6.259 | -6.135 |
| 13.294 | -6.82543 | -6.58 | -6.46 | -6.338 |
| 14.106 | -7.03048 | -6.785 | -6.654 | -6.527 |
| 14.918 | -7.23002 | -6.982 | -6.852 | -6.721 |
| 15.73 | -7.42449 | -7.175 | -7.037 | -6.902 |
| 16.543 | -7.61451 | -7.358 | -7.214 | -7.074 |
| 17.355 | -7.79994 | -7.538 | -7.392 | -7.25 |
| 18.167 | -7.98132 | -7.713 | -7.567 | -7.423 |
| 18.979 | -8.15891 | -7.895 | -7.743 | -7.596 |
| 19.791 | -8.33294 | -8.067 | -7.911 | -7.762 |
| 20.603 | -8.50364 | -8.234 | -8.072 | -7.923 |
| 21.415 | -8.67119 | -8.397 | -8.237 | -8.084 |
| 22.227 | -8.83578 | -8.56 | -8.395 | -8.236 |
| 23.04 | -8.99775 | -8.72 | -8.56 | -8.39 |
| 23.852 | -9.15685 | -8.878 | -8.711 | -8.538 |
| 24.664 | -9.31342 | -9.033 | -8.859 | -8.688 |
| 25.476 | -9.46759 | -9.188 | -9.006 | -8.833 |
| 26.288 | -9.61945 | -9.346 | -9.149 | -8.977 |
| 27.1 | -9.76913 | -9.492 | -9.295 | -9.123 |
| 27.912 | -9.91671 | -9.643 | -9.444 | -9.268 |
| 28.724 | -10.0623 | -9.788 | -9.585 | -9.407 |
| 29.537 | -10.2061 | -9.924 | -9.73 | -9.54 |
| 30.349 | -10.3479 | -10.057 | -9.861 | -9.672 |
| 31.161 | -10.488 | -10.193 | -9.995 | -9.808 |
| 31.973 | -10.6263 | -10.33 | -10.126 | -9.943 |

| Frequency (MHz) | Limit | FOP | Supported | Over-extended |
|---|---|---|---|---|
| 32.785 | -10.763 | -10.469 | -10.26 | -10.07 |
| 33.597 | -10.8981 | -10.601 | -10.391 | -10.202 |
| 34.409 | -11.0317 | -10.728 | -10.514 | -10.33 |
| 35.221 | -11.1638 | -10.862 | -10.642 | -10.445 |
| 36.034 | -11.2947 | -10.988 | -10.769 | -10.573 |
| 36.846 | -11.424 | -11.116 | -10.896 | -10.696 |
| 37.658 | -11.5521 | -11.249 | -11.024 | -10.816 |
| 38.47 | -11.6788 | -11.374 | -11.146 | -10.937 |
| 39.282 | -11.8043 | -11.487 | -11.256 | -11.053 |
| 40.094 | -11.9285 | -11.609 | -11.368 | -11.167 |
| 40.906 | -12.0517 | -11.746 | -11.495 | -11.286 |
| 41.718 | -12.1736 | -11.865 | -11.608 | -11.406 |
| 42.531 | -12.2946 | -11.97 | -11.732 | -11.527 |
| 43.343 | -12.4144 | -12.079 | -11.848 | -11.628 |
| 44.155 | -12.5332 | -12.193 | -11.961 | -11.737 |
| 44.967 | -12.6509 | -12.32 | -12.069 | -11.855 |
| 45.779 | -12.7677 | -12.438 | -12.175 | -11.96 |
| 46.591 | -12.8835 | -12.558 | -12.282 | -12.081 |
| 47.403 | -12.9983 | -12.661 | -12.394 | -12.166 |
| 48.215 | -13.1123 | -12.768 | -12.508 | -12.268 |
| 49.028 | -13.2255 | -12.886 | -12.606 | -12.376 |
| 49.84 | -13.3377 | -13.011 | -12.722 | -12.49 |
| 50.652 | -13.449 | -13.123 | -12.822 | -12.593 |
| 51.464 | -13.5596 | -13.204 | -12.934 | -12.697 |
| 52.276 | -13.6693 | -13.302 | -13.026 | -12.79 |
| 53.088 | -13.7782 | -13.407 | -13.13 | -12.889 |
| 53.9 | -13.8864 | -13.497 | -13.236 | -12.994 |
| 54.712 | -13.9938 | -13.601 | -13.334 | -13.08 |
| 55.525 | -14.1006 | -13.713 | -13.44 | -13.183 |
| 56.337 | -14.2065 | -13.805 | -13.529 | -13.295 |
| 57.149 | -14.3118 | -13.921 | -13.631 | -13.386 |
| 57.961 | -14.4163 | -14.039 | -13.727 | -13.48 |
| 58.773 | -14.5202 | -14.147 | -13.829 | -13.583 |
| 59.585 | -14.6234 | -14.256 | -13.926 | -13.677 |
| 60.397 | -14.726 | -14.319 | -14.024 | -13.771 |
| 61.209 | -14.8279 | -14.406 | -14.125 | -13.862 |
| 62.022 | -14.9294 | -14.52 | -14.22 | -13.955 |
| 62.834 | -15.0301 | -14.621 | -14.305 | -14.05 |
| 63.646 | -15.1302 | -14.725 | -14.413 | -14.137 |
| 64.458 | -15.2297 | -14.796 | -14.508 | -14.226 |

*FIG. 3E*

| Frequency (MHz) | Limit | FOP | Supported | Over-extended |
|---|---|---|---|---|
| 65.27 | -15.3287 | -14.887 | -14.601 | -14.319 |
| 66.082 | -15.427 | -14.983 | -14.685 | -14.413 |
| 66.894 | -15.5249 | -15.079 | -14.778 | -14.507 |
| 67.706 | -15.6221 | -15.18 | -14.87 | -14.587 |
| 68.518 | -15.7189 | -15.259 | -14.962 | -14.67 |
| 69.331 | -15.8152 | -15.342 | -15.048 | -14.756 |
| 70.143 | -15.9109 | -15.456 | -15.133 | -14.837 |
| 70.955 | -16.0061 | -15.552 | -15.213 | -14.919 |
| 71.767 | -16.1008 | -15.645 | -15.314 | -15.019 |
| 72.579 | -16.195 | -15.706 | -15.418 | -15.121 |
| 73.391 | -16.2887 | -15.789 | -15.511 | -15.197 |
| 74.203 | -16.382 | -15.89 | -15.569 | -15.286 |
| 75.016 | -16.4749 | -15.995 | -15.656 | -15.374 |
| 75.828 | -16.5672 | -16.084 | -15.739 | -15.463 |
| 76.64 | -16.659 | -16.172 | -15.827 | -15.568 |
| 77.452 | -16.7505 | -16.248 | -15.91 | -15.665 |
| 78.264 | -16.8414 | -16.331 | -16.004 | -15.758 |
| 79.076 | -16.932 | -16.413 | -16.103 | -15.767 |
| 79.888 | -17.0221 | -16.504 | -16.197 | -15.843 |
| 80.7 | -17.1118 | -16.606 | -16.272 | -15.925 |
| 81.513 | -17.2012 | -16.707 | -16.34 | -16.018 |
| 82.325 | -17.2901 | -16.743 | -16.414 | -16.114 |
| 83.137 | -17.3786 | -16.822 | -16.499 | -16.198 |
| 83.949 | -17.4667 | -16.909 | -16.579 | -16.275 |
| 84.761 | -17.5544 | -16.974 | -16.671 | -16.344 |
| 85.573 | -17.6418 | -17.059 | -16.762 | -16.411 |
| 86.385 | -17.7287 | -17.144 | -16.843 | -16.503 |
| 87.197 | -17.8153 | -17.233 | -16.906 | -16.595 |
| 88.01 | -17.9016 | -17.33 | -16.976 | -16.678 |
| 88.822 | -17.9875 | -17.431 | -17.064 | -16.759 |
| 89.634 | -18.073 | -17.521 | -17.153 | -16.839 |
| 90.446 | -18.1581 | -17.589 | -17.225 | -16.909 |
| 91.258 | -18.2429 | -17.654 | -17.308 | -16.982 |
| 92.07 | -18.3274 | -17.735 | -17.383 | -17.07 |
| 92.882 | -18.4115 | -17.818 | -17.464 | -17.163 |
| 93.694 | -18.4953 | -17.901 | -17.554 | -17.266 |
| 94.506 | -18.5787 | -17.974 | -17.653 | -17.342 |
| 95.319 | -18.6619 | -18.067 | -17.734 | -17.41 |
| 96.131 | -18.7447 | -18.144 | -17.826 | -17.475 |
| 96.943 | -18.8272 | -18.216 | -17.887 | -17.548 |

| Frequency (MHz) | Limit | FOP | Supported | Over-extended |
|---|---|---|---|---|
| 97.755 | -18.9094 | -18.306 | -17.953 | -17.626 |
| 98.567 | -18.9913 | -18.382 | -18.03 | -17.695 |
| 99.379 | -19.0728 | -18.467 | -18.106 | -17.778 |
| 100.191 | -19.1541 | -18.562 | -18.181 | -17.853 |
| 101.004 | -19.2351 | -18.643 | -18.261 | -17.926 |
| 101.816 | -19.3158 | -18.713 | -18.344 | -18.008 |
| 102.628 | -19.3962 | -18.798 | -18.412 | -18.067 |
| 103.44 | -19.4763 | -18.87 | -18.503 | -18.134 |
| 104.252 | -19.5561 | -18.942 | -18.579 | -18.22 |
| 105.064 | -19.6356 | -19.015 | -18.636 | -18.306 |
| 105.876 | -19.7149 | -19.105 | -18.723 | -18.373 |
| 106.688 | -19.7938 | -19.172 | -18.802 | -18.435 |
| 107.501 | -19.8726 | -19.24 | -18.889 | -18.531 |
| 108.313 | -19.9511 | -19.313 | -18.944 | -18.612 |
| 109.125 | -20.0292 | -19.395 | -19.017 | -18.653 |
| 109.937 | -20.1071 | -19.484 | -19.093 | -18.713 |
| 110.749 | -20.1848 | -19.566 | -19.163 | -18.789 |
| 111.561 | -20.2622 | -19.631 | -19.249 | -18.86 |
| 112.373 | -20.3393 | -19.696 | -19.303 | -18.933 |
| 113.185 | -20.4162 | -19.779 | -19.37 | -18.994 |
| 113.998 | -20.4929 | -19.849 | -19.447 | -19.073 |
| 114.81 | -20.5693 | -19.907 | -19.533 | -19.143 |
| 115.622 | -20.6454 | -19.968 | -19.608 | -19.208 |
| 116.434 | -20.7214 | -20.06 | -19.69 | -19.281 |
| 117.246 | -20.797 | -20.15 | -19.775 | -19.358 |
| 118.058 | -20.8725 | -20.212 | -19.824 | -19.423 |
| 118.87 | -20.9477 | -20.269 | -19.883 | -19.489 |
| 119.682 | -21.0226 | -20.352 | -19.96 | -19.572 |
| 120.495 | -21.0975 | -20.424 | -20.028 | -19.628 |
| 121.307 | -21.172 | -20.484 | -20.099 | -19.714 |
| 122.119 | -21.2463 | -20.545 | -20.164 | -19.806 |
| 122.931 | -21.3203 | -20.612 | -20.235 | -19.836 |
| 123.743 | -21.3942 | -20.704 | -20.285 | -19.895 |
| 124.555 | -21.4678 | -20.783 | -20.349 | -19.951 |
| 125.367 | -21.5412 | -20.864 | -20.436 | -19.985 |
| 126.179 | -21.6144 | -20.92 | -20.488 | -20.073 |
| 126.992 | -21.6875 | -20.957 | -20.54 | -20.142 |
| 127.804 | -21.7603 | -21 | -20.589 | -20.236 |
| 128.616 | -21.8329 | -21.049 | -20.66 | -20.318 |
| 129.428 | -21.9053 | -21.109 | -20.747 | -20.368 |

*FIG. 3F*

| Frequency (MHz) | Limit | FOP | Supported | Over-extended |
|---|---|---|---|---|
| 130.24 | -21.9774 | -21.192 | -20.824 | -20.441 |
| 131.052 | -22.0494 | -21.255 | -20.894 | -20.485 |
| 131.864 | -22.1212 | -21.31 | -20.955 | -20.55 |
| 132.676 | -22.1927 | -21.37 | -21.023 | -20.596 |
| 133.489 | -22.2642 | -21.45 | -21.067 | -20.662 |
| 134.301 | -22.3354 | -21.544 | -21.11 | -20.728 |
| 135.113 | -22.4064 | -21.624 | -21.177 | -20.812 |
| 135.925 | -22.4772 | -21.694 | -21.249 | -20.928 |
| 136.737 | -22.5478 | -21.719 | -21.299 | -20.968 |
| 137.549 | -22.6182 | -21.768 | -21.35 | -21.018 |
| 138.361 | -22.6884 | -21.839 | -21.422 | -21.091 |
| 139.173 | -22.7585 | -21.928 | -21.497 | -21.172 |
| 139.986 | -22.8285 | -22.016 | -21.555 | -21.227 |
| 140.798 | -22.8981 | -22.069 | -21.627 | -21.269 |
| 141.61 | -22.9677 | -22.156 | -21.695 | -21.351 |
| 142.422 | -23.037 | -22.222 | -21.763 | -21.401 |
| 143.234 | -23.1062 | -22.285 | -21.843 | -21.437 |
| 144.046 | -23.1751 | -22.369 | -21.904 | -21.472 |
| 144.858 | -23.2439 | -22.432 | -21.971 | -21.516 |
| 145.67 | -23.3126 | -22.459 | -22.05 | -21.556 |
| 146.483 | -23.3811 | -22.535 | -22.124 | -21.624 |
| 147.295 | -23.4494 | -22.624 | -22.154 | -21.717 |
| 148.107 | -23.5176 | -22.718 | -22.21 | -21.803 |
| 148.919 | -23.5855 | -22.797 | -22.284 | -21.854 |
| 149.731 | -23.6533 | -22.822 | -22.346 | -21.909 |
| 150.543 | -23.721 | -22.858 | -22.398 | -21.96 |
| 151.355 | -23.7885 | -22.915 | -22.455 | -22.014 |
| 152.167 | -23.8558 | -22.989 | -22.533 | -22.102 |
| 152.98 | -23.923 | -23.074 | -22.625 | -22.187 |
| 153.792 | -23.99 | -23.159 | -22.686 | -22.266 |
| 154.604 | -24.0569 | -23.226 | -22.751 | -22.319 |
| 155.416 | -24.1235 | -23.302 | -22.813 | -22.385 |
| 156.228 | -24.1901 | -23.37 | -22.873 | -22.442 |
| 157.04 | -24.2565 | -23.432 | -22.941 | -22.498 |
| 157.852 | -24.3227 | -23.484 | -23.012 | -22.57 |
| 158.664 | -24.3888 | -23.54 | -23.069 | -22.639 |
| 159.477 | -24.4548 | -23.621 | -23.131 | -22.687 |
| 160.289 | -24.5205 | -23.7 | -23.19 | -22.743 |
| 161.101 | -24.5862 | -23.739 | -23.262 | -22.823 |
| 161.913 | -24.6517 | -23.791 | -23.321 | -22.904 |

| Frequency (MHz) | Limit | FOP | Supported | Over-extended |
|---|---|---|---|---|
| 162.725 | -24.717 | -23.851 | -23.384 | -22.961 |
| 163.537 | -24.7822 | -23.907 | -23.457 | -23.017 |
| 164.349 | -24.8472 | -23.965 | -23.507 | -23.08 |
| 165.161 | -24.9121 | -24.025 | -23.561 | -23.133 |
| 165.974 | -24.977 | -24.094 | -23.63 | -23.183 |
| 166.786 | -25.0416 | -24.152 | -23.698 | -23.227 |
| 167.598 | -25.1061 | -24.215 | -23.76 | -23.289 |
| 168.41 | -25.1705 | -24.285 | -23.81 | -23.352 |
| 169.222 | -25.2347 | -24.346 | -23.871 | -23.413 |
| 170.034 | -25.2988 | -24.405 | -23.936 | -23.476 |
| 170.846 | -25.3627 | -24.477 | -23.991 | -23.536 |
| 171.658 | -25.4265 | -24.534 | -24.052 | -23.584 |
| 172.471 | -25.4903 | -24.599 | -24.111 | -23.654 |
| 173.283 | -25.5538 | -24.649 | -24.172 | -23.716 |
| 174.095 | -25.6172 | -24.705 | -24.24 | -23.77 |
| 174.907 | -25.6805 | -24.771 | -24.286 | -23.823 |
| 175.719 | -25.7436 | -24.84 | -24.337 | -23.89 |
| 176.531 | -25.8067 | -24.91 | -24.404 | -23.944 |
| 177.343 | -25.8696 | -24.976 | -24.472 | -24.002 |
| 178.155 | -25.9323 | -25.048 | -24.528 | -24.063 |
| 178.968 | -25.9951 | -25.116 | -24.583 | -24.102 |
| 179.78 | -26.0576 | -25.157 | -24.656 | -24.15 |
| 180.592 | -26.12 | -25.204 | -24.712 | -24.21 |
| 181.404 | -26.1822 | -25.251 | -24.761 | -24.272 |
| 182.216 | -26.2444 | -25.309 | -24.82 | -24.337 |
| 183.028 | -26.3064 | -25.362 | -24.88 | -24.397 |
| 183.84 | -26.3683 | -25.432 | -24.926 | -24.463 |
| 184.652 | -26.4301 | -25.506 | -24.97 | -24.527 |
| 185.465 | -26.4919 | -25.586 | -25.031 | -24.582 |
| 186.277 | -26.5534 | -25.628 | -25.091 | -24.638 |
| 187.089 | -26.6148 | -25.672 | -25.157 | -24.706 |
| 187.901 | -26.6761 | -25.735 | -25.223 | -24.76 |
| 188.713 | -26.7373 | -25.781 | -25.296 | -24.8 |
| 189.525 | -26.7984 | -25.825 | -25.366 | -24.835 |
| 190.337 | -26.8594 | -25.889 | -25.416 | -24.881 |
| 191.149 | -26.9202 | -25.953 | -25.453 | -24.937 |
| 191.962 | -26.9811 | -26.011 | -25.496 | -24.992 |
| 192.774 | -27.0417 | -26.059 | -25.551 | -25.051 |
| 193.586 | -27.1022 | -26.123 | -25.614 | -25.118 |
| 194.398 | -27.1626 | -26.177 | -25.661 | -25.2 |

FIG. 3G

| Frequency (MHz) | Limit | FOP | Supported | Over-extended |
|---|---|---|---|---|
| 195.21 | -27.2229 | -26.241 | -25.718 | -25.255 |
| 196.022 | -27.2831 | -26.316 | -25.772 | -25.299 |
| 196.834 | -27.3432 | -26.384 | -25.831 | -25.347 |
| 197.646 | -27.4031 | -26.442 | -25.888 | -25.401 |
| 198.459 | -27.4631 | -26.484 | -25.95 | -25.444 |
| 199.271 | -27.5228 | -26.523 | -26.028 | -25.495 |
| 200.083 | -27.5825 | -26.571 | -26.101 | -25.556 |
| 200.895 | -27.642 | -26.634 | -26.159 | -25.596 |
| 201.707 | -27.7014 | -26.679 | -26.197 | -25.646 |
| 202.519 | -27.7608 | -26.729 | -26.247 | -25.684 |
| 203.331 | -27.82 | -26.791 | -26.298 | -25.734 |
| 204.143 | -27.8791 | -26.843 | -26.345 | -25.793 |
| 204.956 | -27.9382 | -26.895 | -26.407 | -25.862 |
| 205.768 | -27.9971 | -26.965 | -26.47 | -25.925 |
| 206.58 | -28.0559 | -27.041 | -26.526 | -25.988 |
| 207.392 | -28.1146 | -27.116 | -26.575 | -26.042 |
| 208.204 | -28.1733 | -27.175 | -26.63 | -26.097 |
| 209.016 | -28.2318 | -27.225 | -26.678 | -26.16 |
| 209.828 | -28.2902 | -27.269 | -26.733 | -26.216 |
| 210.64 | -28.3485 | -27.336 | -26.781 | -26.266 |
| 211.453 | -28.4068 | -27.395 | -26.837 | -26.317 |
| 212.265 | -28.4649 | -27.438 | -26.895 | -26.378 |
| 213.077 | -28.523 | -27.484 | -26.961 | -26.44 |
| 213.889 | -28.5809 | -27.54 | -27.02 | -26.487 |
| 214.701 | -28.6387 | -27.608 | -27.062 | -26.545 |
| 215.513 | -28.6965 | -27.672 | -27.105 | -26.601 |
| 216.325 | -28.7541 | -27.739 | -27.159 | -26.65 |
| 217.137 | -28.8116 | -27.801 | -27.22 | -26.698 |
| 217.95 | -28.8692 | -27.845 | -27.275 | -26.762 |
| 218.762 | -28.9265 | -27.904 | -27.325 | -26.821 |
| 219.574 | -28.9838 | -27.959 | -27.38 | -26.88 |
| 220.386 | -29.041 | -28.02 | -27.441 | -26.914 |
| 221.198 | -29.0981 | -28.077 | -27.48 | -26.946 |
| 222.01 | -29.1551 | -28.117 | -27.536 | -26.995 |
| 222.822 | -29.212 | -28.16 | -27.596 | -27.048 |
| 223.634 | -29.2688 | -28.224 | -27.642 | -27.101 |
| 224.447 | -29.3256 | -28.28 | -27.695 | -27.15 |
| 225.259 | -29.3822 | -28.326 | -27.744 | -27.201 |
| 226.071 | -29.4388 | -28.375 | -27.796 | -27.263 |
| 226.883 | -29.4952 | -28.43 | -27.855 | -27.322 |

| Frequency (MHz) | Limit | FOP | Supported | Over-extended |
|---|---|---|---|---|
| 227.695 | -29.5516 | -28.487 | -27.913 | -27.372 |
| 228.507 | -29.6079 | -28.541 | -27.972 | -27.436 |
| 229.319 | -29.6641 | -28.606 | -28.035 | -27.508 |
| 230.131 | -29.7202 | -28.67 | -28.095 | -27.555 |
| 230.944 | -29.7763 | -28.723 | -28.154 | -27.596 |
| 231.756 | -29.8322 | -28.779 | -28.218 | -27.647 |
| 232.568 | -29.8881 | -28.834 | -28.266 | -27.711 |
| 233.38 | -29.9439 | -28.889 | -28.315 | -27.775 |
| 234.192 | -29.9995 | -28.946 | -28.361 | -27.836 |
| 235.004 | -30.0552 | -29.011 | -28.413 | -27.899 |
| 235.816 | -30.1107 | -29.064 | -28.47 | -27.938 |
| 236.628 | -30.1661 | -29.11 | -28.521 | -27.981 |
| 237.441 | -30.2215 | -29.162 | -28.581 | -28.027 |
| 238.253 | -30.2768 | -29.215 | -28.634 | -28.064 |
| 239.065 | -30.332 | -29.263 | -28.683 | -28.107 |
| 239.877 | -30.3871 | -29.307 | -28.731 | -28.151 |
| 240.689 | -30.4421 | -29.366 | -28.78 | -28.198 |
| 241.501 | -30.4971 | -29.419 | -28.825 | -28.252 |
| 242.313 | -30.552 | -29.466 | -28.878 | -28.296 |
| 243.125 | -30.6068 | -29.513 | -28.925 | -28.354 |
| 243.938 | -30.6615 | -29.578 | -28.982 | -28.41 |
| 244.75 | -30.7162 | -29.647 | -29.036 | -28.47 |
| 245.562 | -30.7707 | -29.701 | -29.088 | -28.525 |
| 246.374 | -30.8252 | -29.74 | -29.128 | -28.579 |
| 247.186 | -30.8796 | -29.793 | -29.18 | -28.63 |
| 247.998 | -30.9339 | -29.847 | -29.233 | -28.685 |
| 248.81 | -30.9882 | -29.898 | -29.289 | -28.721 |
| 249.622 | -31.0423 | -29.946 | -29.339 | -28.763 |
| 250.435 | -31.0965 | -29.993 | -29.39 | -28.807 |
| 251.247 | -31.1505 | -30.035 | -29.444 | -28.855 |
| 252.059 | -31.2045 | -30.079 | -29.502 | -28.906 |
| 252.871 | -31.2583 | -30.131 | -29.549 | -28.961 |
| 253.683 | -31.3121 | -30.184 | -29.588 | -29.019 |
| 254.495 | -31.3659 | -30.228 | -29.621 | -29.074 |
| 255.307 | -31.4195 | -30.291 | -29.674 | -29.129 |
| 256.119 | -31.4731 | -30.346 | -29.72 | -29.173 |
| 256.932 | -31.5266 | -30.411 | -29.772 | -29.221 |
| 257.744 | -31.5801 | -30.46 | -29.824 | -29.27 |
| 258.556 | -31.6334 | -30.494 | -29.871 | -29.31 |
| 259.368 | -31.6867 | -30.531 | -29.924 | -29.348 |

*FIG. 3H*

| Frequency (MHz) | Limit | FOP | Supported | Over-extended |
|---|---|---|---|---|
| 260.18 | -31.7399 | -30.577 | -29.97 | -29.39 |
| 260.992 | -31.7931 | -30.636 | -30.022 | -29.433 |
| 261.804 | -31.8461 | -30.684 | -30.072 | -29.475 |
| 262.616 | -31.8991 | -30.737 | -30.119 | -29.513 |
| 263.429 | -31.9521 | -30.789 | -30.158 | -29.557 |
| 264.241 | -32.005 | -30.836 | -30.209 | -29.611 |
| 265.053 | -32.0578 | -30.889 | -30.26 | -29.66 |
| 265.865 | -32.1105 | -30.947 | -30.308 | -29.707 |
| 266.677 | -32.1631 | -30.989 | -30.354 | -29.758 |
| 267.489 | -32.2157 | -31.027 | -30.398 | -29.811 |
| 268.301 | -32.2682 | -31.069 | -30.452 | -29.866 |
| 269.113 | -32.3207 | -31.114 | -30.49 | -29.903 |
| 269.926 | -32.3731 | -31.177 | -30.549 | -29.949 |
| 270.738 | -32.4254 | -31.229 | -30.604 | -30.004 |
| 271.55 | -32.4776 | -31.281 | -30.654 | -30.062 |
| 272.362 | -32.5298 | -31.337 | -30.696 | -30.116 |
| 273.174 | -32.5819 | -31.38 | -30.742 | -30.165 |
| 273.986 | -32.634 | -31.432 | -30.795 | -30.211 |
| 274.798 | -32.6859 | -31.502 | -30.845 | -30.261 |
| 275.61 | -32.7379 | -31.561 | -30.906 | -30.32 |
| 276.423 | -32.7898 | -31.606 | -30.958 | -30.375 |
| 277.235 | -32.8415 | -31.654 | -31.016 | -30.424 |
| 278.047 | -32.8932 | -31.695 | -31.066 | -30.478 |
| 278.859 | -32.9449 | -31.738 | -31.109 | -30.518 |
| 279.671 | -32.9965 | -31.802 | -31.155 | -30.552 |
| 280.483 | -33.048 | -31.848 | -31.187 | -30.59 |
| 281.295 | -33.0995 | -31.887 | -31.245 | -30.652 |
| 282.107 | -33.1509 | -31.929 | -31.292 | -30.697 |
| 282.92 | -33.2022 | -31.98 | -31.354 | -30.75 |
| 283.732 | -33.2535 | -32.025 | -31.412 | -30.791 |
| 284.544 | -33.3047 | -32.075 | -31.461 | -30.85 |
| 285.356 | -33.3559 | -32.133 | -31.515 | -30.916 |
| 286.168 | -33.4069 | -32.18 | -31.554 | -30.964 |
| 286.98 | -33.458 | -32.221 | -31.597 | -31.004 |
| 287.792 | -33.5089 | -32.275 | -31.646 | -31.043 |
| 288.604 | -33.5598 | -32.324 | -31.698 | -31.087 |
| 289.417 | -33.6107 | -32.372 | -31.745 | -31.122 |
| 290.229 | -33.6615 | -32.425 | -31.789 | -31.167 |
| 291.041 | -33.7122 | -32.477 | -31.831 | -31.209 |
| 291.853 | -33.7628 | -32.526 | -31.882 | -31.259 |

| Frequency (MHz) | Limit | FOP | Supported | Over-extended |
|---|---|---|---|---|
| 292.665 | -33.8134 | -32.578 | -31.917 | -31.3 |
| 293.477 | -33.864 | -32.63 | -31.962 | -31.349 |
| 294.289 | -33.9144 | -32.677 | -32.015 | -31.386 |
| 295.101 | -33.9648 | -32.731 | -32.05 | -31.437 |
| 295.914 | -34.0153 | -32.778 | -32.079 | -31.488 |
| 296.726 | -34.0656 | -32.825 | -32.121 | -31.53 |
| 297.538 | -34.1158 | -32.867 | -32.16 | -31.57 |
| 298.35 | -34.166 | -32.924 | -32.207 | -31.614 |
| 299.162 | -34.2161 | -32.962 | -32.246 | -31.654 |
| 299.974 | -34.2662 | -33.017 | -32.289 | -31.7 |
| 300.786 | -34.3162 | -33.054 | -32.329 | -31.746 |
| 301.598 | -34.3661 | -33.089 | -32.384 | -31.795 |
| 302.411 | -34.4161 | -33.143 | -32.43 | -31.819 |
| 303.223 | -34.4659 | -33.195 | -32.477 | -31.864 |
| 304.035 | -34.5157 | -33.24 | -32.529 | -31.905 |
| 304.847 | -34.5654 | -33.273 | -32.57 | -31.938 |
| 305.659 | -34.615 | -33.285 | -32.625 | -31.977 |
| 306.471 | -34.6647 | -33.314 | -32.691 | -32.02 |
| 307.283 | -34.7142 | -33.343 | -32.753 | -32.072 |
| 308.095 | -34.7637 | -33.388 | -32.788 | -32.113 |
| 308.908 | -34.8132 | -33.436 | -32.815 | -32.158 |
| 309.72 | -34.8626 | -33.485 | -32.844 | -32.198 |
| 310.532 | -34.9119 | -33.531 | -32.883 | -32.233 |
| 311.344 | -34.9612 | -33.557 | -32.924 | -32.266 |
| 312.156 | -35.0104 | -33.611 | -32.984 | -32.319 |
| 312.968 | -35.0596 | -33.659 | -33.044 | -32.371 |
| 313.78 | -35.1087 | -33.712 | -33.097 | -32.428 |
| 314.592 | -35.1578 | -33.778 | -33.128 | -32.496 |
| 315.405 | -35.2068 | -33.821 | -33.155 | -32.548 |
| 316.217 | -35.2558 | -33.875 | -33.184 | -32.603 |
| 317.029 | -35.3047 | -33.9 | -33.221 | -32.653 |
| 317.841 | -35.3535 | -33.947 | -33.262 | -32.688 |
| 318.653 | -35.4023 | -33.999 | -33.295 | -32.708 |
| 319.465 | -35.451 | -34.04 | -33.336 | -32.719 |
| 320.277 | -35.4997 | -34.085 | -33.361 | -32.75 |
| 321.089 | -35.5484 | -34.116 | -33.41 | -32.791 |
| 321.902 | -35.597 | -34.158 | -33.452 | -32.822 |
| 322.714 | -35.6455 | -34.223 | -33.511 | -32.875 |
| 323.526 | -35.694 | -34.277 | -33.551 | -32.908 |
| 324.338 | -35.7424 | -34.337 | -33.596 | -32.941 |

FIG. 3I

| Frequency (MHz) | Limit | FOP | Supported | Over-extended |
|---|---|---|---|---|
| 325.15 | -35.7908 | -34.415 | -33.65 | -32.993 |
| 325.962 | -35.8391 | -34.463 | -33.691 | -33.04 |
| 326.774 | -35.8874 | -34.481 | -33.738 | -33.086 |
| 327.586 | -35.9356 | -34.496 | -33.794 | -33.139 |
| 328.399 | -35.9839 | -34.522 | -33.835 | -33.188 |
| 329.211 | -36.032 | -34.578 | -33.878 | -33.224 |
| 330.023 | -36.0801 | -34.636 | -33.915 | -33.283 |
| 330.835 | -36.1281 | -34.694 | -33.971 | -33.337 |
| 331.647 | -36.1761 | -34.737 | -34.022 | -33.397 |
| 332.459 | -36.224 | -34.791 | -34.07 | -33.434 |
| 333.271 | -36.2719 | -34.867 | -34.121 | -33.502 |
| 334.083 | -36.3197 | -34.918 | -34.167 | -33.543 |
| 334.896 | -36.3675 | -34.991 | -34.216 | -33.574 |
| 335.708 | -36.4152 | -35.052 | -34.257 | -33.619 |
| 336.52 | -36.4629 | -35.083 | -34.299 | -33.656 |
| 337.332 | -36.5105 | -35.106 | -34.354 | -33.695 |
| 338.144 | -36.5581 | -35.129 | -34.404 | -33.757 |
| 338.956 | -36.6057 | -35.189 | -34.447 | -33.804 |
| 339.768 | -36.6531 | -35.242 | -34.482 | -33.85 |
| 340.58 | -36.7006 | -35.314 | -34.529 | -33.918 |
| 341.393 | -36.748 | -35.378 | -34.567 | -33.938 |
| 342.205 | -36.7954 | -35.401 | -34.632 | -33.977 |
| 343.017 | -36.8427 | -35.442 | -34.688 | -34.015 |
| 343.829 | -36.8899 | -35.506 | -34.738 | -34.068 |
| 344.641 | -36.9371 | -35.57 | -34.77 | -34.109 |
| 345.453 | -36.9843 | -35.624 | -34.816 | -34.157 |
| 346.265 | -37.0314 | -35.648 | -34.865 | -34.181 |
| 347.077 | -37.0784 | -35.698 | -34.921 | -34.217 |
| 347.89 | -37.1255 | -35.754 | -34.96 | -34.252 |
| 348.702 | -37.1725 | -35.793 | -35.005 | -34.319 |
| 349.514 | -37.2194 | -35.834 | -35.055 | -34.344 |
| 350.326 | -37.2663 | -35.879 | -35.104 | -34.388 |
| 351.138 | -37.3131 | -35.939 | -35.137 | -34.447 |
| 351.95 | -37.3599 | -35.999 | -35.187 | -34.497 |
| 352.762 | -37.4066 | -36.051 | -35.238 | -34.53 |
| 353.574 | -37.4533 | -36.112 | -35.275 | -34.573 |
| 354.387 | -37.5 | -36.127 | -35.312 | -34.604 |
| 355.199 | -37.5466 | -36.143 | -35.349 | -34.655 |
| 356.011 | -37.5932 | -36.187 | -35.387 | -34.688 |
| 356.823 | -37.6397 | -36.228 | -35.432 | -34.734 |

| Frequency (MHz) | Limit | FOP | Supported | Over-extended |
|---|---|---|---|---|
| 357.635 | -37.6862 | -36.25 | -35.475 | -34.814 |
| 358.447 | -37.7326 | -36.294 | -35.508 | -34.857 |
| 359.259 | -37.779 | -36.343 | -35.545 | -34.87 |
| 360.071 | -37.8253 | -36.382 | -35.601 | -34.915 |
| 360.884 | -37.8716 | -36.451 | -35.642 | -34.948 |
| 361.696 | -37.9179 | -36.525 | -35.694 | -34.985 |
| 362.508 | -37.9641 | -36.543 | -35.737 | -35.02 |
| 363.32 | -38.0103 | -36.578 | -35.791 | -35.053 |
| 364.132 | -38.0564 | -36.605 | -35.834 | -35.08 |
| 364.944 | -38.1025 | -36.638 | -35.883 | -35.117 |
| 365.756 | -38.1485 | -36.683 | -35.902 | -35.164 |
| 366.568 | -38.1945 | -36.733 | -35.935 | -35.216 |
| 367.381 | -38.2405 | -36.789 | -35.988 | -35.279 |
| 368.193 | -38.2864 | -36.826 | -36.015 | -35.314 |
| 369.005 | -38.3323 | -36.896 | -36.06 | -35.339 |
| 369.817 | -38.3781 | -36.935 | -36.097 | -35.382 |
| 370.629 | -38.4239 | -36.956 | -36.124 | -35.405 |
| 371.441 | -38.4696 | -37.005 | -36.196 | -35.438 |
| 372.253 | -38.5153 | -37.075 | -36.233 | -35.479 |
| 373.065 | -38.5609 | -37.073 | -36.271 | -35.518 |
| 373.878 | -38.6066 | -37.108 | -36.308 | -35.558 |
| 374.69 | -38.6522 | -37.191 | -36.337 | -35.595 |
| 375.502 | -38.6977 | -37.197 | -36.363 | -35.642 |
| 376.314 | -38.7432 | -37.249 | -36.394 | -35.7 |
| 377.126 | -38.7886 | -37.337 | -36.448 | -35.733 |
| 377.938 | -38.834 | -37.383 | -36.485 | -35.784 |
| 378.75 | -38.8794 | -37.391 | -36.536 | -35.819 |
| 379.562 | -38.9247 | -37.436 | -36.576 | -35.842 |
| 380.375 | -38.9701 | -37.479 | -36.607 | -35.867 |
| 381.187 | -39.0153 | -37.543 | -36.677 | -35.912 |
| 381.999 | -39.0605 | -37.558 | -36.722 | -35.961 |
| 382.811 | -39.1057 | -37.616 | -36.765 | -35.988 |
| 383.623 | -39.1508 | -37.657 | -36.798 | -36.027 |
| 384.435 | -39.1959 | -37.723 | -36.848 | -36.093 |
| 385.247 | -39.2409 | -37.774 | -36.883 | -36.12 |
| 386.059 | -39.2859 | -37.797 | -36.911 | -36.155 |
| 386.872 | -39.3309 | -37.83 | -36.955 | -36.204 |
| 387.684 | -39.3759 | -37.863 | -36.996 | -36.237 |
| 388.496 | -39.4207 | -37.857 | -37.035 | -36.264 |
| 389.308 | -39.4656 | -37.896 | -37.076 | -36.303 |

*FIG. 3J*

| Frequency (MHz) | Limit | FOP | Supported | Over-extended |
|---|---|---|---|---|
| 390.12 | -39.5104 | -37.931 | -37.105 | -36.34 |
| 390.932 | -39.5552 | -37.935 | -37.132 | -36.365 |
| 391.744 | -39.5999 | -38.014 | -37.175 | -36.41 |
| 392.556 | -39.6446 | -38.04 | -37.206 | -36.511 |
| 393.369 | -39.6893 | -38.065 | -37.253 | -36.573 |
| 394.181 | -39.7339 | -38.106 | -37.301 | -36.596 |
| 394.993 | -39.7785 | -38.125 | -37.354 | -36.643 |
| 395.805 | -39.823 | -38.201 | -37.39 | -36.695 |
| 396.617 | -39.8675 | -38.286 | -37.445 | -36.724 |
| 397.429 | -39.912 | -38.24 | -37.507 | -36.781 |
| 398.241 | -39.9564 | -38.323 | -37.525 | -36.847 |
| 399.053 | -40.0008 | -38.498 | -37.558 | -36.876 |
| 399.866 | -40.0452 | -38.531 | -37.598 | -36.911 |
| 400.678 | -40.0895 | -38.508 | -37.622 | -36.963 |
| 401.49 | -40.1338 | -38.636 | -37.662 | -36.979 |
| 402.302 | -40.178 | -38.647 | -37.717 | -37.014 |
| 403.114 | -40.2222 | -38.609 | -37.75 | -37.029 |
| 403.926 | -40.2664 | -38.706 | -37.8 | -37.051 |
| 404.738 | -40.3105 | -38.729 | -37.872 | -37.084 |
| 405.55 | -40.3546 | -38.762 | -37.88 | -37.123 |
| 406.363 | -40.3987 | -38.875 | -37.944 | -37.162 |
| 407.175 | -40.4427 | -38.915 | -38.006 | -37.218 |
| 407.987 | -40.4867 | -38.931 | -38.076 | -37.27 |
| 408.799 | -40.5306 | -38.915 | -38.129 | -37.311 |
| 409.611 | -40.5745 | -38.974 | -38.135 | -37.381 |
| 410.423 | -40.6184 | -39.065 | -38.168 | -37.393 |
| 411.235 | -40.6622 | -39.16 | -38.206 | -37.439 |
| 412.047 | -40.706 | -39.236 | -38.249 | -37.494 |
| 412.86 | -40.7498 | -39.276 | -38.269 | -37.498 |
| 413.672 | -40.7936 | -39.337 | -38.335 | -37.529 |
| 414.484 | -40.8372 | -39.352 | -38.37 | -37.597 |
| 415.296 | -40.8809 | -39.304 | -38.401 | -37.614 |
| 416.108 | -40.9245 | -39.393 | -38.449 | -37.651 |
| 416.92 | -40.9681 | -39.447 | -38.48 | -37.708 |
| 417.732 | -41.0117 | -39.405 | -38.548 | -37.76 |
| 418.544 | -41.0552 | -39.496 | -38.593 | -37.805 |
| 419.357 | -41.0987 | -39.575 | -38.653 | -37.859 |
| 420.169 | -41.1421 | -39.566 | -38.686 | -37.916 |
| 420.981 | -41.1855 | -39.676 | -38.706 | -37.986 |
| 421.793 | -41.2289 | -39.729 | -38.743 | -38.044 |

| Frequency (MHz) | Limit | FOP | Supported | Over-extended |
|---|---|---|---|---|
| 422.605 | -41.2723 | -39.727 | -38.782 | -38.112 |
| 423.417 | -41.3156 | -39.783 | -38.836 | -38.184 |
| 424.229 | -41.3588 | -39.892 | -38.883 | -38.207 |
| 425.041 | -41.4021 | -40.02 | -38.927 | -38.246 |
| 425.854 | -41.4453 | -40.067 | -38.968 | -38.248 |
| 426.666 | -41.4885 | -39.981 | -39.001 | -38.267 |
| 427.478 | -41.5316 | -40.003 | -39.05 | -38.322 |
| 428.29 | -41.5747 | -40.071 | -39.079 | -38.333 |
| 429.102 | -41.6178 | -40.063 | -39.106 | -38.345 |
| 429.914 | -41.6608 | -40.092 | -39.153 | -38.394 |
| 430.726 | -41.7038 | -40.177 | -39.188 | -38.417 |
| 431.538 | -41.7468 | -40.162 | -39.225 | -38.475 |
| 432.351 | -41.7898 | -40.201 | -39.267 | -38.512 |
| 433.163 | -41.8327 | -40.298 | -39.302 | -38.53 |
| 433.975 | -41.8755 | -40.286 | -39.372 | -38.555 |
| 434.787 | -41.9184 | -40.339 | -39.411 | -38.617 |
| 435.599 | -41.9612 | -40.424 | -39.467 | -38.683 |
| 436.411 | -42.0039 | -40.387 | -39.52 | -38.757 |
| 437.223 | -42.0467 | -40.418 | -39.568 | -38.767 |
| 438.035 | -42.0894 | -40.476 | -39.592 | -38.821 |
| 438.848 | -42.1321 | -40.517 | -39.609 | -38.891 |
| 439.66 | -42.1747 | -40.597 | -39.636 | -38.924 |
| 440.472 | -42.2173 | -40.665 | -39.679 | -38.969 |
| 441.284 | -42.2599 | -40.715 | -39.722 | -38.965 |
| 442.096 | -42.3024 | -40.762 | -39.77 | -39.021 |
| 442.908 | -42.3449 | -40.758 | -39.819 | -39.064 |
| 443.72 | -42.3874 | -40.801 | -39.856 | -39.066 |
| 444.532 | -42.4298 | -40.859 | -39.891 | -39.118 |
| 445.345 | -42.4723 | -40.896 | -39.947 | -39.14 |
| 446.157 | -42.5147 | -40.905 | -40.002 | -39.181 |
| 446.969 | -42.557 | -40.958 | -40.019 | -39.235 |
| 447.781 | -42.5993 | -41.051 | -40.054 | -39.262 |
| 448.593 | -42.6416 | -41.148 | -40.089 | -39.307 |
| 449.405 | -42.6839 | -41.164 | -40.105 | -39.371 |
| 450.217 | -42.7261 | -41.144 | -40.126 | -39.379 |
| 451.029 | -42.7683 | -41.255 | -40.171 | -39.402 |
| 451.842 | -42.8105 | -41.259 | -40.212 | -39.441 |
| 452.654 | -42.8526 | -41.239 | -40.248 | -39.486 |
| 453.466 | -42.8947 | -41.298 | -40.278 | -39.546 |
| 454.278 | -42.9368 | -41.319 | -40.316 | -39.55 |

*FIG. 3K*

| Frequency (MHz) | Limit | FOP | Supported | Over-extended |
|---|---|---|---|---|
| 455.09 | -42.9788 | -41.296 | -40.334 | -39.567 |
| 455.902 | -43.0208 | -41.375 | -40.394 | -39.595 |
| 456.714 | -43.0628 | -41.457 | -40.41 | -39.628 |
| 457.526 | -43.1047 | -41.472 | -40.458 | -39.684 |
| 458.339 | -43.1467 | -41.486 | -40.501 | -39.744 |
| 459.151 | -43.1886 | -41.54 | -40.546 | -39.791 |
| 459.963 | -43.2304 | -41.579 | -40.573 | -39.837 |
| 460.775 | -43.2722 | -41.643 | -40.625 | -39.886 |
| 461.587 | -43.314 | -41.682 | -40.672 | -39.929 |
| 462.399 | -43.3558 | -41.721 | -40.686 | -39.96 |
| 463.211 | -43.3975 | -41.735 | -40.711 | -39.975 |
| 464.023 | -43.4392 | -41.785 | -40.748 | -39.989 |
| 464.836 | -43.4809 | -41.789 | -40.781 | -39.999 |
| 465.648 | -43.5225 | -41.816 | -40.814 | -40.038 |
| 466.46 | -43.5641 | -41.853 | -40.86 | -40.071 |
| 467.272 | -43.6057 | -41.868 | -40.888 | -40.094 |
| 468.084 | -43.6473 | -41.917 | -40.936 | -40.141 |
| 468.896 | -43.6888 | -41.944 | -40.977 | -40.189 |
| 469.708 | -43.7303 | -41.958 | -41.02 | -40.24 |
| 470.52 | -43.7717 | -42.026 | -41.043 | -40.251 |
| 471.333 | -43.8132 | -42.043 | -41.082 | -40.286 |
| 472.145 | -43.8546 | -42.096 | -41.103 | -40.327 |
| 472.957 | -43.896 | -42.146 | -41.152 | -40.366 |
| 473.769 | -43.9373 | -42.197 | -41.208 | -40.43 |
| 474.581 | -43.9786 | -42.23 | -41.22 | -40.459 |
| 475.393 | -44.0199 | -42.259 | -41.282 | -40.496 |
| 476.205 | -44.0612 | -42.334 | -41.35 | -40.549 |
| 477.017 | -44.1024 | -42.342 | -41.368 | -40.57 |
| 477.83 | -44.1437 | -42.381 | -41.402 | -40.59 |
| 478.642 | -44.1848 | -42.428 | -41.443 | -40.661 |
| 479.454 | -44.226 | -42.447 | -41.443 | -40.698 |
| 480.266 | -44.2671 | -42.468 | -41.484 | -40.755 |
| 481.078 | -44.3082 | -42.517 | -41.533 | -40.794 |
| 481.89 | -44.3492 | -42.556 | -41.575 | -40.813 |
| 482.702 | -44.3902 | -42.556 | -41.601 | -40.832 |
| 483.514 | -44.4312 | -42.571 | -41.641 | -40.871 |
| 484.327 | -44.4723 | -42.612 | -41.7 | -40.906 |
| 485.139 | -44.5132 | -42.649 | -41.748 | -40.97 |
| 485.951 | -44.5541 | -42.686 | -41.795 | -41.002 |
| 486.763 | -44.595 | -42.721 | -41.822 | -41.037 |

| Frequency (MHz) | Limit | FOP | Supported | Over-extended |
|---|---|---|---|---|
| 487.575 | -44.6359 | -42.783 | -41.871 | -41.112 |
| 488.387 | -44.6767 | -42.812 | -41.9 | -41.161 |
| 489.199 | -44.7175 | -42.863 | -41.912 | -41.217 |
| 490.011 | -44.7583 | -42.927 | -41.958 | -41.281 |
| 490.824 | -44.7991 | -42.997 | -42.026 | -41.324 |
| 491.636 | -44.8398 | -43.022 | -42.075 | -41.355 |
| 492.448 | -44.8805 | -43.053 | -42.127 | -41.386 |
| 493.26 | -44.9211 | -43.101 | -42.176 | -41.423 |
| 494.072 | -44.9618 | -43.169 | -42.191 | -41.489 |
| 494.884 | -45.0024 | -43.193 | -42.185 | -41.522 |
| 495.696 | -45.043 | -43.216 | -42.242 | -41.526 |
| 496.508 | -45.0835 | -43.22 | -42.263 | -41.565 |
| 497.321 | -45.1241 | -43.235 | -42.285 | -41.563 |
| 498.133 | -45.1646 | -43.268 | -42.337 | -41.555 |
| 498.945 | -45.2051 | -43.334 | -42.37 | -41.594 |
| 499.757 | -45.2455 | -43.348 | -42.428 | -41.654 |
| 500.569 | -45.2859 | -43.449 | -42.469 | -41.715 |
| 501.381 | -45.3263 | -43.486 | -42.487 | -41.761 |
| 502.193 | -45.3667 | -43.532 | -42.541 | -41.783 |
| 503.005 | -45.407 | -43.564 | -42.59 | -41.851 |
| 503.818 | -45.4474 | -43.598 | -42.603 | -41.936 |
| 504.63 | -45.4877 | -43.612 | -42.66 | -41.977 |
| 505.442 | -45.528 | -43.694 | -42.7 | -42.016 |
| 506.254 | -45.5682 | -43.744 | -42.78 | -42.041 |
| 507.066 | -45.6084 | -43.783 | -42.786 | -42.09 |
| 507.878 | -45.6486 | -43.814 | -42.821 | -42.125 |
| 508.69 | -45.6887 | -43.882 | -42.908 | -42.166 |
| 509.502 | -45.7289 | -43.932 | -42.935 | -42.216 |
| 510.315 | -45.769 | -44.014 | -42.933 | -42.253 |
| 511.127 | -45.8091 | -44.047 | -43.013 | -42.331 |
| 511.939 | -45.8491 | -44.033 | -43.011 | -42.401 |
| 512.751 | -45.8892 | -44.016 | -43.068 | -42.436 |
| 513.563 | -45.9292 | -44.041 | -43.118 | -42.473 |
| 514.375 | -45.9691 | -44.084 | -43.124 | -42.447 |
| 515.187 | -46.0091 | -44.228 | -43.209 | -42.475 |
| 515.999 | -46.049 | -44.216 | -43.194 | -42.488 |
| 516.812 | -46.089 | -44.259 | -43.223 | -42.5 |
| 517.624 | -46.1288 | -44.295 | -43.285 | -42.523 |
| 518.436 | -46.1687 | -44.262 | -43.326 | -42.56 |
| 519.248 | -46.2085 | -44.325 | -43.386 | -42.609 |

*FIG. 3L*

| Frequency (MHz) | Limit | FOP | Supported | Over-extended |
|---|---|---|---|---|
| 520.06 | -46.2483 | -44.334 | -43.444 | -42.628 |
| 520.872 | -46.2881 | -44.387 | -43.474 | -42.601 |
| 521.684 | -46.3278 | -44.433 | -43.511 | -42.618 |
| 522.496 | -46.3675 | -44.443 | -43.507 | -42.597 |
| 523.309 | -46.4073 | -44.433 | -43.518 | -42.651 |
| 524.121 | -46.4469 | -44.494 | -43.536 | -42.706 |
| 524.933 | -46.4866 | -44.509 | -43.559 | -42.776 |
| 525.745 | -46.5262 | -44.525 | -43.598 | -42.815 |
| 526.557 | -46.5658 | -44.525 | -43.648 | -42.826 |
| 527.369 | -46.6054 | -44.563 | -43.681 | -42.836 |
| 528.181 | -46.6449 | -44.624 | -43.713 | -42.875 |
| 528.993 | -46.6844 | -44.591 | -43.728 | -42.929 |
| 529.806 | -46.724 | -44.627 | -43.771 | -42.972 |
| 530.618 | -46.7634 | -44.73 | -43.796 | -43.065 |
| 531.43 | -46.8029 | -44.705 | -43.825 | -43.114 |
| 532.242 | -46.8423 | -44.73 | -43.829 | -43.131 |
| 533.054 | -46.8817 | -44.765 | -43.831 | -43.149 |
| 533.866 | -46.9211 | -44.791 | -43.903 | -43.162 |
| 534.678 | -46.9604 | -44.853 | -43.936 | -43.17 |
| 535.49 | -46.9998 | -44.897 | -43.987 | -43.174 |
| 536.303 | -47.0391 | -44.913 | -44.045 | -43.188 |
| 537.115 | -47.0784 | -44.983 | -44.037 | -43.225 |
| 537.927 | -47.1176 | -45.022 | -44.039 | -43.267 |
| 538.739 | -47.1569 | -45.113 | -44.103 | -43.339 |
| 539.551 | -47.1961 | -45.165 | -44.13 | -43.359 |
| 540.363 | -47.2352 | -45.208 | -44.171 | -43.398 |
| 541.175 | -47.2744 | -45.268 | -44.218 | -43.419 |
| 541.987 | -47.3135 | -45.264 | -44.241 | -43.473 |
| 542.8 | -47.3527 | -45.346 | -44.323 | -43.541 |
| 543.612 | -47.3918 | -45.389 | -44.35 | -43.6 |
| 544.424 | -47.4308 | -45.398 | -44.406 | -43.642 |
| 545.236 | -47.4699 | -45.49 | -44.424 | -43.654 |
| 546.048 | -47.5089 | -45.478 | -44.443 | -43.664 |
| 546.86 | -47.5479 | -45.486 | -44.492 | -43.685 |
| 547.672 | -47.5869 | -45.497 | -44.507 | -43.679 |
| 548.484 | -47.6258 | -45.492 | -44.534 | -43.724 |
| 549.297 | -47.6648 | -45.526 | -44.573 | -43.79 |
| 550.109 | -47.7037 | -45.592 | -44.602 | -43.74 |
| 550.921 | -47.7425 | -45.604 | -44.622 | -43.771 |
| 551.733 | -47.7814 | -45.649 | -44.686 | -43.819 |
| 552.545 | -47.8202 | -45.647 | -44.633 | -43.813 |
| 553.357 | -47.859 | -45.672 | -44.692 | -43.868 |
| 554.169 | -47.8978 | -45.783 | -44.731 | -43.965 |
| 554.981 | -47.9366 | -45.794 | -44.758 | -43.955 |
| 555.794 | -47.9753 | -45.829 | -44.828 | -44.012 |
| 556.606 | -48.0141 | -45.855 | -44.872 | -44.041 |
| 557.418 | -48.0527 | -45.901 | -44.882 | -44.037 |
| 558.23 | -48.0914 | -45.934 | -44.937 | -44.095 |
| 559.042 | -48.1301 | -45.957 | -44.991 | -44.121 |
| 559.854 | -48.1687 | -45.979 | -45.003 | -44.154 |
| 560.666 | -48.2073 | -45.989 | -45.045 | -44.192 |
| 561.478 | -48.2459 | -46.06 | -45.102 | -44.216 |
| 562.291 | -48.2845 | -46.078 | -45.061 | -44.227 |
| 563.103 | -48.323 | -46.09 | -45.129 | -44.276 |
| 563.915 | -48.3615 | -46.128 | -45.162 | -44.309 |
| 564.727 | -48.4 | -46.185 | -45.15 | -44.33 |
| 565.539 | -48.4385 | -46.21 | -45.152 | -44.404 |
| 566.351 | -48.4769 | -46.28 | -45.189 | -44.488 |
| 567.163 | -48.5153 | -46.255 | -45.211 | -44.591 |
| 567.975 | -48.5537 | -46.264 | -45.261 | -44.634 |
| 568.788 | -48.5921 | -46.289 | -45.323 | -44.733 |
| 569.6 | -48.6305 | -46.309 | -45.317 | -44.756 |
| 570.412 | -48.6688 | -46.392 | -45.354 | -44.705 |
| 571.224 | -48.7071 | -46.392 | -45.405 | -44.717 |
| 572.036 | -48.7454 | -46.458 | -45.502 | -44.744 |
| 572.848 | -48.7837 | -46.441 | -45.537 | -44.766 |
| 573.66 | -48.8219 | -46.404 | -45.558 | -44.799 |
| 574.472 | -48.8602 | -46.538 | -45.595 | -44.779 |
| 575.285 | -48.8984 | -46.497 | -45.661 | -44.826 |
| 576.097 | -48.9366 | -46.54 | -45.671 | -44.915 |
| 576.909 | -48.9747 | -46.641 | -45.718 | -44.933 |
| 577.721 | -49.0129 | -46.678 | -45.729 | -45.009 |
| 578.533 | -49.051 | -46.684 | -45.729 | -45.065 |
| 579.345 | -49.0891 | -46.818 | -45.737 | -45.082 |
| 580.157 | -49.1271 | -46.886 | -45.788 | -45.044 |
| 580.969 | -49.1652 | -46.858 | -45.828 | -44.997 |
| 581.782 | -49.2033 | -46.888 | -45.856 | -44.944 |
| 582.594 | -49.2413 | -46.903 | -45.848 | -44.974 |
| 583.406 | -49.2793 | -46.928 | -45.871 | -44.977 |
| 584.218 | -49.3172 | -46.94 | -45.906 | -45.098 |

*FIG. 3M*

| Frequency (MHz) | Limit | FOP | Supported | Over-extended |
|---|---|---|---|---|
| 585.03 | -49.3552 | -46.901 | -45.939 | -45.162 |
| 585.842 | -49.3931 | -46.895 | -45.978 | -45.182 |
| 586.654 | -49.431 | -46.967 | -46.025 | -45.253 |
| 587.466 | -49.4689 | -47.043 | -46.038 | -45.248 |
| 588.279 | -49.5068 | -47.101 | -46.122 | -45.246 |
| 589.091 | -49.5446 | -47.136 | -46.145 | -45.246 |
| 589.903 | -49.5824 | -47.159 | -46.151 | -45.248 |
| 590.715 | -49.6202 | -47.171 | -46.161 | -45.29 |
| 591.527 | -49.658 | -47.264 | -46.221 | -45.281 |
| 592.339 | -49.6957 | -47.332 | -46.256 | -45.345 |
| 593.151 | -49.7335 | -47.293 | -46.297 | -45.368 |
| 593.963 | -49.7712 | -47.278 | -46.37 | -45.391 |
| 594.776 | -49.8089 | -47.326 | -46.374 | -45.421 |
| 595.588 | -49.8466 | -47.276 | -46.456 | -45.446 |
| 596.4 | -49.8842 | -47.286 | -46.446 | -45.543 |
| 597.212 | -49.9219 | -47.334 | -46.466 | -45.524 |
| 598.024 | -49.9595 | -47.386 | -46.545 | -45.547 |
| 598.836 | -49.9971 | -47.439 | -46.559 | -45.533 |
| 599.648 | -50.0346 | -47.48 | -46.553 | -45.541 |
| 600.46 | -50.0722 | -47.594 | -46.536 | -45.564 |
| 601.273 | -50.1098 | -47.557 | -46.594 | -45.586 |
| 602.085 | -50.1473 | -47.524 | -46.629 | -45.619 |
| 602.897 | -50.1848 | -47.55 | -46.65 | -45.665 |
| 603.709 | -50.2222 | -47.579 | -46.691 | -45.706 |
| 604.521 | -50.2597 | -47.641 | -46.728 | -45.776 |
| 605.333 | -50.2971 | -47.674 | -46.747 | -45.864 |
| 606.145 | -50.3345 | -47.637 | -46.79 | -45.887 |
| 606.957 | -50.3719 | -47.658 | -46.782 | -45.945 |
| 607.77 | -50.4093 | -47.851 | -46.796 | -46.04 |
| 608.582 | -50.4466 | -47.777 | -46.854 | -46.066 |
| 609.394 | -50.484 | -47.819 | -46.891 | -46.239 |
| 610.206 | -50.5213 | -47.843 | -46.876 | -46.237 |
| 611.018 | -50.5586 | -47.878 | -46.959 | -46.246 |
| 611.83 | -50.5958 | -47.953 | -47.004 | -46.322 |
| 612.642 | -50.6331 | -47.92 | -46.982 | -46.254 |
| 613.454 | -50.6703 | -47.983 | -47.041 | -46.241 |
| 614.267 | -50.7075 | -48.021 | -47.012 | -46.283 |
| 615.079 | -50.7447 | -47.985 | -47.132 | -46.2 |
| 615.891 | -50.7819 | -48.128 | -47.134 | -46.293 |
| 616.703 | -50.819 | -48.146 | -47.122 | -46.416 |

| Frequency (MHz) | Limit | FOP | Supported | Over-extended |
|---|---|---|---|---|
| 617.515 | -50.8562 | -48.212 | -47.258 | -46.381 |
| 618.327 | -50.8933 | -48.315 | -47.239 | -46.451 |
| 619.139 | -50.9304 | -48.318 | -47.394 | -46.381 |
| 619.951 | -50.9674 | -48.35 | -47.348 | -46.425 |
| 620.764 | -51.0045 | -48.427 | -47.387 | -46.419 |
| 621.576 | -51.0416 | -48.447 | -47.526 | -46.452 |
| 622.388 | -51.0786 | -48.429 | -47.392 | -46.519 |
| 623.2 | -51.1156 | -48.483 | -47.493 | -46.538 |
| 624.012 | -51.1525 | -48.435 | -47.536 | -46.565 |
| 624.824 | -51.1895 | -48.493 | -47.47 | -46.596 |
| 625.636 | -51.2264 | -48.588 | -47.625 | -46.649 |
| 626.448 | -51.2633 | -48.561 | -47.561 | -46.695 |
| 627.261 | -51.3003 | -48.68 | -47.596 | -46.785 |
| 628.073 | -51.3372 | -48.746 | -47.763 | -46.814 |
| 628.885 | -51.374 | -48.715 | -47.672 | -46.794 |
| 629.697 | -51.4109 | -48.81 | -47.793 | -46.822 |
| 630.509 | -51.4477 | -48.732 | -47.767 | -46.847 |
| 631.321 | -51.4845 | -48.895 | -47.789 | -46.88 |
| 632.133 | -51.5213 | -48.878 | -47.863 | -46.962 |
| 632.945 | -51.558 | -48.761 | -47.761 | -46.892 |
| 633.758 | -51.5948 | -48.944 | -47.954 | -47.002 |
| 634.57 | -51.6315 | -48.907 | -47.793 | -47.057 |
| 635.382 | -51.6682 | -48.903 | -47.897 | -46.956 |
| 636.194 | -51.7049 | -49.039 | -48.008 | -47.08 |
| 637.006 | -51.7416 | -48.918 | -47.925 | -47.125 |
| 637.818 | -51.7783 | -48.982 | -48.028 | -47.117 |
| 638.63 | -51.8149 | -49 | -47.975 | -47.199 |
| 639.442 | -51.8515 | -48.979 | -48.121 | -47.195 |
| 640.255 | -51.8881 | -49.054 | -48.127 | -47.263 |
| 641.067 | -51.9247 | -49.074 | -47.936 | -47.313 |
| 641.879 | -51.9613 | -49.107 | -48.236 | -47.284 |
| 642.691 | -51.9978 | -49.012 | -48.098 | -47.352 |
| 643.503 | -52.0343 | -49.045 | -48.105 | -47.294 |
| 644.315 | -52.0708 | -49.142 | -48.323 | -47.298 |
| 645.127 | -52.1073 | -49.091 | -48.144 | -47.451 |
| 645.939 | -52.1438 | -49.155 | -48.344 | -47.494 |
| 646.752 | -52.1803 | -49.272 | -48.323 | -47.574 |
| 647.564 | -52.2167 | -49.348 | -48.393 | -47.634 |
| 648.376 | -52.2531 | -49.336 | -48.587 | -47.626 |
| 649.188 | -52.2895 | -49.402 | -48.356 | -47.694 |
| 650 | -52.3259 | -49.398 | -48.663 | -47.725 |

*FIG. 3N*

| Frequency (MHz) | FOP | Supported | Over-extended |
|---|---|---|---|
| 0.3 | 136.25 | 143.211 | 147.836 |
| 1.112 | 106.484 | 109.242 | 110.348 |
| 1.924 | 103.539 | 102.566 | 103.672 |
| 2.736 | 99.188 | 102.445 | 104.512 |
| 3.549 | 104.637 | 105.148 | 107.41 |
| 4.361 | 102 | 106.668 | 108.867 |
| 5.173 | 103.477 | 105.055 | 106.332 |
| 5.985 | 101.785 | 103.211 | 103.664 |
| 6.797 | 100.879 | 102.77 | 103.246 |
| 7.609 | 102.094 | 103.711 | 105.191 |
| 8.421 | 102.215 | 104.527 | 106.934 |
| 9.233 | 103.91 | 103.59 | 105.246 |
| 10.046 | 100.207 | 102.762 | 103.481 |
| 10.858 | 101.934 | 102.406 | 103.098 |
| 11.67 | 100.981 | 103.359 | 104.625 |
| 12.482 | 102.231 | 104.594 | 105.531 |
| 13.294 | 101.301 | 104.047 | 105.106 |
| 14.106 | 99.637 | 102.324 | 103.773 |
| 14.918 | 101.664 | 101.027 | 102.977 |
| 15.73 | 100.508 | 101.859 | 104.121 |
| 16.543 | 102.469 | 103.273 | 105.258 |
| 17.355 | 101.82 | 102.996 | 104.793 |
| 18.167 | 100.34 | 101.961 | 104.227 |
| 18.979 | 99.582 | 101.238 | 102.082 |
| 19.791 | 101.152 | 101.984 | 102.145 |
| 20.603 | 102.066 | 102.742 | 104.043 |
| 21.415 | 100.816 | 104.082 | 104.426 |
| 22.227 | 100.211 | 102.758 | 102.465 |
| 23.04 | 100.367 | 100.18 | 101.246 |
| 23.852 | 100.93 | 101.121 | 103.336 |
| 24.664 | 100.883 | 103.059 | 103.402 |
| 25.476 | 100.449 | 102.949 | 102.309 |
| 26.288 | 101.75 | 103.426 | 102.258 |
| 27.1 | 96.484 | 102.055 | 101.297 |
| 27.912 | 98.055 | 101.543 | 102.164 |
| 28.724 | 99.832 | 102.945 | 103.273 |
| 29.537 | 99.766 | 102.453 | 103.59 |
| 30.349 | 99.695 | 102.516 | 103.246 |
| 31.161 | 99.043 | 102.145 | 103.613 |
| 31.973 | 100.516 | 103 | 101.797 |

| Frequency (MHz) | FOP | Supported | Over-extended |
|---|---|---|---|
| 32.785 | 102.223 | 103.793 | 103.93 |
| 33.597 | 104.18 | 102.918 | 105.656 |
| 34.409 | 102.465 | 102.645 | 106.785 |
| 35.221 | 101.848 | 103.539 | 103.348 |
| 36.034 | 99.875 | 102.043 | 104.004 |
| 36.846 | 101.371 | 102.973 | 105.5 |
| 37.658 | 99.43 | 102.801 | 105.106 |
| 38.47 | 101.168 | 102.566 | 106.152 |
| 39.282 | 98.711 | 101.359 | 106.25 |
| 40.094 | 100.168 | 100.43 | 106.465 |
| 40.906 | 99.816 | 99.789 | 107.246 |
| 41.718 | 102.566 | 101.473 | 106.773 |
| 42.531 | 101.406 | 101.262 | 105.984 |
| 43.343 | 101.129 | 103.918 | 103.02 |
| 44.155 | 101.078 | 104.602 | 103.535 |
| 44.967 | 100.309 | 101.723 | 103.195 |
| 45.779 | 100.684 | 101.844 | 107.254 |
| 46.591 | 102.82 | 102.543 | 109.164 |
| 47.403 | 102.555 | 102.879 | 105.477 |
| 48.215 | 100.617 | 103.887 | 105.789 |
| 49.028 | 100.16 | 103.715 | 106.727 |
| 49.84 | 100.191 | 102.895 | 106.371 |
| 50.652 | 100.109 | 104.91 | 107.93 |
| 51.464 | 98.434 | 104.961 | 107.387 |
| 52.276 | 100.238 | 102.844 | 104.285 |
| 53.088 | 98.234 | 102.066 | 105.055 |
| 53.9 | 100.856 | 100.719 | 104.652 |
| 54.712 | 102.141 | 101.047 | 104.02 |
| 55.525 | 103.793 | 99.828 | 102.895 |
| 56.337 | 99.59 | 100.813 | 102.918 |
| 57.149 | 100.574 | 103.07 | 101.555 |
| 57.961 | 99.32 | 102.348 | 103.121 |
| 58.773 | 99.742 | 101.535 | 103.777 |
| 59.585 | 102.492 | 102.758 | 102.746 |
| 60.397 | 100.078 | 102.77 | 102.426 |
| 61.209 | 101.543 | 104.273 | 101.758 |
| 62.022 | 101.41 | 104.273 | 103.75 |
| 62.834 | 102.883 | 103.941 | 105.738 |
| 63.646 | 102.441 | 102.906 | 106.109 |
| 64.458 | 100.078 | 103.496 | 105.039 |

*FIG. 4C*

| Frequency (MHz) | FOP | Supported | Over-extended |
|---|---|---|---|
| 65.27 | 101.523 | 103.523 | 103.25 |
| 66.082 | 102.719 | 102.68 | 104.52 |
| 66.894 | 103.766 | 101.621 | 105.336 |
| 67.706 | 103.41 | 102.707 | 103.664 |
| 68.518 | 102.59 | 103.586 | 103.93 |
| 69.331 | 100.426 | 104.465 | 102.746 |
| 70.143 | 101.137 | 104.203 | 103.41 |
| 70.955 | 101.188 | 102.805 | 105.273 |
| 71.767 | 100.551 | 102.82 | 105.891 |
| 72.579 | 100.863 | 103.156 | 106.996 |
| 73.391 | 101.012 | 103.973 | 104.898 |
| 74.203 | 100.07 | 101.918 | 103.121 |
| 75.016 | 98.816 | 100.938 | 101.957 |
| 75.828 | 100.594 | 101.238 | 102.508 |
| 76.64 | 101.289 | 101.371 | 102.285 |
| 77.452 | 100.231 | 101.566 | 99.363 |
| 78.264 | 98.797 | 105.781 | 98.324 |
| 79.076 | 98.867 | 105.586 | 108.852 |
| 79.888 | 102.219 | 103.109 | 106.512 |
| 80.7 | 101.984 | 103.488 | 107.363 |
| 81.513 | 101.422 | 104.848 | 103.754 |
| 82.325 | 96.176 | 104.363 | 103.031 |
| 83.137 | 98.09 | 102.57 | 104.668 |
| 83.949 | 97.648 | 100.754 | 104.82 |
| 84.761 | 98.203 | 100.461 | 105.168 |
| 85.573 | 96.125 | 101.008 | 104.16 |
| 86.385 | 97.453 | 102.703 | 106.059 |
| 87.197 | 99.496 | 101.832 | 106.356 |
| 88.01 | 99.586 | 101.426 | 106.047 |
| 88.822 | 99.68 | 104.004 | 106.645 |
| 89.634 | 99.887 | 103.484 | 108.43 |
| 90.446 | 99.035 | 103.805 | 107.418 |
| 91.258 | 98.051 | 104.606 | 105.555 |
| 92.07 | 98.457 | 104.516 | 107.465 |
| 92.882 | 98.539 | 105.824 | 106.242 |
| 93.694 | 98.977 | 105.246 | 101.273 |
| 94.506 | 100.199 | 103.234 | 103.719 |
| 95.319 | 101.531 | 104.898 | 107.742 |
| 96.131 | 100.492 | 105.488 | 110.117 |
| 96.943 | 101.227 | 103.012 | 110.727 |

| Frequency (MHz) | FOP | Supported | Over-extended |
|---|---|---|---|
| 97.755 | 98.84 | 101.848 | 109.75 |
| 98.567 | 99.629 | 101.32 | 107.637 |
| 99.379 | 100.313 | 100.852 | 106.34 |
| 100.191 | 100.141 | 99.379 | 103.297 |
| 101.004 | 100.113 | 97.945 | 103.594 |
| 101.816 | 100.504 | 97.25 | 105.023 |
| 102.628 | 99.441 | 100.004 | 104.539 |
| 103.44 | 99.516 | 100.633 | 103.895 |
| 104.252 | 97.992 | 101.148 | 103.934 |
| 105.064 | 100.367 | 99.77 | 102.785 |
| 105.876 | 98.566 | 99.32 | 101.227 |
| 106.688 | 100.496 | 100.082 | 101.352 |
| 107.501 | 99.059 | 99.133 | 103.488 |
| 108.313 | 99.516 | 98.18 | 103.063 |
| 109.125 | 99.133 | 98.559 | 106.039 |
| 109.937 | 99.906 | 99.73 | 104.996 |
| 110.749 | 97.41 | 101.906 | 103.699 |
| 111.561 | 96.234 | 102.754 | 104.43 |
| 112.373 | 96.625 | 104.731 | 103.754 |
| 113.185 | 98.668 | 103.16 | 104.922 |
| 113.998 | 99.109 | 101.332 | 103.777 |
| 114.81 | 100.898 | 102.27 | 102.844 |
| 115.622 | 102.613 | 102.758 | 105.863 |
| 116.434 | 103.211 | 103.16 | 107.715 |
| 117.246 | 102.961 | 101.773 | 106.59 |
| 118.058 | 100.777 | 100.441 | 105.816 |
| 118.87 | 99.672 | 102.418 | 105.18 |
| 119.682 | 100.973 | 101.598 | 107.324 |
| 120.495 | 101.543 | 100.766 | 104.75 |
| 121.307 | 100.594 | 102.254 | 102.07 |
| 122.119 | 98.809 | 102.68 | 98.438 |
| 122.931 | 99.219 | 104.5 | 101.496 |
| 123.743 | 99.219 | 105.734 | 104.578 |
| 124.555 | 99.695 | 106.195 | 103.941 |
| 125.367 | 101.137 | 104.215 | 102.203 |
| 126.179 | 100.582 | 102.281 | 101.309 |
| 126.992 | 101.023 | 102.645 | 103.277 |
| 127.804 | 101.691 | 102.668 | 103.473 |
| 128.616 | 100.223 | 101.609 | 105.488 |
| 129.428 | 98.492 | 101.57 | 103.906 |

*FIG. 4D*

| Frequency (MHz) | FOP | Supported | Over-extended |
|---|---|---|---|
| 130.24 | 99.121 | 102.773 | 100.816 |
| 131.052 | 100.848 | 103.625 | 101.789 |
| 131.864 | 101.004 | 102.531 | 103.043 |
| 132.676 | 100.18 | 99.918 | 102.777 |
| 133.489 | 99.355 | 99.977 | 104.289 |
| 134.301 | 99.297 | 100.777 | 106.41 |
| 135.113 | 99.574 | 100.871 | 108.379 |
| 135.925 | 97.852 | 101.102 | 104.273 |
| 136.737 | 98.02 | 101.481 | 101.481 |
| 137.549 | 97.949 | 103.195 | 100.828 |
| 138.361 | 97.75 | 104.156 | 101.613 |
| 139.173 | 98.242 | 104.258 | 103.898 |
| 139.986 | 97.145 | 103.16 | 105.152 |
| 140.798 | 98.652 | 103.664 | 104.106 |
| 141.61 | 99.945 | 104.277 | 106.063 |
| 142.422 | 99.508 | 104.766 | 105.289 |
| 143.234 | 99.473 | 105.164 | 103.84 |
| 144.046 | 99.402 | 104.977 | 103.262 |
| 144.858 | 99.094 | 103.547 | 102.238 |
| 145.67 | 98.965 | 100.109 | 104.113 |
| 146.483 | 100.035 | 97.281 | 106.344 |
| 147.295 | 99.426 | 99.266 | 105.004 |
| 148.107 | 99.73 | 101.766 | 104.629 |
| 148.919 | 99.277 | 103.793 | 106.547 |
| 149.731 | 100.133 | 104.551 | 106.813 |
| 150.543 | 101.109 | 103.336 | 107.379 |
| 151.355 | 101.801 | 102.555 | 108.18 |
| 152.167 | 101.93 | 103.168 | 108.754 |
| 152.98 | 102.035 | 103.484 | 110.199 |
| 153.792 | 101.457 | 102.168 | 109.141 |
| 154.604 | 101.188 | 102.395 | 107.168 |
| 155.416 | 101.035 | 103.273 | 107.68 |
| 156.228 | 99.418 | 104.566 | 106.484 |
| 157.04 | 98.75 | 103.563 | 106.227 |
| 157.852 | 98.648 | 102.906 | 107.691 |
| 158.664 | 97.898 | 102.156 | 106.477 |
| 159.477 | 98.91 | 101.012 | 105.426 |
| 160.289 | 100.012 | 102.066 | 105.559 |
| 161.101 | 101.039 | 101.789 | 104.816 |
| 161.913 | 99.543 | 101.574 | 103.391 |

| Frequency (MHz) | FOP | Supported | Over-extended |
|---|---|---|---|
| 162.725 | 98.965 | 102.457 | 101.301 |
| 163.537 | 98.039 | 100.547 | 101.32 |
| 164.349 | 97.813 | 99.941 | 103.602 |
| 165.161 | 98.613 | 100.438 | 105.504 |
| 165.974 | 98.723 | 100.77 | 105.18 |
| 166.786 | 99.465 | 101.57 | 105.477 |
| 167.598 | 100.34 | 102.895 | 107.242 |
| 168.41 | 101.551 | 103.723 | 106.559 |
| 169.222 | 101.879 | 102.695 | 103.902 |
| 170.034 | 102.547 | 103.684 | 102.367 |
| 170.846 | 102.852 | 104.156 | 103.449 |
| 171.658 | 103.422 | 104.871 | 104.098 |
| 172.471 | 104.633 | 106.418 | 105.707 |
| 173.283 | 103.996 | 107.301 | 104.641 |
| 174.095 | 103.547 | 106.262 | 103.047 |
| 174.907 | 103.16 | 104.731 | 102.293 |
| 175.719 | 101.918 | 105.566 | 103.398 |
| 176.531 | 100.93 | 107.82 | 103.203 |
| 177.343 | 100.809 | 107.992 | 103.832 |
| 178.155 | 101 | 105.656 | 102.746 |
| 178.968 | 99.27 | 104.883 | 102.844 |
| 179.78 | 100.551 | 105.891 | 103.602 |
| 180.592 | 101.082 | 104.492 | 104.797 |
| 181.404 | 100.227 | 102.977 | 105.301 |
| 182.216 | 99.375 | 103.047 | 104.52 |
| 183.028 | 99.551 | 102.656 | 104.656 |
| 183.84 | 100.898 | 101.773 | 106.07 |
| 184.652 | 101.113 | 103.258 | 107.438 |
| 185.465 | 102.215 | 103.777 | 107.356 |
| 186.277 | 102.023 | 104.527 | 106.113 |
| 187.089 | 102.586 | 105.801 | 104.152 |
| 187.901 | 102.535 | 105.981 | 102.816 |
| 188.713 | 102.602 | 104.148 | 102.371 |
| 189.525 | 102.328 | 101.688 | 102.277 |
| 190.337 | 102.082 | 101.137 | 103.422 |
| 191.149 | 100.84 | 98.988 | 103.652 |
| 191.962 | 99.645 | 98.473 | 104.301 |
| 192.774 | 99.668 | 98.008 | 105.152 |
| 193.586 | 100.316 | 96.637 | 104.43 |
| 194.398 | 99.926 | 97.859 | 104.984 |

*FIG. 4E*

| Frequency (MHz) | FOP | Supported | Over-extended |
|---|---|---|---|
| 195.21 | 100.414 | 99.105 | 106.801 |
| 196.022 | 100.199 | 99.5 | 105.414 |
| 196.834 | 99.551 | 101.664 | 104.465 |
| 197.646 | 99.742 | 103.156 | 104.145 |
| 198.459 | 100.699 | 103.148 | 103.449 |
| 199.271 | 101.316 | 101.75 | 102.281 |
| 200.083 | 101.555 | 102.594 | 100.137 |
| 200.895 | 101.172 | 102.266 | 99.766 |
| 201.707 | 101.402 | 100.984 | 102.75 |
| 202.519 | 101.363 | 100.981 | 103.461 |
| 203.331 | 100.141 | 102.238 | 102.738 |
| 204.143 | 98.84 | 103.875 | 103.867 |
| 204.956 | 97.973 | 103.145 | 104.977 |
| 205.768 | 98.77 | 101.164 | 105.531 |
| 206.58 | 99.168 | 100.406 | 103.777 |
| 207.392 | 99.313 | 100.938 | 100.879 |
| 208.204 | 98.879 | 102.164 | 101.141 |
| 209.016 | 98.023 | 102.762 | 100.203 |
| 209.828 | 98.016 | 102.633 | 99.887 |
| 210.64 | 98.25 | 101.832 | 100.602 |
| 211.453 | 98.348 | 101.504 | 100.477 |
| 212.265 | 99.602 | 100.699 | 100.102 |
| 213.077 | 100.387 | 99.285 | 102.672 |
| 213.889 | 99.543 | 98.109 | 105.258 |
| 214.701 | 100.566 | 97.277 | 105.902 |
| 215.513 | 101.391 | 98.172 | 104.82 |
| 216.325 | 101.727 | 99.617 | 105.055 |
| 217.137 | 102.012 | 100.012 | 105.254 |
| 217.95 | 102.633 | 99.508 | 103.824 |
| 218.762 | 102.102 | 100.762 | 102.481 |
| 219.574 | 101.539 | 103.063 | 102.777 |
| 220.386 | 102.133 | 103.758 | 103.254 |
| 221.198 | 101.254 | 102.258 | 102.313 |
| 222.01 | 100.402 | 101.34 | 100.879 |
| 222.822 | 100.367 | 102.43 | 101.621 |
| 223.634 | 101.438 | 102.316 | 105.75 |
| 224.447 | 100.578 | 102.125 | 107.043 |
| 225.259 | 100.297 | 101.656 | 108.449 |
| 226.071 | 99.746 | 102.328 | 109.273 |
| 226.883 | 100.816 | 104.82 | 108.516 |

| Frequency (MHz) | FOP | Supported | Over-extended |
|---|---|---|---|
| 227.695 | 101.09 | 106.836 | 108.535 |
| 228.507 | 101.563 | 108.5 | 110.719 |
| 229.319 | 102.328 | 107.715 | 109.793 |
| 230.131 | 103.402 | 105.469 | 109 |
| 230.944 | 104.344 | 105.5 | 108.629 |
| 231.756 | 105.266 | 104.184 | 108.445 |
| 232.568 | 105.262 | 102.656 | 106.914 |
| 233.38 | 104.367 | 101.856 | 106.293 |
| 234.192 | 102.883 | 100.492 | 109.387 |
| 235.004 | 101.926 | 101.285 | 110.938 |
| 235.816 | 101.227 | 102.633 | 107.969 |
| 236.628 | 99.926 | 102.367 | 104.848 |
| 237.441 | 98.285 | 101.832 | 102.731 |
| 238.253 | 97.922 | 100.766 | 101.039 |
| 239.065 | 99.109 | 99.621 | 100.156 |
| 239.877 | 100.594 | 98.602 | 100.594 |
| 240.689 | 102.387 | 98.531 | 103.617 |
| 241.501 | 101.555 | 98.613 | 106.082 |
| 242.313 | 101.031 | 98.691 | 107.883 |
| 243.125 | 100.766 | 99.445 | 110.762 |
| 243.938 | 100.773 | 100.68 | 112.559 |
| 244.75 | 101.633 | 100.617 | 113.898 |
| 245.562 | 101.551 | 99.082 | 113.457 |
| 246.374 | 100.207 | 99.789 | 112.004 |
| 247.186 | 99.621 | 101.262 | 109.684 |
| 247.998 | 99.742 | 101.828 | 106.16 |
| 248.81 | 99.316 | 100.941 | 102.555 |
| 249.622 | 98.098 | 100.125 | 101.609 |
| 250.435 | 96.664 | 100.16 | 103.297 |
| 251.247 | 95.875 | 101.293 | 105.195 |
| 252.059 | 97.156 | 100.215 | 104.859 |
| 252.871 | 99.664 | 97.043 | 104.938 |
| 253.683 | 102.063 | 96.25 | 105.813 |
| 254.495 | 104.191 | 96.66 | 106.156 |
| 255.307 | 103.875 | 97.824 | 104.199 |
| 256.119 | 102.145 | 100.777 | 103.059 |
| 256.932 | 99.863 | 104.191 | 104.676 |
| 257.744 | 99.172 | 105.461 | 105.707 |
| 258.556 | 99.063 | 104.918 | 106.395 |
| 259.368 | 99.523 | 103.512 | 106.574 |

FIG. 4F

| Frequency (MHz) | FOP | Supported | Over-extended | Frequency (MHz) | FOP | Supported | Over-extended |
|---|---|---|---|---|---|---|---|
| 260.18 | 99.922 | 102.07 | 106.008 | 292.665 | 100.652 | 101.191 | 110.356 |
| 260.992 | 100.094 | 102.168 | 104.645 | 293.477 | 100.238 | 100.547 | 110.301 |
| 261.804 | 100.473 | 102.598 | 103.59 | 294.289 | 100.141 | 99.121 | 110.902 |
| 262.616 | 100.543 | 101.625 | 103.352 | 295.101 | 99.387 | 98.219 | 111.969 |
| 263.429 | 99.844 | 100.375 | 104.234 | 295.914 | 98.543 | 98.699 | 112.707 |
| 264.241 | 99.867 | 99.379 | 105.645 | 296.726 | 98.465 | 100.363 | 112.871 |
| 265.053 | 99.309 | 99.793 | 106.926 | 297.538 | 98.422 | 101.258 | 111.773 |
| 265.865 | 98.246 | 101.809 | 106.523 | 298.35 | 98.348 | 101.469 | 110.902 |
| 266.677 | 96.723 | 103 | 105.621 | 299.162 | 98.535 | 101.856 | 109.887 |
| 267.489 | 96.309 | 102.273 | 104.969 | 299.974 | 98.934 | 101.926 | 108.215 |
| 268.301 | 96.344 | 102.125 | 104.606 | 300.786 | 98.992 | 102.055 | 107.004 |
| 269.113 | 96.859 | 103.824 | 105.148 | 301.598 | 99.938 | 102.609 | 106.348 |
| 269.926 | 97.625 | 105.121 | 106.797 | 302.411 | 100.164 | 103.672 | 106.66 |
| 270.738 | 98.391 | 104.082 | 107.574 | 303.223 | 99.578 | 103.734 | 107.875 |
| 271.55 | 98 | 102.004 | 107.383 | 304.035 | 97.715 | 103.133 | 107.563 |
| 272.362 | 97.852 | 100.816 | 107.188 | 304.847 | 96.016 | 103.262 | 107.34 |
| 273.174 | 97.43 | 101.301 | 107.32 | 305.659 | 96.531 | 104.305 | 106.844 |
| 273.986 | 97.078 | 102.129 | 108.695 | 306.471 | 97.773 | 105.441 | 106.488 |
| 274.798 | 96.637 | 103.668 | 110.566 | 307.283 | 99.195 | 104.883 | 107.481 |
| 275.61 | 97.121 | 103.832 | 113.016 | 308.095 | 99.781 | 103.086 | 107.992 |
| 276.423 | 97.379 | 103.231 | 114.785 | 308.908 | 99.98 | 102.387 | 106.566 |
| 277.235 | 97.902 | 101.992 | 114.477 | 309.72 | 100.012 | 102.313 | 104.324 |
| 278.047 | 99.004 | 100.32 | 112.266 | 310.532 | 99.078 | 102.047 | 103.793 |
| 278.859 | 101.152 | 99.355 | 108.348 | 311.344 | 99.684 | 102.234 | 104.129 |
| 279.671 | 102.867 | 98.723 | 106.77 | 312.156 | 100.777 | 102.883 | 104.895 |
| 280.483 | 101.469 | 99.598 | 108.426 | 312.968 | 100.402 | 102.227 | 107.488 |
| 281.295 | 99.305 | 102.184 | 110.773 | 313.78 | 99.938 | 101.805 | 110.637 |
| 282.107 | 98.625 | 104.195 | 110.086 | 314.592 | 99.438 | 104.137 | 111.801 |
| 282.92 | 98.754 | 103.738 | 108.125 | 315.405 | 99.309 | 105.977 | 111.188 |
| 283.732 | 99.805 | 103.004 | 107.481 | 316.217 | 98.156 | 106.648 | 109.445 |
| 284.544 | 101.281 | 102.715 | 109.805 | 317.029 | 96.957 | 106.363 | 106.797 |
| 285.356 | 101.207 | 102.168 | 110.063 | 317.841 | 97.371 | 105.582 | 104.227 |
| 286.168 | 99.762 | 102.402 | 106.941 | 318.653 | 98.672 | 104.852 | 102.961 |
| 286.98 | 98.777 | 104.012 | 107.75 | 319.465 | 99.898 | 104.188 | 102.805 |
| 287.792 | 98.57 | 104.465 | 111.523 | 320.277 | 101.211 | 104.656 | 104.02 |
| 288.604 | 98.961 | 103.625 | 112.75 | 321.089 | 102.336 | 105.34 | 106.031 |
| 289.417 | 98.973 | 102.691 | 111.195 | 321.902 | 102.871 | 106.805 | 108.129 |
| 290.229 | 99.367 | 101.926 | 109.602 | 322.714 | 102.766 | 108.981 | 108.059 |
| 291.041 | 99.852 | 100.957 | 110.031 | 323.526 | 101.633 | 109.484 | 106.762 |
| 291.853 | 100.965 | 100.836 | 110.629 | 324.338 | 100.648 | 108.617 | 106.461 |

FIG. 4G

| Frequency (MHz) | FOP | Supported | Over-extended |
|---|---|---|---|
| 325.15 | 99.668 | 107.805 | 107.852 |
| 325.962 | 99.258 | 107.731 | 108.231 |
| 326.774 | 102.145 | 108.148 | 107.793 |
| 327.586 | 104.656 | 106.684 | 108.102 |
| 328.399 | 106.148 | 104.035 | 107.219 |
| 329.211 | 107.184 | 102.383 | 107.414 |
| 330.023 | 106.07 | 102.984 | 108.797 |
| 330.835 | 104.348 | 105.063 | 109.203 |
| 331.647 | 103.961 | 105.68 | 109.051 |
| 332.459 | 105.027 | 104.938 | 108.965 |
| 333.271 | 106.484 | 103.449 | 108.934 |
| 334.083 | 106.266 | 102.453 | 107.613 |
| 334.896 | 104.426 | 102.504 | 108.047 |
| 335.708 | 101.535 | 102.418 | 109.445 |
| 336.52 | 99.809 | 102.434 | 109.473 |
| 337.332 | 99.852 | 101.758 | 109.406 |
| 338.144 | 102.371 | 101.023 | 109.805 |
| 338.956 | 104.121 | 99.57 | 110.391 |
| 339.768 | 105.109 | 99.051 | 110.508 |
| 340.58 | 105.887 | 99.852 | 108.313 |
| 341.393 | 106.453 | 101.356 | 106.039 |
| 342.205 | 107.063 | 102.57 | 105.336 |
| 343.017 | 106.582 | 102.891 | 105.672 |
| 343.829 | 105.152 | 103.012 | 104.883 |
| 344.641 | 104.621 | 103.578 | 104.316 |
| 345.453 | 105.125 | 104.117 | 104.832 |
| 346.265 | 104.875 | 104.695 | 105.066 |
| 347.077 | 104.961 | 105.289 | 106.762 |
| 347.89 | 104.777 | 105.645 | 107.586 |
| 348.702 | 103.793 | 105.414 | 106.629 |
| 349.514 | 103.551 | 103.805 | 105.102 |
| 350.326 | 103.344 | 102.602 | 104.238 |
| 351.138 | 102.035 | 102.121 | 103.852 |
| 351.95 | 100.785 | 102.367 | 103.234 |
| 352.762 | 101.063 | 102.836 | 103.047 |
| 353.574 | 102.297 | 102.082 | 102.508 |
| 354.387 | 104.313 | 101.293 | 103.172 |
| 355.199 | 106.719 | 100.723 | 103.902 |
| 356.011 | 107.356 | 100.668 | 104.113 |
| 356.823 | 107.281 | 100.695 | 105.356 |

| Frequency (MHz) | FOP | Supported | Over-extended |
|---|---|---|---|
| 357.635 | 107.199 | 100.516 | 105.785 |
| 358.447 | 106.973 | 100.711 | 105.258 |
| 359.259 | 106.77 | 101.895 | 105.242 |
| 360.071 | 106.137 | 102.738 | 105.902 |
| 360.884 | 105.086 | 102.934 | 105.5 |
| 361.696 | 104.57 | 103.367 | 104.41 |
| 362.508 | 105.238 | 104.301 | 102.758 |
| 363.32 | 105.281 | 105.699 | 103.066 |
| 364.132 | 104.52 | 105.52 | 105.023 |
| 364.944 | 104.469 | 104.418 | 106.238 |
| 365.756 | 103.594 | 103.336 | 107.82 |
| 366.568 | 102.758 | 103.199 | 109.621 |
| 367.381 | 102.742 | 103.047 | 109.465 |
| 368.193 | 102.223 | 102.617 | 106.543 |
| 369.005 | 101.727 | 102.234 | 104.918 |
| 369.817 | 102.231 | 102.66 | 105.633 |
| 370.629 | 103.59 | 104.648 | 106.785 |
| 371.441 | 106.719 | 106.734 | 107.996 |
| 372.253 | 108.906 | 106.02 | 109.555 |
| 373.065 | 109.293 | 103.211 | 111.926 |
| 373.878 | 108.949 | 101.496 | 113.762 |
| 374.69 | 107.723 | 101.945 | 113.406 |
| 375.502 | 106.848 | 103.109 | 111.59 |
| 376.314 | 106.445 | 104.871 | 110.246 |
| 377.126 | 105.559 | 107.141 | 110.895 |
| 377.938 | 104.012 | 108.191 | 110.875 |
| 378.75 | 103.836 | 108.66 | 108.789 |
| 379.562 | 104.453 | 108.746 | 108.074 |
| 380.375 | 105.316 | 109.035 | 109.371 |
| 381.187 | 106.211 | 109.676 | 111.109 |
| 381.999 | 107.477 | 108.566 | 110.859 |
| 382.811 | 108.231 | 106.984 | 110.422 |
| 383.623 | 109.492 | 105.195 | 112.563 |
| 384.435 | 109.137 | 103.602 | 114.481 |
| 385.247 | 106.945 | 102.426 | 113.676 |
| 386.059 | 104.336 | 101.621 | 111.91 |
| 386.872 | 102.145 | 100.531 | 109.809 |
| 387.684 | 100.168 | 100.199 | 108.199 |
| 388.496 | 99.609 | 100.191 | 107.82 |
| 389.308 | 100.848 | 100.254 | 109.875 |

*FIG. 4H*

| Frequency (MHz) | FOP | Supported | Over-extended |
|---|---|---|---|
| 390.12 | 103.199 | 101.332 | 112.332 |
| 390.932 | 105.195 | 102.856 | 114.039 |
| 391.744 | 105.883 | 103.434 | 115.883 |
| 392.556 | 106.32 | 103.598 | 119.266 |
| 393.369 | 107.164 | 104.711 | 121.07 |
| 394.181 | 107.297 | 105.547 | 119.43 |
| 394.993 | 107.211 | 104.816 | 116.613 |
| 395.805 | 107.418 | 102.973 | 113.945 |
| 396.617 | 107.07 | 101.106 | 111.625 |
| 397.429 | 105.563 | 99.563 | 110.297 |
| 398.241 | 105.133 | 98.73 | 109.184 |
| 399.053 | 107.063 | 99.316 | 108.496 |
| 399.866 | 107.965 | 100.07 | 107.188 |
| 400.678 | 106.879 | 100.766 | 104.945 |
| 401.49 | 105.215 | 102.207 | 103.059 |
| 402.302 | 104.992 | 103.117 | 102.082 |
| 403.114 | 105.258 | 103.293 | 102.703 |
| 403.926 | 105.059 | 103.688 | 103.75 |
| 404.738 | 105.387 | 104.883 | 104.691 |
| 405.55 | 105.797 | 106.777 | 106.199 |
| 406.363 | 106.074 | 109.078 | 109.098 |
| 407.175 | 106.844 | 110.461 | 113.223 |
| 407.987 | 108.129 | 109.164 | 114.371 |
| 408.799 | 109.609 | 105.273 | 112.777 |
| 409.611 | 110.293 | 102.863 | 110.602 |
| 410.423 | 109.723 | 103.52 | 109.859 |
| 411.235 | 106.895 | 104.578 | 110.266 |
| 412.047 | 103.473 | 104.391 | 109.617 |
| 412.86 | 101.844 | 104.543 | 108.191 |
| 413.672 | 102.02 | 104.758 | 106.5 |
| 414.484 | 102.773 | 103.828 | 105.453 |
| 415.296 | 103.148 | 102.914 | 104.871 |
| 416.108 | 103.613 | 102.52 | 104.672 |
| 416.92 | 103.871 | 103.285 | 105.617 |
| 417.732 | 104.195 | 103.805 | 108.117 |
| 418.544 | 104.41 | 104.395 | 110.949 |
| 419.357 | 104.453 | 103.957 | 113.215 |
| 420.169 | 104.27 | 101.984 | 114.082 |
| 420.981 | 103.277 | 101.117 | 113.566 |
| 421.793 | 102.09 | 102.453 | 112.168 |

| Frequency (MHz) | FOP | Supported | Over-extended |
|---|---|---|---|
| 422.605 | 101.699 | 104.836 | 110.953 |
| 423.417 | 102.52 | 106.68 | 109 |
| 424.229 | 103.426 | 107.07 | 107.008 |
| 425.041 | 103.137 | 106.34 | 106.219 |
| 425.854 | 102.672 | 106.215 | 105.566 |
| 426.666 | 102.773 | 106.231 | 106.164 |
| 427.478 | 104.609 | 105.098 | 106.359 |
| 428.29 | 105.672 | 104.168 | 104.734 |
| 429.102 | 105.57 | 104.656 | 103.543 |
| 429.914 | 106.199 | 105.559 | 104.113 |
| 430.726 | 107.637 | 105.91 | 105.723 |
| 431.538 | 108.844 | 105.246 | 105.438 |
| 432.351 | 108.898 | 105.504 | 103.773 |
| 433.163 | 107.543 | 107.262 | 103.934 |
| 433.975 | 106.34 | 108.309 | 106.117 |
| 434.787 | 105.434 | 107.652 | 107.676 |
| 435.599 | 104.227 | 106.641 | 108.152 |
| 436.411 | 103.113 | 105.41 | 108.18 |
| 437.223 | 103.074 | 104.5 | 107.578 |
| 438.035 | 103.797 | 104.25 | 107.52 |
| 438.848 | 104.859 | 103.363 | 106.727 |
| 439.66 | 105.129 | 102.824 | 105.066 |
| 440.472 | 104.871 | 102.973 | 103.863 |
| 441.284 | 104.531 | 103.652 | 102.707 |
| 442.096 | 104.676 | 104.527 | 101.074 |
| 442.908 | 106.82 | 104.859 | 100.031 |
| 443.72 | 109.176 | 105.098 | 100.566 |
| 444.532 | 109.402 | 105.293 | 101.641 |
| 445.345 | 108.688 | 104.516 | 102.078 |
| 446.157 | 108.766 | 103.387 | 101.754 |
| 446.969 | 108.731 | 103.586 | 102.055 |
| 447.781 | 107.863 | 103.711 | 102.598 |
| 448.593 | 107.676 | 103.09 | 102.902 |
| 449.405 | 107.867 | 102.723 | 103.984 |
| 450.217 | 107.738 | 102.707 | 105.492 |
| 451.029 | 106.344 | 102.68 | 107.41 |
| 451.842 | 105.164 | 102.375 | 108.801 |
| 452.654 | 104.223 | 101.52 | 108.703 |
| 453.466 | 103.488 | 100.625 | 107.148 |
| 454.278 | 103.668 | 99.316 | 106.289 |

*FIG. 4I*

| Frequency (MHz) | FOP | Supported | Over-extended |
|---|---|---|---|
| 455.09 | 104.199 | 99.035 | 106.516 |
| 455.902 | 105.766 | 100.434 | 107.398 |
| 456.714 | 107.449 | 102.488 | 108.895 |
| 457.526 | 108.641 | 104.156 | 109.539 |
| 458.339 | 109.566 | 105.688 | 109.313 |
| 459.151 | 109.664 | 105.891 | 109.981 |
| 459.963 | 109.664 | 104.711 | 111.496 |
| 460.775 | 109.356 | 103.449 | 112.121 |
| 461.587 | 108.77 | 102.406 | 112.59 |
| 462.399 | 108.031 | 101.52 | 111.945 |
| 463.211 | 106.531 | 101.945 | 110.145 |
| 464.023 | 104.965 | 103.547 | 108.879 |
| 464.836 | 103.895 | 104.496 | 108.586 |
| 465.648 | 104.672 | 104.395 | 107.781 |
| 466.46 | 106.238 | 104.281 | 107.32 |
| 467.272 | 107.84 | 104.742 | 108.277 |
| 468.084 | 108.731 | 105.613 | 109.008 |
| 468.896 | 108.699 | 106.16 | 109.371 |
| 469.708 | 108.504 | 106.301 | 108.828 |
| 470.52 | 108.723 | 105.922 | 108.77 |
| 471.333 | 108.34 | 105.465 | 109.035 |
| 472.145 | 107.637 | 105.098 | 109.25 |
| 472.957 | 107.285 | 104.746 | 110.703 |
| 473.769 | 107.387 | 104.328 | 111.109 |
| 474.581 | 106.941 | 104.324 | 110.066 |
| 475.393 | 105.816 | 105.152 | 109.227 |
| 476.205 | 105.125 | 105.961 | 109.289 |
| 477.017 | 104.066 | 106.305 | 109.211 |
| 477.83 | 102.758 | 105.875 | 109.742 |
| 478.642 | 102.285 | 104.711 | 111.453 |
| 479.454 | 102.137 | 104.125 | 112.211 |
| 480.266 | 102.246 | 104.648 | 112.16 |
| 481.078 | 101.805 | 105.465 | 112.457 |
| 481.89 | 101.227 | 105.82 | 113.805 |
| 482.702 | 102.367 | 105.949 | 115.582 |
| 483.514 | 104.109 | 106.461 | 117.469 |
| 484.327 | 105.313 | 106.945 | 117.91 |
| 485.139 | 106.172 | 107.016 | 116.316 |
| 485.951 | 105.852 | 106.57 | 114.52 |
| 486.763 | 104.793 | 106.234 | 112.5 |

| Frequency (MHz) | FOP | Supported | Over-extended |
|---|---|---|---|
| 487.575 | 104.191 | 106.234 | 110.457 |
| 488.387 | 104.434 | 106.066 | 109.527 |
| 489.199 | 105.383 | 105.648 | 110.813 |
| 490.011 | 106.109 | 106.125 | 112.981 |
| 490.824 | 106.039 | 107.145 | 113.949 |
| 491.636 | 105.656 | 108.406 | 113.973 |
| 492.448 | 105.715 | 108.648 | 113.668 |
| 493.26 | 105.781 | 108.055 | 113.961 |
| 494.072 | 106.441 | 107.332 | 113.219 |
| 494.884 | 106.449 | 107.309 | 109.93 |
| 495.696 | 105.441 | 107.672 | 106.371 |
| 496.508 | 104.379 | 107.789 | 104.527 |
| 497.321 | 103.074 | 107.176 | 105.008 |
| 498.133 | 101.988 | 106.703 | 108.441 |
| 498.945 | 102.305 | 107.133 | 112.981 |
| 499.757 | 103.664 | 108.063 | 115.734 |
| 500.569 | 103.93 | 108.199 | 115.793 |
| 501.381 | 103.043 | 107.75 | 115.5 |
| 502.193 | 102.141 | 107.387 | 116.5 |
| 503.005 | 100.824 | 107.16 | 116.773 |
| 503.818 | 100.074 | 107.297 | 115.023 |
| 504.63 | 100.656 | 108.234 | 111.828 |
| 505.442 | 102.414 | 108.582 | 110.074 |
| 506.254 | 103.996 | 108.395 | 110.84 |
| 507.066 | 104.926 | 109.18 | 113.277 |
| 507.878 | 105.91 | 110.113 | 115.922 |
| 508.69 | 106.816 | 109.902 | 116.82 |
| 509.502 | 106.969 | 108.164 | 115.762 |
| 510.315 | 105.688 | 105.766 | 115.547 |
| 511.127 | 103.996 | 104.078 | 116.289 |
| 511.939 | 103.758 | 103.313 | 117.234 |
| 512.751 | 104.613 | 103.227 | 116.148 |
| 513.563 | 105.832 | 104.176 | 113.016 |
| 514.375 | 106.746 | 105.742 | 110.707 |
| 515.187 | 107.481 | 107.137 | 109.242 |
| 515.999 | 108.473 | 107.715 | 107.594 |
| 516.812 | 109.551 | 107.875 | 107.332 |
| 517.624 | 109.891 | 107.824 | 108.656 |
| 518.436 | 109.066 | 107.332 | 109.016 |
| 519.248 | 107.492 | 105.973 | 107.582 |

*FIG. 4J*

| Frequency (MHz) | FOP | Supported | Over-extended |
|---|---|---|---|
| 520.06 | 105.684 | 104.797 | 105.363 |
| 520.872 | 104.285 | 104.809 | 103.848 |
| 521.684 | 104.305 | 105.281 | 103.844 |
| 522.496 | 106.051 | 105.481 | 105.234 |
| 523.309 | 108.191 | 105.668 | 106.891 |
| 524.121 | 109.875 | 105.32 | 107.57 |
| 524.933 | 111.707 | 104.184 | 108.102 |
| 525.745 | 113.059 | 103.856 | 108.465 |
| 526.557 | 113.059 | 104.242 | 108.356 |
| 527.369 | 111.906 | 104.426 | 108.688 |
| 528.181 | 110.301 | 104.531 | 109.555 |
| 528.993 | 109.281 | 104.523 | 110.891 |
| 529.806 | 108.867 | 104.43 | 113.5 |
| 530.618 | 108.641 | 103.805 | 116.356 |
| 531.43 | 108.363 | 102.945 | 118.738 |
| 532.242 | 107.773 | 102.52 | 120.441 |
| 533.054 | 107.453 | 102.719 | 119.531 |
| 533.866 | 107.496 | 102.566 | 116.961 |
| 534.678 | 108.004 | 101.621 | 115.313 |
| 535.49 | 108.856 | 100.574 | 113.773 |
| 536.303 | 109.242 | 99.297 | 112.445 |
| 537.115 | 108.586 | 97.961 | 111.84 |
| 537.927 | 106.711 | 97.195 | 111.688 |
| 538.739 | 104.91 | 96.859 | 112.195 |
| 539.551 | 103.801 | 97.273 | 113.527 |
| 540.363 | 103.832 | 98.422 | 114.309 |
| 541.175 | 104.469 | 99.887 | 114.938 |
| 541.987 | 104.539 | 100.934 | 116.125 |
| 542.8 | 103.375 | 101.449 | 117.207 |
| 543.612 | 102.59 | 101.516 | 117.551 |
| 544.424 | 102.813 | 101.5 | 117.188 |
| 545.236 | 102.754 | 100.75 | 114.535 |
| 546.048 | 101.984 | 99.563 | 110.996 |
| 546.86 | 101.293 | 99.035 | 108.824 |
| 547.672 | 101.402 | 99.359 | 108.211 |
| 548.484 | 101.852 | 101.035 | 107.414 |
| 549.297 | 101.738 | 102.637 | 106.215 |
| 550.109 | 101.152 | 102.707 | 107.234 |
| 550.921 | 101.289 | 102.223 | 108.973 |
| 551.733 | 102.059 | 102.367 | 109.219 |

| Frequency (MHz) | FOP | Supported | Over-extended |
|---|---|---|---|
| 552.545 | 102.859 | 103.059 | 108.672 |
| 553.357 | 104.523 | 103.801 | 107.824 |
| 554.169 | 106.727 | 104.395 | 108.109 |
| 554.981 | 107.148 | 104.387 | 111.305 |
| 555.794 | 105.422 | 103.957 | 114.731 |
| 556.606 | 103.231 | 103.481 | 115.969 |
| 557.418 | 102.199 | 104.148 | 115.902 |
| 558.23 | 102.363 | 105.231 | 115.234 |
| 559.042 | 103.438 | 105.008 | 114.121 |
| 559.854 | 104.898 | 104.391 | 112.477 |
| 560.666 | 106.731 | 104.426 | 111.074 |
| 561.478 | 108.715 | 105.082 | 110.547 |
| 562.291 | 109.527 | 106.133 | 110.945 |
| 563.103 | 108.809 | 106.707 | 111.742 |
| 563.915 | 107.137 | 106.785 | 112.789 |
| 564.727 | 105.512 | 106.656 | 114.203 |
| 565.539 | 104.602 | 107.344 | 114.629 |
| 566.351 | 104.734 | 108.551 | 114.027 |
| 567.163 | 105.117 | 109.215 | 113.023 |
| 567.975 | 106.106 | 109.609 | 112.641 |
| 568.788 | 107.883 | 109.477 | 112.652 |
| 569.6 | 108.512 | 108.41 | 112.02 |
| 570.412 | 107.359 | 107.648 | 111.789 |
| 571.224 | 105.449 | 107.531 | 112.5 |
| 572.036 | 103.766 | 107.91 | 112.664 |
| 572.848 | 103.422 | 108.16 | 111.852 |
| 573.66 | 103.5 | 107.438 | 110.672 |
| 574.472 | 103.211 | 105.777 | 109.82 |
| 575.285 | 103.262 | 103.578 | 109.363 |
| 576.097 | 103.41 | 101.621 | 108.992 |
| 576.909 | 102.699 | 100.582 | 108.766 |
| 577.721 | 102.137 | 100.809 | 108.297 |
| 578.533 | 101.973 | 101.906 | 107.508 |
| 579.345 | 102.68 | 102.781 | 106.227 |
| 580.157 | 103.191 | 102.102 | 105.563 |
| 580.969 | 102.934 | 100.098 | 106.148 |
| 581.782 | 102.012 | 97.875 | 107.68 |
| 582.594 | 101.324 | 96.707 | 110.012 |
| 583.406 | 101.414 | 97.723 | 112.703 |
| 584.218 | 102.074 | 100.336 | 115.43 |

*FIG. 4K*

| Frequency (MHz) | FOP | Supported | Over-extended |
|---|---|---|---|
| 585.03 | 103.168 | 102.777 | 117.004 |
| 585.842 | 104.527 | 104.934 | 116.875 |
| 586.654 | 105.152 | 106.34 | 115.914 |
| 587.466 | 104.492 | 105.82 | 114.695 |
| 588.279 | 104.305 | 104.457 | 112.828 |
| 589.091 | 105.324 | 103.316 | 111.238 |
| 589.903 | 106.566 | 103 | 111.32 |
| 590.715 | 107.172 | 103.5 | 112.063 |
| 591.527 | 106.961 | 104.277 | 111.539 |
| 592.339 | 106.984 | 105.231 | 110.969 |
| 593.151 | 107.391 | 106.168 | 111.789 |
| 593.963 | 107.434 | 106.402 | 113.277 |
| 594.776 | 107.516 | 106.25 | 114.379 |
| 595.588 | 108.254 | 105.859 | 113.559 |
| 596.4 | 109.977 | 104.84 | 112.098 |
| 597.212 | 111.629 | 103.383 | 111.117 |
| 598.024 | 111.648 | 102.688 | 110.59 |
| 598.836 | 109.945 | 102.879 | 110.715 |
| 599.648 | 108.844 | 103.863 | 110.356 |
| 600.46 | 108.695 | 105.504 | 109.395 |
| 601.273 | 108.328 | 106.555 | 108.922 |
| 602.085 | 107.734 | 107.035 | 109.027 |
| 602.897 | 107.363 | 107.063 | 110.535 |
| 603.709 | 107.785 | 106.805 | 112.984 |
| 604.521 | 107.867 | 106.57 | 114.699 |
| 605.333 | 107.188 | 106.27 | 115.184 |
| 606.145 | 107.207 | 105.563 | 113.965 |
| 606.957 | 108.094 | 105.172 | 112.035 |
| 607.77 | 108.926 | 106.184 | 110.531 |
| 608.582 | 108.133 | 107.563 | 109.762 |
| 609.394 | 106.586 | 108.367 | 109.359 |
| 610.206 | 106.328 | 108.688 | 108.453 |
| 611.018 | 107.043 | 108.949 | 106.41 |
| 611.83 | 106.719 | 108.887 | 104.055 |
| 612.642 | 105.57 | 108.356 | 102.68 |
| 613.454 | 105.703 | 108.055 | 104.289 |
| 614.267 | 107.574 | 108.121 | 108 |
| 615.079 | 110.004 | 107.977 | 110.746 |
| 615.891 | 111.91 | 106.852 | 111.32 |
| 616.703 | 112.734 | 105.41 | 109.957 |

| Frequency (MHz) | FOP | Supported | Over-extended |
|---|---|---|---|
| 617.515 | 112.785 | 104.453 | 107.563 |
| 618.327 | 111.473 | 103.699 | 106.266 |
| 619.139 | 108.691 | 103.023 | 107.574 |
| 619.951 | 105.555 | 101.906 | 109.387 |
| 620.764 | 103.148 | 100.934 | 110.328 |
| 621.576 | 101.856 | 100.91 | 109.762 |
| 622.388 | 101.875 | 102.121 | 108.574 |
| 623.2 | 102.953 | 104.191 | 108.207 |
| 624.012 | 104.273 | 106.266 | 108.586 |
| 624.824 | 105.348 | 107.164 | 109.082 |
| 625.636 | 106.703 | 106.91 | 110.363 |
| 626.448 | 108.266 | 105.938 | 112.801 |
| 627.261 | 109.777 | 104.922 | 114.293 |
| 628.073 | 110.203 | 104.469 | 113.07 |
| 628.885 | 109.344 | 104.356 | 110.969 |
| 629.697 | 108.281 | 103.637 | 109.434 |
| 630.509 | 107.176 | 102.578 | 109.219 |
| 631.321 | 105.52 | 101.231 | 109.641 |
| 632.133 | 103.586 | 99.887 | 109.434 |
| 632.945 | 102.289 | 99.035 | 108.805 |
| 633.758 | 101.383 | 98.988 | 107.918 |
| 634.57 | 100.898 | 100.207 | 107.008 |
| 635.382 | 101.113 | 101.086 | 106.395 |
| 636.194 | 101.176 | 101.227 | 107.074 |
| 637.006 | 101.246 | 101.313 | 108.031 |
| 637.818 | 101.523 | 101.18 | 108.734 |
| 638.63 | 101.859 | 101.305 | 109.609 |
| 639.442 | 101.758 | 101.949 | 110.555 |
| 640.255 | 101.078 | 102.75 | 111.777 |
| 641.067 | 100.293 | 103.789 | 113.106 |
| 641.879 | 100.324 | 104.684 | 113.191 |
| 642.691 | 101.121 | 105.613 | 112.25 |
| 643.503 | 102.332 | 106.32 | 112.016 |
| 644.315 | 103.723 | 105.742 | 112.156 |
| 645.127 | 105.398 | 104.504 | 112.195 |
| 645.939 | 107.09 | 103.68 | 111.938 |
| 646.752 | 108.219 | 103.617 | 112.102 |
| 647.564 | 108.934 | 104.324 | 113.305 |
| 648.376 | 109.074 | 105.133 | 114.113 |
| 649.188 | 109.043 | 105.215 | 114.445 |
| 650 | 109.34 | 105.301 | 114.613 |

FIG. 4L

| Frequency (MHz) | FOP | Supported | Over-extended |
|---|---|---|---|
| 0.3 | -66.8552 | -67.3333 | -69.1285 |
| 1.112 | -85.1969 | -86.34 | -90.9507 |
| 1.924 | -79.3991 | -85.0535 | -83.7717 |
| 2.736 | -80.9816 | -83.4329 | -79.5808 |
| 3.549 | -74.9332 | -81.1102 | -78.6404 |
| 4.361 | -74.05 | -79.2584 | -76.612 |
| 5.173 | -76.3545 | -78.4169 | -78.6727 |
| 5.985 | -69.7603 | -73.9168 | -77.1755 |
| 6.797 | -74.181 | -72.5478 | -76.9296 |
| 7.609 | -68.1323 | -71.5378 | -73.5665 |
| 8.421 | -71.8224 | -69.2401 | -69.7702 |
| 9.233 | -68.1637 | -68.7267 | -69.513 |
| 10.046 | -66.7252 | -68.4342 | -70.7012 |
| 10.858 | -67.2896 | -70.5066 | -73.6615 |
| 11.67 | -64.9029 | -73.4002 | -69.1449 |
| 12.482 | -63.7121 | -70.5124 | -65.797 |
| 13.294 | -64.1215 | -71.8355 | -64.3287 |
| 14.106 | -68.5216 | -70.739 | -66.2942 |
| 14.918 | -61.0981 | -67.6217 | -66.1616 |
| 15.73 | -60.0279 | -71.0131 | -67.6433 |
| 16.543 | -60.3367 | -63.2346 | -69.5389 |
| 17.355 | -61.27 | -74.1194 | -63.3861 |
| 18.167 | -62.3855 | -62.0508 | -64.59 |
| 18.979 | -59.815 | -67.1705 | -67.0769 |
| 19.791 | -56.8509 | -62.4183 | -68.8765 |
| 20.603 | -59.782 | -65.587 | -64.7343 |
| 21.415 | -61.006 | -61.8069 | -59.5472 |
| 22.227 | -57.0326 | -66.2495 | -63.8593 |
| 23.04 | -52.1488 | -64.6034 | -62.3184 |
| 23.852 | -55.2445 | -58.6313 | -61.2923 |
| 24.664 | -57.9119 | -60.2283 | -65.6922 |
| 25.476 | -52.5533 | -62.0846 | -60.4837 |
| 26.288 | -53.823 | -62.4622 | -58.2019 |
| 27.1 | -55.8325 | -62.8988 | -60.731 |
| 27.912 | -58.4789 | -57.1343 | -60.7818 |
| 28.724 | -54.6277 | -60.1188 | -58.6558 |
| 29.537 | -52.7412 | -59.4724 | -60.1062 |
| 30.349 | -52.6206 | -59.9747 | -62.5148 |
| 31.161 | -51.2375 | -59.3399 | -59.5617 |
| 31.973 | -53.0536 | -60.3633 | -61.703 |

| Frequency (MHz) | FOP | Supported | Over-extended |
|---|---|---|---|
| 32.785 | -63.176 | -53.492 | -54.6302 |
| 33.597 | -58.0752 | -55.029 | -56.8652 |
| 34.409 | -56.6551 | -52.9116 | -56.3412 |
| 35.221 | -53.8773 | -60.3369 | -55.9036 |
| 36.034 | -54.4105 | -56.85 | -60.862 |
| 36.846 | -54.4048 | -55.5778 | -59.0278 |
| 37.658 | -52.176 | -58.5716 | -54.6518 |
| 38.47 | -49.3894 | -56.3382 | -51.8299 |
| 39.282 | -52.0055 | -58.4944 | -57.4194 |
| 40.094 | -56.0359 | -56.9085 | -59.773 |
| 40.906 | -56.9968 | -56.9051 | -54.5852 |
| 41.718 | -52.9475 | -54.2305 | -58.0622 |
| 42.531 | -48.1632 | -54.791 | -54.3867 |
| 43.343 | -46.6981 | -55.1303 | -56.0399 |
| 44.155 | -48.705 | -54.0778 | -56.2601 |
| 44.967 | -50.4225 | -58.6877 | -53.8426 |
| 45.779 | -57.8096 | -52.5501 | -55.7708 |
| 46.591 | -53.4339 | -50.6483 | -59.6511 |
| 47.403 | -47.6302 | -51.1481 | -60.008 |
| 48.215 | -46.5502 | -50.3196 | -54.5662 |
| 49.028 | -49.0524 | -46.6856 | -51.9132 |
| 49.84 | -47.7669 | -46.2511 | -53.0456 |
| 50.652 | -45.3018 | -47.5403 | -52.695 |
| 51.464 | -43.9294 | -50.7597 | -51.6504 |
| 52.276 | -45.7085 | -49.7595 | -49.3762 |
| 53.088 | -42.7452 | -51.2949 | -48.3031 |
| 53.9 | -42.0892 | -51.1246 | -50.526 |
| 54.712 | -39.9743 | -48.0089 | -53.07 |
| 55.525 | -43.6859 | -48.9118 | -51.9463 |
| 56.337 | -43.4466 | -50.5495 | -52.5435 |
| 57.149 | -47.1415 | -51.8427 | -53.5607 |
| 57.961 | -47.2363 | -49.4133 | -46.7847 |
| 58.773 | -43.9269 | -49.7736 | -49.0613 |
| 59.585 | -44.3271 | -48.2264 | -51.6852 |
| 60.397 | -47.3697 | -47.9567 | -50.5268 |
| 61.209 | -46.4832 | -50.379 | -49.3863 |
| 62.022 | -45.1155 | -50.6777 | -49.0255 |
| 62.834 | -44.2405 | -48.1805 | -49.1337 |
| 63.646 | -45.9571 | -49.7586 | -48.5869 |
| 64.458 | -49.4582 | -50.1402 | -46.4449 |

FIG. 5C

| Frequency (MHz) | FOP | Supported | Over-extended |
|---|---|---|---|
| 65.27 | -44.0754 | -51.4283 | -47.3522 |
| 66.082 | -40.3381 | -50.9183 | -47.1122 |
| 66.894 | -42.1265 | -49.1333 | -45.2809 |
| 67.706 | -46.418 | -48.9037 | -46.9979 |
| 68.518 | -44.9858 | -51.4161 | -45.6308 |
| 69.331 | -45.787 | -45.5395 | -44.7814 |
| 70.143 | -46.9499 | -46.5612 | -44.6257 |
| 70.955 | -44.7654 | -48.5514 | -44.7337 |
| 71.767 | -46.4017 | -47.206 | -46.4766 |
| 72.579 | -51.4804 | -46.3779 | -46.2772 |
| 73.391 | -42.0966 | -53.4974 | -49.1609 |
| 74.203 | -43.4919 | -52.376 | -45.8375 |
| 75.016 | -43.8814 | -50.253 | -47.9944 |
| 75.828 | -44.5724 | -51.3748 | -48.6852 |
| 76.64 | -45.8392 | -51.8756 | -47.5358 |
| 77.452 | -44.2032 | -48.1196 | -47.0505 |
| 78.264 | -43.195 | -45.776 | -46.8865 |
| 79.076 | -46.8805 | -43.3492 | -50.8844 |
| 79.888 | -48.7271 | -43.3359 | -53.565 |
| 80.7 | -41.2565 | -45.7339 | -54.5139 |
| 81.513 | -39.7005 | -49.0547 | -51.8374 |
| 82.325 | -39.462 | -47.9523 | -54.8991 |
| 83.137 | -38.1148 | -44.6963 | -55.5345 |
| 83.949 | -37.8292 | -48.0885 | -51.8634 |
| 84.761 | -37.6232 | -50.653 | -48.8779 |
| 85.573 | -37.7832 | -44.8513 | -49.639 |
| 86.385 | -38.385 | -44.1578 | -44.5171 |
| 87.197 | -41.0278 | -42.3679 | -43.9292 |
| 88.01 | -38.9003 | -41.9706 | -42.5029 |
| 88.822 | -37.2548 | -42.5966 | -41.2281 |
| 89.634 | -43.5349 | -44.384 | -42.0141 |
| 90.446 | -41.9578 | -41.6097 | -42.7595 |
| 91.258 | -40.336 | -40.1323 | -40.7679 |
| 92.07 | -41.6637 | -41.5627 | -43.1493 |
| 92.882 | -40.9788 | -41.7357 | -47.6058 |
| 93.694 | -40.6661 | -43.3568 | -51.1285 |
| 94.506 | -41.9005 | -49.8411 | -49.9769 |
| 95.319 | -38.583 | -49.8692 | -47.1759 |
| 96.131 | -35.9982 | -46.0068 | -47.3365 |
| 96.943 | -38.8321 | -42.8619 | -45.8756 |

| Frequency (MHz) | FOP | Supported | Over-extended |
|---|---|---|---|
| 97.755 | -39.8067 | -40.389 | -44.648 |
| 98.567 | -36.6207 | -40.1641 | -46.635 |
| 99.379 | -35.1476 | -41.667 | -46.493 |
| 100.191 | -34.7648 | -45.7664 | -47.3295 |
| 101.004 | -38.2998 | -43.2284 | -51.8292 |
| 101.816 | -35.6446 | -39.3885 | -53.7417 |
| 102.628 | -35.1698 | -38.2669 | -52.7011 |
| 103.44 | -36.8369 | -40.1946 | -57.3623 |
| 104.252 | -34.401 | -41.8423 | -50.0883 |
| 105.064 | -33.3624 | -48.9482 | -46.1713 |
| 105.876 | -37.0058 | -44.8262 | -43.3819 |
| 106.688 | -41.9657 | -42.0135 | -40.5014 |
| 107.501 | -39.0292 | -41.6372 | -40.6662 |
| 108.313 | -37.7068 | -41.8383 | -43.1192 |
| 109.125 | -38.663 | -43.7165 | -44.5123 |
| 109.937 | -34.4702 | -45.0145 | -45.3214 |
| 110.749 | -32.0612 | -44.3242 | -42.633 |
| 111.561 | -33.9217 | -41.0277 | -42.8142 |
| 112.373 | -39.1546 | -41.043 | -44.3765 |
| 113.185 | -39.3365 | -38.5395 | -45.0191 |
| 113.998 | -30.9017 | -36.5269 | -45.1532 |
| 114.81 | -28.7001 | -38.2657 | -39.9103 |
| 115.622 | -28.8125 | -40.2863 | -37.4825 |
| 116.434 | -30.0576 | -43.4568 | -37.7761 |
| 117.246 | -31.1305 | -45.3181 | -39.4668 |
| 118.058 | -34.4466 | -43.9304 | -44.1958 |
| 118.87 | -32.0102 | -41.3921 | -41.9095 |
| 119.682 | -32.4629 | -40.0923 | -41.0235 |
| 120.495 | -32.7862 | -38.846 | -38.3881 |
| 121.307 | -34.1676 | -35.7795 | -36.8624 |
| 122.119 | -31.7798 | -34.9211 | -34.8475 |
| 122.931 | -31.9865 | -36.0357 | -35.2982 |
| 123.743 | -33.8079 | -37.5156 | -38.7005 |
| 124.555 | -34.2345 | -43.8175 | -39.4948 |
| 125.367 | -36.7249 | -38.8503 | -38.3875 |
| 126.179 | -33.0452 | -37.3986 | -38.3492 |
| 126.992 | -31.2153 | -35.7518 | -37.4428 |
| 127.804 | -32.5513 | -34.8523 | -39.1501 |
| 128.616 | -37.409 | -35.7825 | -39.3913 |
| 129.428 | -42.3964 | -38.4237 | -37.5653 |

*FIG. 5D*

| Frequency (MHz) | FOP | Supported | Over-extended |
|---|---|---|---|
| 130.24 | -35.753 | -41.0488 | -38.2956 |
| 131.052 | -39.5047 | -37.3009 | -38.0726 |
| 131.864 | -38.2497 | -35.5246 | -37.2686 |
| 132.676 | -32.7232 | -36.0926 | -37.0247 |
| 133.489 | -31.9471 | -35.2725 | -37.6975 |
| 134.301 | -33.9829 | -34.4426 | -40.7378 |
| 135.113 | -36.4198 | -34.2081 | -41.3323 |
| 135.925 | -31.9081 | -32.7722 | -37.372 |
| 136.737 | -31.6233 | -31.4655 | -36.8208 |
| 137.549 | -33.3572 | -33.7153 | -36.9484 |
| 138.361 | -32.8785 | -35.6354 | -36.7694 |
| 139.173 | -31.21 | -35.1934 | -37.9462 |
| 139.986 | -31.0728 | -36.2595 | -40.7482 |
| 140.798 | -30.8241 | -32.5736 | -42.8833 |
| 141.61 | -32.0486 | -32.2572 | -41.3909 |
| 142.422 | -34.9215 | -33.4109 | -37.694 |
| 143.234 | -34.299 | -33.1861 | -33.5883 |
| 144.046 | -32.273 | -34.4943 | -31.2467 |
| 144.858 | -32.4758 | -36.9025 | -31.1644 |
| 145.67 | -28.9921 | -39.4785 | -31.7637 |
| 146.483 | -27.2143 | -37.5678 | -33.2593 |
| 147.295 | -27.4023 | -34.3705 | -33.8075 |
| 148.107 | -29.8646 | -32.8038 | -33.2628 |
| 148.919 | -28.6846 | -31.1122 | -35.9171 |
| 149.731 | -27.6433 | -30.0849 | -35.4024 |
| 150.543 | -26.4165 | -30.4329 | -34.7349 |
| 151.355 | -26.7852 | -32.0521 | -35.1511 |
| 152.167 | -29.765 | -33.0308 | -35.098 |
| 152.98 | -29.3343 | -32.5635 | -32.2019 |
| 153.792 | -27.2605 | -32.637 | -33.1433 |
| 154.604 | -26.1162 | -33.2709 | -33.7682 |
| 155.416 | -27.374 | -36.3375 | -34.2359 |
| 156.228 | -29.8023 | -43.6535 | -35.3863 |
| 157.04 | -30.1875 | -37.8878 | -34.1677 |
| 157.852 | -30.2843 | -34.0881 | -34.4746 |
| 158.664 | -33.8558 | -34.5945 | -33.7869 |
| 159.477 | -33.9599 | -34.0507 | -33.3239 |
| 160.289 | -33.2702 | -33.6175 | -35.1465 |
| 161.101 | -32.9139 | -31.2795 | -37.2936 |
| 161.913 | -32.7456 | -28.8479 | -35.3811 |

| Frequency (MHz) | FOP | Supported | Over-extended |
|---|---|---|---|
| 162.725 | -31.3861 | -30.0194 | -33.5989 |
| 163.537 | -27.9086 | -31.144 | -36.484 |
| 164.349 | -27.3633 | -32.6767 | -36.7684 |
| 165.161 | -30.6917 | -32.5084 | -34.383 |
| 165.974 | -31.9456 | -33.7294 | -32.5136 |
| 166.786 | -27.6801 | -33.0805 | -31.8024 |
| 167.598 | -24.2294 | -35.0895 | -29.9204 |
| 168.41 | -24.7154 | -35.4789 | -31.027 |
| 169.222 | -26.0086 | -34.0632 | -31.2983 |
| 170.034 | -27.3729 | -32.8461 | -30.0342 |
| 170.846 | -27.0472 | -33.4051 | -28.4974 |
| 171.658 | -28.0436 | -35.6641 | -29.909 |
| 172.471 | -27.9399 | -35.0625 | -31.2989 |
| 173.283 | -27.6548 | -34.5185 | -30.4599 |
| 174.095 | -28.641 | -33.5103 | -29.7464 |
| 174.907 | -27.5037 | -32.3686 | -30.2903 |
| 175.719 | -27.1574 | -33.9027 | -31.5465 |
| 176.531 | -28.8999 | -34.6382 | -29.8586 |
| 177.343 | -28.7922 | -33.0778 | -29.7575 |
| 178.155 | -26.2873 | -31.4802 | -29.9431 |
| 178.968 | -26.141 | -30.8952 | -28.7629 |
| 179.78 | -25.3089 | -30.7562 | -27.4331 |
| 180.592 | -25.9143 | -29.6974 | -27.5246 |
| 181.404 | -30.1279 | -29.8183 | -28.6725 |
| 182.216 | -30.6014 | -29.1422 | -30.5274 |
| 183.028 | -26.1126 | -28.8379 | -32.5194 |
| 183.84 | -22.9513 | -29.3944 | -32.3997 |
| 184.652 | -21.8644 | -31.1233 | -30.9533 |
| 185.465 | -21.3967 | -31.539 | -31.0871 |
| 186.277 | -22.3161 | -34.2574 | -30.6558 |
| 187.089 | -24.4038 | -34.9869 | -31.2746 |
| 187.901 | -26.6302 | -34.0736 | -31.2001 |
| 188.713 | -24.4807 | -32.8604 | -28.6906 |
| 189.525 | -24.1428 | -30.7659 | -27.7095 |
| 190.337 | -23.695 | -32.3481 | -26.9992 |
| 191.149 | -25.739 | -30.2342 | -27.0447 |
| 191.962 | -28.784 | -29.2957 | -26.7309 |
| 192.774 | -31.0247 | -29.2905 | -26.4004 |
| 193.586 | -32.3232 | -30.9826 | -26.0381 |
| 194.398 | -33.7442 | -32.1546 | -25.3836 |

FIG. 5E

| Frequency (MHz) | FOP | Supported | Over-extended |
|---|---|---|---|
| 195.21 | -32.8817 | -32.661 | -25.3247 |
| 196.022 | -26.6233 | -29.2574 | -25.9106 |
| 196.834 | -21.4353 | -27.9035 | -26.7611 |
| 197.646 | -20.0824 | -30.0442 | -27.579 |
| 198.459 | -21.3536 | -30.1825 | -28.6808 |
| 199.271 | -21.8443 | -27.2956 | -28.7442 |
| 200.083 | -21.742 | -26.9496 | -27.1202 |
| 200.895 | -22.5073 | -27.6912 | -26.6544 |
| 201.707 | -25.0063 | -27.7936 | -26.9985 |
| 202.519 | -21.9695 | -28.2269 | -25.2813 |
| 203.331 | -19.4284 | -29.0773 | -23.3962 |
| 204.143 | -21.2859 | -27.4968 | -23.1546 |
| 204.956 | -27.9292 | -25.535 | -23.4624 |
| 205.768 | -22.057 | -25.1703 | -23.8085 |
| 206.58 | -20.0741 | -25.6024 | -25.0438 |
| 207.392 | -24.3814 | -25.7242 | -28.8354 |
| 208.204 | -24.8984 | -27.0238 | -31.443 |
| 209.016 | -21.0117 | -26.8452 | -28.7117 |
| 209.828 | -23.2052 | -27.7598 | -27.3935 |
| 210.64 | -29.4716 | -27.2487 | -26.4933 |
| 211.453 | -22.981 | -25.5902 | -24.263 |
| 212.265 | -21.5195 | -24.5294 | -23.4323 |
| 213.077 | -21.5339 | -24.5012 | -23.7049 |
| 213.889 | -22.2986 | -25.8265 | -24.7242 |
| 214.701 | -20.193 | -25.7289 | -27.0242 |
| 215.513 | -19.2628 | -27.0825 | -30.2378 |
| 216.325 | -19.8231 | -26.6083 | -31.321 |
| 217.137 | -20.7524 | -25.8461 | -29.631 |
| 217.95 | -20.1727 | -25.9736 | -27.6063 |
| 218.762 | -21.4543 | -25.8925 | -25.0493 |
| 219.574 | -21.0128 | -25.4666 | -23.9696 |
| 220.386 | -20.664 | -25.3899 | -25.5339 |
| 221.198 | -21.2337 | -26.6334 | -25.5285 |
| 222.01 | -20.4719 | -29.2422 | -25.0547 |
| 222.822 | -18.2261 | -33.4736 | -26.0965 |
| 223.634 | -18.72 | -29.4909 | -28.629 |
| 224.447 | -20.232 | -26.2747 | -30.5572 |
| 225.259 | -20.3921 | -24.5316 | -29.4657 |
| 226.071 | -22.2973 | -23.1078 | -26.5025 |
| 226.883 | -23.1726 | -22.8912 | -26.3218 |

| Frequency (MHz) | FOP | Supported | Over-extended |
|---|---|---|---|
| 227.695 | -19.2219 | -23.5778 | -27.527 |
| 228.507 | -16.3525 | -24.1342 | -24.3483 |
| 229.319 | -14.6317 | -22.8106 | -22.5078 |
| 230.131 | -13.5188 | -22.1841 | -22.6812 |
| 230.944 | -12.3872 | -22.7356 | -26.2539 |
| 231.756 | -10.9049 | -23.5198 | -29.2049 |
| 232.568 | -10.602 | -24.2476 | -28.2468 |
| 233.38 | -12.3056 | -24.3859 | -25.6268 |
| 234.192 | -13.2172 | -24.7056 | -23.4704 |
| 235.004 | -11.8157 | -25.3166 | -22.4099 |
| 235.816 | -12.7116 | -25.533 | -21.8198 |
| 236.628 | -16.809 | -26.4174 | -22.6115 |
| 237.441 | -23.0528 | -25.5148 | -23.0849 |
| 238.253 | -20.5927 | -23.977 | -23.0299 |
| 239.065 | -18.2829 | -23.8569 | -22.7602 |
| 239.877 | -16.3133 | -24.3184 | -23.5359 |
| 240.689 | -15.9949 | -25.2745 | -25.6898 |
| 241.501 | -16.229 | -24.4816 | -25.7452 |
| 242.313 | -15.8446 | -23.992 | -24.1132 |
| 243.125 | -14.7632 | -24.7014 | -23.9374 |
| 243.938 | -16.3116 | -27.1677 | -23.6183 |
| 244.75 | -18.9566 | -27.3207 | -20.8628 |
| 245.562 | -17.5767 | -25.273 | -20.4991 |
| 246.374 | -16.8339 | -25.02 | -20.7695 |
| 247.186 | -19.5013 | -26.4512 | -21.882 |
| 247.998 | -23.9146 | -27.9884 | -20.9537 |
| 248.81 | -23.1115 | -27.2958 | -20.1916 |
| 249.622 | -21.2299 | -25.1 | -21.8133 |
| 250.435 | -23.5841 | -22.3634 | -23.6676 |
| 251.247 | -25.7403 | -20.6838 | -25.0667 |
| 252.059 | -27.4798 | -19.8349 | -24.4479 |
| 252.871 | -26.715 | -20.3271 | -23.9557 |
| 253.683 | -23.7034 | -21.6358 | -24.4026 |
| 254.495 | -22.0752 | -23.2739 | -26.6627 |
| 255.307 | -21.3245 | -21.6498 | -24.9386 |
| 256.119 | -19.4852 | -19.776 | -22.7184 |
| 256.932 | -17.1421 | -18.5528 | -22.8473 |
| 257.744 | -15.3183 | -17.1506 | -25.0322 |
| 258.556 | -14.8342 | -17.2419 | -26.8179 |
| 259.368 | -14.7414 | -18.2778 | -25.208 |

FIG. 5F

| Frequency (MHz) | FOP | Supported | Over-extended |
|---|---|---|---|
| 260.18 | -14.5113 | -18.898 | -24.0165 |
| 260.992 | -13.8697 | -19.9106 | -24.2947 |
| 261.804 | -13.8244 | -21.6595 | -23.1178 |
| 262.616 | -15.0925 | -21.4339 | -22.4391 |
| 263.429 | -17.0877 | -22.3636 | -20.9607 |
| 264.241 | -15.5779 | -25.1125 | -19.6861 |
| 265.053 | -13.905 | -25.2672 | -19.3661 |
| 265.865 | -13.6006 | -24.5313 | -19.2039 |
| 266.677 | -14.8418 | -23.5664 | -19.2851 |
| 267.489 | -16.8963 | -23.5323 | -20.9201 |
| 268.301 | -14.4937 | -22.9382 | -22.089 |
| 269.113 | -11.4863 | -20.9842 | -23.0955 |
| 269.926 | -10.5833 | -20.0291 | -23.252 |
| 270.738 | -12.4823 | -20.2534 | -23.1084 |
| 271.55 | -13.7579 | -21.8465 | -24.5943 |
| 272.362 | -14.4266 | -21.5944 | -23.6094 |
| 273.174 | -15.9768 | -21.064 | -22.3933 |
| 273.986 | -14.8982 | -20.8582 | -23.1858 |
| 274.798 | -11.9934 | -20.8893 | -24.024 |
| 275.61 | -11.0668 | -23.1868 | -24.6287 |
| 276.423 | -12.0381 | -24.3543 | -26.805 |
| 277.235 | -12.6169 | -23.1964 | -27.2161 |
| 278.047 | -12.2409 | -23.5917 | -28.7612 |
| 278.859 | -11.6139 | -23.3642 | -27.7046 |
| 279.671 | -11.841 | -20.4801 | -24.3249 |
| 280.483 | -14.3888 | -18.6952 | -21.5811 |
| 281.295 | -18.7273 | -17.3255 | -20.6756 |
| 282.107 | -16.3317 | -16.695 | -20.7909 |
| 282.92 | -13.2703 | -16.8488 | -21.2892 |
| 283.732 | -12.5761 | -18.3727 | -18.8205 |
| 284.544 | -14.2781 | -22.5529 | -16.6549 |
| 285.356 | -18.249 | -26.4155 | -15.0546 |
| 286.168 | -20.825 | -22.3637 | -12.8734 |
| 286.98 | -18.8233 | -19.2929 | -11.8131 |
| 287.792 | -17.7559 | -17.7719 | -12.9922 |
| 288.604 | -14.4977 | -18.3499 | -14.5876 |
| 289.417 | -11.1701 | -19.996 | -15.0494 |
| 290.229 | -9.40243 | -19.6068 | -15.2092 |
| 291.041 | -9.21511 | -17.6602 | -15.1495 |
| 291.853 | -8.38052 | -17.5444 | -16.5287 |

| Frequency (MHz) | FOP | Supported | Over-extended |
|---|---|---|---|
| 292.665 | -7.34079 | -18.603 | -19.3123 |
| 293.477 | -5.24918 | -19.8997 | -18.4919 |
| 294.289 | -4.58115 | -20.043 | -19.6014 |
| 295.101 | -7.85866 | -20.525 | -20.4355 |
| 295.914 | -11.16 | -22.9036 | -20.0275 |
| 296.726 | -9.56625 | -20.8571 | -17.9513 |
| 297.538 | -13.0572 | -19.0199 | -16.9737 |
| 298.35 | -16.5203 | -18.6091 | -18.6741 |
| 299.162 | -9.00486 | -17.8145 | -19.9522 |
| 299.974 | -7.41622 | -15.7654 | -19.1454 |
| 300.786 | -9.96767 | -14.0573 | -18.5997 |
| 301.598 | -11.3718 | -13.4038 | -19.4215 |
| 302.411 | -10.5938 | -14.6748 | -17.2725 |
| 303.223 | -10.4472 | -16.3553 | -15.8332 |
| 304.035 | -10.7279 | -14.1374 | -17.2165 |
| 304.847 | -15.4612 | -12.2185 | -21.1045 |
| 305.659 | -12.7994 | -12.6499 | -19.7593 |
| 306.471 | -6.28789 | -14.6104 | -15.4665 |
| 307.283 | -4.32059 | -15.5648 | -13.4381 |
| 308.095 | -3.20371 | -13.4675 | -12.8729 |
| 308.908 | -2.35512 | -12.0944 | -13.1392 |
| 309.72 | -2.14793 | -11.2637 | -14.868 |
| 310.532 | -1.32044 | -11.9653 | -17.9543 |
| 311.344 | -0.36695 | -14.0607 | -21.0014 |
| 312.156 | -1.1806 | -14.4651 | -20.474 |
| 312.968 | -0.46919 | -14.5898 | -18.8251 |
| 313.78 | -0.84858 | -15.7964 | -18.5685 |
| 314.592 | -2.50002 | -15.0636 | -17.7309 |
| 315.405 | -5.5857 | -13.8286 | -18.6832 |
| 316.217 | -7.33184 | -14.6541 | -19.888 |
| 317.029 | -4.87942 | -15.5075 | -22.22 |
| 317.841 | -3.09368 | -14.4249 | -28.0769 |
| 318.653 | -2.41374 | -13.9736 | -34.4114 |
| 319.465 | -1.68589 | -13.9097 | -29.4998 |
| 320.277 | -0.1203 | -14.1659 | -29.4682 |
| 321.089 | 0.036047 | -14.7711 | -25.8418 |
| 321.902 | -0.85267 | -16.8276 | -24.5954 |
| 322.714 | -1.42372 | -18.262 | -25.7005 |
| 323.526 | -2.43111 | -16.7787 | -27.2688 |
| 324.338 | -3.66653 | -14.1627 | -26.561 |

FIG. 5G

| Frequency (MHz) | FOP | Supported | Over-extended |
|---|---|---|---|
| 325.15 | -4.72944 | -13.103 | -24.4787 |
| 325.962 | -6.39919 | -13.6928 | -23.4091 |
| 326.774 | -8.09158 | -14.7412 | -20.8208 |
| 327.586 | -8.77295 | -16.4715 | -21.7584 |
| 328.399 | -7.79647 | -17.5895 | -21.1482 |
| 329.211 | -6.84954 | -18.2702 | -18.8084 |
| 330.023 | -6.33498 | -17.3715 | -20.5674 |
| 330.835 | -6.29277 | -17.9012 | -23.3813 |
| 331.647 | -7.203 | -19.3059 | -21.9744 |
| 332.459 | -7.43013 | -19.5156 | -22.5068 |
| 333.271 | -5.19533 | -18.9319 | -24.2474 |
| 334.083 | -2.86719 | -17.8506 | -24.0497 |
| 334.896 | -2.40848 | -17.105 | -22.8146 |
| 335.708 | -3.74059 | -16.8363 | -18.7305 |
| 336.52 | -7.51737 | -15.6556 | -15.3004 |
| 337.332 | -14.6223 | -14.0844 | -13.6066 |
| 338.144 | -11.08 | -13.3218 | -13.3245 |
| 338.956 | -8.5831 | -13.803 | -14.4871 |
| 339.768 | -7.58715 | -14.296 | -17.8545 |
| 340.58 | -5.89419 | -15.3463 | -20.2959 |
| 341.393 | -4.71712 | -15.634 | -19.619 |
| 342.205 | -4.46529 | -15.3878 | -16.7501 |
| 343.017 | -4.53088 | -15.0833 | -14.2816 |
| 343.829 | -5.90466 | -14.6443 | -13.3889 |
| 344.641 | -9.14088 | -14.2807 | -13.1947 |
| 345.453 | -13.5765 | -13.7042 | -13.4661 |
| 346.265 | -14.6327 | -13.7377 | -13.4886 |
| 347.077 | -10.4119 | -13.7235 | -13.6926 |
| 347.89 | -8.39214 | -13.9625 | -13.0988 |
| 348.702 | -10.2669 | -13.684 | -12.7178 |
| 349.514 | -11.3141 | -13.8529 | -13.459 |
| 350.326 | -8.13417 | -13.77 | -14.3439 |
| 351.138 | -6.51434 | -13.6921 | -13.6075 |
| 351.95 | -7.50504 | -14.3563 | -13.6774 |
| 352.762 | -10.7518 | -15.6241 | -15.7162 |
| 353.574 | -13.4091 | -16.6658 | -20.775 |
| 354.387 | -14.3625 | -16.5062 | -27.313 |
| 355.199 | -12.0718 | -16.9308 | -25.518 |
| 356.011 | -8.83452 | -16.2922 | -21.9911 |
| 356.823 | -7.18608 | -15.9403 | -18.749 |

| Frequency (MHz) | FOP | Supported | Over-extended |
|---|---|---|---|
| 357.635 | -5.97875 | -16.8256 | -16.1314 |
| 358.447 | -5.91315 | -19.9967 | -14.9881 |
| 359.259 | -7.19499 | -19.8948 | -15.4337 |
| 360.071 | -9.77185 | -16.6826 | -16.025 |
| 360.884 | -11.8777 | -15.9772 | -15.3053 |
| 361.696 | -10.8274 | -15.9986 | -15.2471 |
| 362.508 | -9.82799 | -15.044 | -15.0368 |
| 363.32 | -9.35713 | -14.9187 | -16.0272 |
| 364.132 | -8.82762 | -15.4625 | -16.3965 |
| 364.944 | -8.94271 | -16.0423 | -14.6532 |
| 365.756 | -10.5378 | -17.9349 | -13.934 |
| 366.568 | -13.1327 | -20.7711 | -15.8841 |
| 367.381 | -13.7897 | -19.2359 | -21.4915 |
| 368.193 | -11.466 | -17.0271 | -19.7508 |
| 369.005 | -9.75939 | -17.4567 | -16.9627 |
| 369.817 | -6.6945 | -19.3094 | -16.4705 |
| 370.629 | -4.27255 | -19.3159 | -15.9465 |
| 371.441 | -3.0376 | -19.9648 | -15.2212 |
| 372.253 | -3.35144 | -19.4914 | -16.1307 |
| 373.065 | -5.55669 | -15.9135 | -16.584 |
| 373.878 | -10.1578 | -13.3687 | -17.3162 |
| 374.69 | -11.5658 | -12.5738 | -16.9916 |
| 375.502 | -7.70305 | -12.8362 | -16.1805 |
| 376.314 | -4.43916 | -13.8209 | -14.1858 |
| 377.126 | -2.38437 | -14.6276 | -12.7877 |
| 377.938 | -1.74283 | -15.0093 | -12.4649 |
| 378.75 | -1.92728 | -15.6682 | -12.0155 |
| 379.562 | -2.7757 | -16.1216 | -12.4464 |
| 380.375 | -2.62469 | -18.7933 | -13.9235 |
| 381.187 | -2.20066 | -18.6829 | -15.7985 |
| 381.999 | -2.94739 | -15.259 | -16.2536 |
| 382.811 | -3.24686 | -14.3105 | -14.3309 |
| 383.623 | -2.60788 | -14.1959 | -13.0602 |
| 384.435 | -2.66618 | -14.4648 | -12.6118 |
| 385.247 | -4.70998 | -14.5917 | -12.7655 |
| 386.059 | -8.50646 | -13.8863 | -12.6471 |
| 386.872 | -10.0625 | -13.7273 | -12.614 |
| 387.684 | -9.96474 | -13.3922 | -12.6011 |
| 388.496 | -13.2282 | -13.5207 | -13.3605 |
| 389.308 | -12.5454 | -12.5111 | -14.6508 |

*FIG. 5H*

| Frequency (MHz) | FOP | Supported | Over-extended |
|---|---|---|---|
| 390.12 | -7.71378 | -11.1928 | -15.7823 |
| 390.932 | -5.8033 | -10.4089 | -17.4571 |
| 391.744 | -5.00533 | -10.8235 | -16.5374 |
| 392.556 | -4.09931 | -12.0561 | -13.811 |
| 393.369 | -3.03183 | -14.2367 | -11.7893 |
| 394.181 | -2.51502 | -17.0225 | -10.885 |
| 394.993 | -3.11137 | -19.1591 | -9.84003 |
| 395.805 | -4.59799 | -21.0121 | -8.80938 |
| 396.617 | -5.23883 | -19.7156 | -8.60196 |
| 397.429 | -3.00479 | -18.5095 | -8.65539 |
| 398.241 | -0.63413 | -17.1151 | -9.10276 |
| 399.053 | -0.25745 | -15.6114 | -10.222 |
| 399.866 | -0.80348 | -15.2189 | -11.574 |
| 400.678 | -0.81335 | -16.504 | -12.4939 |
| 401.49 | -0.63165 | -17.9673 | -13.5194 |
| 402.302 | -0.01275 | -18.2575 | -14.8198 |
| 403.114 | -1.37962 | -18.3541 | -15.0644 |
| 403.926 | -2.50626 | -17.2679 | -15.0033 |
| 404.738 | -3.17745 | -13.855 | -14.981 |
| 405.55 | -3.79285 | -11.8261 | -14.4041 |
| 406.363 | -3.70846 | -11.3108 | -13.6087 |
| 407.175 | -3.83613 | -10.6577 | -13.5689 |
| 407.987 | -4.90841 | -9.70686 | -14.0369 |
| 408.799 | -6.39417 | -8.82395 | -15.4067 |
| 409.611 | -7.79847 | -8.7457 | -16.8478 |
| 410.423 | -8.0581 | -8.832 | -17.2693 |
| 411.235 | -7.9009 | -8.51876 | -18.6591 |
| 412.047 | -9.08202 | -7.80241 | -20.2755 |
| 412.86 | -12.0378 | -7.71642 | -19.0965 |
| 413.672 | -13.4627 | -8.40361 | -16.4746 |
| 414.484 | -12.2174 | -8.56316 | -14.9137 |
| 415.296 | -12.7154 | -7.89964 | -14.862 |
| 416.108 | -12.3377 | -8.37443 | -15.2697 |
| 416.92 | -8.20883 | -10.2082 | -15.1753 |
| 417.732 | -3.9545 | -11.1899 | -14.9235 |
| 418.544 | -1.25216 | -11.0272 | -16.926 |
| 419.357 | -0.38218 | -10.6542 | -16.8269 |
| 420.169 | -1.05632 | -10.4157 | -14.6723 |
| 420.981 | -2.31364 | -9.37733 | -13.1394 |
| 421.793 | -2.48479 | -8.49511 | -10.6377 |

| Frequency (MHz) | FOP | Supported | Over-extended |
|---|---|---|---|
| 422.605 | -2.68263 | -8.57895 | -9.14341 |
| 423.417 | -3.44488 | -10.3807 | -8.8846 |
| 424.229 | -3.82305 | -11.5847 | -9.09431 |
| 425.041 | -4.35058 | -11.1536 | -8.86176 |
| 425.854 | -4.80707 | -10.8061 | -8.90302 |
| 426.666 | -5.8941 | -9.48099 | -9.6535 |
| 427.478 | -7.0836 | -7.4165 | -11.4444 |
| 428.29 | -7.79609 | -6.20296 | -13.7795 |
| 429.102 | -7.93156 | -5.99128 | -13.8636 |
| 429.914 | -7.85907 | -6.60703 | -12.258 |
| 430.726 | -7.81791 | -8.07107 | -10.9865 |
| 431.538 | -7.13085 | -9.3053 | -10.0116 |
| 432.351 | -7.42326 | -10.3674 | -9.13248 |
| 433.163 | -7.85539 | -11.3774 | -8.27058 |
| 433.975 | -6.60913 | -10.9313 | -8.07548 |
| 434.787 | -5.7415 | -9.10309 | -8.61988 |
| 435.599 | -4.94183 | -8.06992 | -9.564 |
| 436.411 | -5.19339 | -8.36886 | -10.2822 |
| 437.223 | -6.55438 | -9.09911 | -10.8902 |
| 438.035 | -6.84571 | -9.17358 | -11.6202 |
| 438.848 | -6.15096 | -8.52157 | -11.8061 |
| 439.66 | -5.37293 | -7.80847 | -11.3521 |
| 440.472 | -5.00502 | -7.22897 | -10.6874 |
| 441.284 | -5.93336 | -6.59103 | -10.468 |
| 442.096 | -6.05663 | -6.94958 | -12.1531 |
| 442.908 | -4.72058 | -8.67616 | -15.5252 |
| 443.72 | -3.55565 | -11.4809 | -18.8289 |
| 444.532 | -2.82249 | -13.9307 | -19.251 |
| 445.345 | -2.41271 | -12.5202 | -17.3196 |
| 446.157 | -2.84243 | -10.5255 | -14.0479 |
| 446.969 | -3.4587 | -10.135 | -12.0347 |
| 447.781 | -3.12852 | -11.0312 | -11.6898 |
| 448.593 | -2.65611 | -11.0918 | -11.4628 |
| 449.405 | -2.96156 | -8.74066 | -12.0809 |
| 450.217 | -4.15708 | -7.04289 | -14.4261 |
| 451.029 | -5.79829 | -7.01296 | -15.7595 |
| 451.842 | -7.13311 | -7.36171 | -14.1255 |
| 452.654 | -6.47775 | -7.07644 | -14.3849 |
| 453.466 | -4.92674 | -6.73202 | -16.3903 |
| 454.278 | -4.08437 | -7.11127 | -17.797 |

FIG. 5I

| Frequency (MHz) | FOP | Supported | Over-extended |
|---|---|---|---|
| 455.09 | -4.11139 | -7.91097 | -17.2817 |
| 455.902 | -4.18105 | -8.19389 | -16.149 |
| 456.714 | -3.33663 | -8.59633 | -14.8084 |
| 457.526 | -1.95368 | -9.83765 | -13.6801 |
| 458.339 | -0.72135 | -11.5679 | -12.3344 |
| 459.151 | 0.023498 | -11.9103 | -10.9886 |
| 459.963 | -0.12771 | -10.6953 | -10.5453 |
| 460.775 | -0.56351 | -9.50643 | -10.2795 |
| 461.587 | -0.31843 | -9.02461 | -10.5923 |
| 462.399 | -0.11537 | -9.04509 | -11.9499 |
| 463.211 | 0.080228 | -8.86041 | -14.5172 |
| 464.023 | 0.072175 | -8.61551 | -16.1521 |
| 464.836 | -0.10513 | -8.55915 | -14.1734 |
| 465.648 | -0.34871 | -8.24456 | -11.7005 |
| 466.46 | -1.99426 | -7.35177 | -10.0036 |
| 467.272 | -2.71285 | -6.36303 | -8.73188 |
| 468.084 | -2.25787 | -5.42928 | -8.44149 |
| 468.896 | -1.85696 | -5.47087 | -9.07534 |
| 469.708 | -2.14787 | -6.57683 | -9.11497 |
| 470.52 | -3.54368 | -7.86026 | -9.25109 |
| 471.333 | -5.34408 | -8.57722 | -8.87852 |
| 472.145 | -5.26419 | -8.94288 | -7.99397 |
| 472.957 | -5.304 | -10.2598 | -7.64435 |
| 473.769 | -6.42263 | -11.677 | -8.48521 |
| 474.581 | -8.21211 | -11.8373 | -9.10486 |
| 475.393 | -9.45786 | -12.053 | -8.8082 |
| 476.205 | -10.1811 | -14.3554 | -8.18174 |
| 477.017 | -8.07908 | -13.3693 | -8.07994 |
| 477.83 | -6.46358 | -8.48389 | -8.62054 |
| 478.642 | -5.99365 | -6.94312 | -9.13484 |
| 479.454 | -5.32521 | -6.85905 | -9.21745 |
| 480.266 | -5.06922 | -6.4076 | -9.37782 |
| 481.078 | -5.38152 | -5.90867 | -9.12447 |
| 481.89 | -5.99062 | -6.10867 | -8.91971 |
| 482.702 | -5.9275 | -6.99885 | -9.31575 |
| 483.514 | -4.47397 | -8.75081 | -9.19064 |
| 484.327 | -2.86759 | -10.1358 | -8.98329 |
| 485.139 | -1.43043 | -9.77533 | -8.85396 |
| 485.951 | 0.017272 | -9.25632 | -8.6972 |
| 486.763 | 1.225575 | -8.99877 | -8.64679 |

| Frequency (MHz) | FOP | Supported | Over-extended |
|---|---|---|---|
| 487.575 | 1.887267 | -8.50238 | -8.86873 |
| 488.387 | 1.951646 | -7.73527 | -9.22952 |
| 489.199 | 1.647763 | -7.82184 | -9.26586 |
| 490.011 | 0.399142 | -8.72338 | -9.30979 |
| 490.824 | 0.276536 | -9.48343 | -9.82036 |
| 491.636 | 0.843853 | -10.2041 | -10.2111 |
| 492.448 | 1.328232 | -9.7025 | -8.96684 |
| 493.26 | 1.727817 | -7.82142 | -7.38055 |
| 494.072 | 1.261328 | -5.77258 | -6.77235 |
| 494.884 | -0.6405 | -4.48157 | -7.44405 |
| 495.696 | -3.21843 | -4.27339 | -8.40708 |
| 496.508 | -4.76158 | -4.83558 | -8.07785 |
| 497.321 | -4.64899 | -6.12284 | -7.04164 |
| 498.133 | -4.03081 | -7.66995 | -6.57011 |
| 498.945 | -2.835 | -8.24896 | -6.15099 |
| 499.757 | -0.9736 | -7.99016 | -6.18537 |
| 500.569 | 0.378039 | -7.60651 | -6.99532 |
| 501.381 | 0.692269 | -6.56384 | -8.83085 |
| 502.193 | 0.419188 | -6.35054 | -9.80743 |
| 503.005 | -0.05886 | -6.16323 | -8.35945 |
| 503.818 | -0.52692 | -5.82169 | -7.66949 |
| 504.63 | -0.93947 | -6.19838 | -8.18488 |
| 505.442 | -1.78596 | -7.18033 | -7.69977 |
| 506.254 | -3.76192 | -8.12903 | -6.91232 |
| 507.066 | -6.09655 | -8.53012 | -6.65083 |
| 507.878 | -7.15538 | -8.01565 | -6.44066 |
| 508.69 | -6.879 | -7.08085 | -5.34352 |
| 509.502 | -4.81836 | -6.37656 | -4.65018 |
| 510.315 | -3.71203 | -6.29157 | -5.34794 |
| 511.127 | -4.17799 | -6.8209 | -6.70665 |
| 511.939 | -5.6123 | -7.16274 | -7.34511 |
| 512.751 | -6.17234 | -7.57685 | -7.15347 |
| 513.563 | -5.33751 | -7.79698 | -6.65379 |
| 514.375 | -3.18467 | -8.02761 | -6.63587 |
| 515.187 | -1.61069 | -9.14692 | -6.88995 |
| 515.999 | -1.57633 | -10.3482 | -7.34748 |
| 516.812 | -2.41302 | -10.2016 | -7.58918 |
| 517.624 | -2.19355 | -9.08318 | -6.47231 |
| 518.436 | -0.86135 | -8.45488 | -5.12025 |
| 519.248 | 0.680685 | -8.33635 | -4.43748 |

FIG. 5J

| Frequency (MHz) | FOP | Supported | Over-extended |
|---|---|---|---|
| 520.06 | 1.881154 | -8.51226 | -4.62524 |
| 520.872 | 2.155336 | -7.63617 | -5.40496 |
| 521.684 | 1.44737 | -6.93145 | -5.80705 |
| 522.496 | 0.370161 | -6.8927 | -5.83041 |
| 523.309 | 1.321764 | -7.69501 | -5.36911 |
| 524.121 | 1.838712 | -8.82217 | -3.9799 |
| 524.933 | 1.104672 | -8.81156 | -2.32273 |
| 525.745 | 0.302162 | -7.44691 | -1.36468 |
| 526.557 | 0.424594 | -6.40219 | -1.59485 |
| 527.369 | 1.439791 | -6.52036 | -2.48751 |
| 528.181 | -0.27647 | -7.2062 | -3.46569 |
| 528.993 | -0.97483 | -7.93142 | -5.13363 |
| 529.806 | -0.07326 | -7.80585 | -6.75189 |
| 530.618 | 0.416779 | -6.68954 | -7.66767 |
| 531.43 | -0.54089 | -5.05851 | -8.1318 |
| 532.242 | -2.71237 | -3.50403 | -7.09482 |
| 533.054 | -4.35672 | -2.41354 | -5.79493 |
| 533.866 | -3.18203 | -1.49357 | -5.22479 |
| 534.678 | -1.93702 | -1.06415 | -5.39591 |
| 535.49 | -1.1088 | -1.22461 | -5.64026 |
| 536.303 | -1.09775 | -1.70804 | -4.5131 |
| 537.115 | -2.05508 | -2.32464 | -3.36405 |
| 537.927 | -3.40728 | -2.9445 | -3.173 |
| 538.739 | -4.93541 | -3.40296 | -3.20917 |
| 539.551 | -3.7305 | -2.6144 | -2.69866 |
| 540.363 | -1.27994 | -1.58352 | -1.4253 |
| 541.175 | -0.02929 | -0.61295 | 0.483908 |
| 541.987 | 0.611494 | -0.27643 | 1.147062 |
| 542.8 | 1.044878 | -0.3825 | 0.398093 |
| 543.612 | 0.966872 | -0.50948 | 0.038498 |
| 544.424 | 0.170882 | -0.88557 | 0.402428 |
| 545.236 | -0.64733 | -1.31535 | 0.760944 |
| 546.048 | -1.56945 | -1.70914 | 0.408244 |
| 546.86 | -2.94809 | -1.80997 | 0.540138 |
| 547.672 | -4.43164 | -2.44376 | 0.658875 |
| 548.484 | -3.30834 | -2.64288 | 0.686182 |
| 549.297 | -1.04831 | -2.00045 | 0.88666 |
| 550.109 | 0.312318 | -1.11993 | 0.554942 |
| 550.921 | 0.503345 | -0.76662 | -0.04202 |
| 551.733 | -0.02411 | -0.87562 | -0.9699 |

| Frequency (MHz) | FOP | Supported | Over-extended |
|---|---|---|---|
| 552.545 | -0.91592 | -1.45923 | -1.76613 |
| 553.357 | -1.67785 | -2.02859 | -2.24185 |
| 554.169 | -1.10072 | -1.72883 | -1.84602 |
| 554.981 | 0.84594 | -1.60143 | -0.81066 |
| 555.794 | 1.075791 | -1.77794 | 0.036558 |
| 556.606 | 0.1135 | -1.64066 | 0.115763 |
| 557.418 | 0.286444 | -1.76462 | -0.18869 |
| 558.23 | 1.122643 | -2.38566 | -0.33944 |
| 559.042 | 1.975073 | -3.10157 | -0.86426 |
| 559.854 | 2.643224 | -3.58189 | -2.01647 |
| 560.666 | 1.496793 | -3.99028 | -3.17097 |
| 561.478 | 1.064668 | -4.43379 | -3.76284 |
| 562.291 | 1.546832 | -4.89577 | -4.77548 |
| 563.103 | 1.471095 | -4.48482 | -5.9943 |
| 563.915 | 1.424389 | -3.0331 | -5.95082 |
| 564.727 | 2.020358 | -1.98861 | -5.27702 |
| 565.539 | 2.509341 | -1.70588 | -5.67993 |
| 566.351 | 0.90188 | -2.71281 | -5.54483 |
| 567.163 | -0.23951 | -5.19371 | -3.54808 |
| 567.975 | 0.501063 | -8.85965 | -1.42947 |
| 568.788 | 2.161812 | -8.79758 | -0.16157 |
| 569.6 | 3.621681 | -6.06987 | 0.167064 |
| 570.412 | 4.104851 | -4.94245 | -0.43906 |
| 571.224 | 3.147717 | -4.70597 | -2.07801 |
| 572.036 | 2.411636 | -3.92387 | -4.50474 |
| 572.848 | 2.41502 | -3.49132 | -5.59118 |
| 573.66 | 1.261723 | -2.80071 | -4.94212 |
| 574.472 | 1.907422 | -1.99741 | -4.50968 |
| 575.285 | 1.595307 | -2.31395 | -4.96815 |
| 576.097 | 2.340862 | -3.01753 | -5.69115 |
| 576.909 | 3.236056 | -2.28801 | -5.8442 |
| 577.721 | 2.862251 | -1.75856 | -3.70236 |
| 578.533 | 2.483229 | -1.67907 | -0.86156 |
| 579.345 | 1.991176 | -1.12051 | 0.069148 |
| 580.157 | 2.245915 | -0.58345 | 0.074988 |
| 580.969 | 2.806891 | -1.2285 | 0.843912 |
| 581.782 | 2.853095 | -2.92134 | -0.45249 |
| 582.594 | 1.675868 | -3.78768 | -2.00769 |
| 583.406 | 0.025909 | -2.16739 | -3.07615 |
| 584.218 | 0.22179 | -0.53719 | -2.95776 |

*FIG. 5K*

| Frequency (MHz) | FOP | Supported | Over-extended |
|---|---|---|---|
| 585.03 | 2.098247 | 0.526525 | -2.88338 |
| 585.842 | 3.611092 | 1.472838 | -2.42425 |
| 586.654 | 3.38801 | 1.890718 | -0.64856 |
| 587.466 | 2.655755 | 1.178742 | 0.689244 |
| 588.279 | 2.180071 | -0.08326 | 1.363526 |
| 589.091 | 2.241887 | -1.06224 | 2.262568 |
| 589.903 | 2.171165 | -1.6191 | 2.972481 |
| 590.715 | 2.193371 | -1.61706 | 2.805028 |
| 591.527 | 2.737426 | -1.1787 | 2.506114 |
| 592.339 | 2.211961 | -1.08019 | 2.194988 |
| 593.151 | 1.360638 | -1.34957 | 2.423684 |
| 593.963 | 0.537808 | -2.70436 | 2.522566 |
| 594.776 | 0.309184 | -4.81501 | 1.953595 |
| 595.588 | 1.022938 | -4.93158 | 0.779617 |
| 596.4 | 1.759387 | -3.1652 | 0.284772 |
| 597.212 | 1.466594 | -1.44581 | 0.062317 |
| 598.024 | 2.818011 | -0.23347 | -0.07071 |
| 598.836 | 2.322057 | 0.521596 | -0.34537 |
| 599.648 | 1.433015 | 0.482931 | -1.01603 |
| 600.46 | 1.178933 | 0.742593 | -1.98528 |
| 601.273 | 1.006359 | 1.271338 | -2.42183 |
| 602.085 | 0.59733 | 1.74543 | -2.0845 |
| 602.897 | -0.06049 | 1.771643 | -1.74291 |
| 603.709 | -1.13282 | 1.579845 | -1.43052 |
| 604.521 | -1.4734 | 1.516098 | -0.8055 |
| 605.333 | -1.21737 | 1.434246 | -0.58414 |
| 606.145 | -0.23869 | 1.211108 | -0.94762 |
| 606.957 | 1.290073 | 1.16286 | -1.06503 |
| 607.77 | 2.411535 | 2.014477 | -0.64201 |
| 608.582 | 3.073659 | 2.629019 | -0.35875 |
| 609.394 | 2.236244 | 2.696523 | -0.22091 |
| 610.206 | 1.825193 | 2.456345 | -0.96513 |
| 611.018 | 2.4164 | 2.194593 | -2.87102 |
| 611.83 | 2.847539 | 0.851812 | -5.34699 |
| 612.642 | 1.605189 | -0.15953 | -7.71009 |
| 613.454 | 0.493829 | -0.22936 | -7.9406 |
| 614.267 | -0.70285 | 1.192048 | -7.55506 |
| 615.079 | 0.87577 | 1.198792 | -8.70846 |
| 615.891 | 2.178896 | 0.717654 | -11.0532 |
| 616.703 | 1.478932 | 1.491465 | -10.2827 |

| Frequency (MHz) | FOP | Supported | Over-extended |
|---|---|---|---|
| 617.515 | 0.790785 | 2.130017 | -9.14918 |
| 618.327 | 0.258208 | 1.7157 | -10.1791 |
| 619.139 | 0.419243 | 1.986227 | -11.0137 |
| 619.951 | 0.791333 | 3.036909 | -7.4444 |
| 620.764 | 2.104701 | 3.31354 | -4.55238 |
| 621.576 | 0.987814 | 3.424671 | -3.21012 |
| 622.388 | 0.254929 | 3.456606 | -2.77268 |
| 623.2 | 0.473978 | 3.339195 | -2.9763 |
| 624.012 | 1.207848 | 2.983204 | -2.62038 |
| 624.824 | 1.851316 | 2.601389 | -1.59567 |
| 625.636 | 2.002125 | 2.365732 | -0.99831 |
| 626.448 | 1.777082 | 2.16441 | -1.14193 |
| 627.261 | 1.301327 | 2.14085 | -0.91144 |
| 628.073 | 1.561339 | 1.735067 | -0.45361 |
| 628.885 | 1.428778 | 1.197959 | -0.26571 |
| 629.697 | 1.141831 | 1.51978 | -0.38748 |
| 630.509 | 0.61576 | 2.349423 | -0.16569 |
| 631.321 | -0.11086 | 3.353444 | 1.010458 |
| 632.133 | 0.801115 | 3.013463 | 1.625887 |
| 632.945 | 0.700785 | 1.931967 | 2.348199 |
| 633.758 | 0.780794 | 0.928945 | 1.85888 |
| 634.57 | 1.019764 | -0.26644 | 1.232479 |
| 635.382 | 1.493257 | -0.32744 | 0.120973 |
| 636.194 | 2.160132 | 0.058775 | -1.76108 |
| 637.006 | 0.362534 | 0.181878 | -3.1354 |
| 637.818 | -0.48753 | 0.832073 | -2.71071 |
| 638.63 | -0.84187 | 1.440011 | -1.04654 |
| 639.442 | -0.76484 | 0.848997 | 0.486719 |
| 640.255 | -0.23797 | 2.182125 | -1.75757 |
| 641.067 | 1.537303 | 1.099355 | -2.69133 |
| 641.879 | -1.06546 | 1.04226 | -1.82964 |
| 642.691 | 0.050731 | 1.053583 | -0.94585 |
| 643.503 | 2.128174 | 0.631676 | -0.51546 |
| 644.315 | 2.880001 | 0.645806 | -0.14514 |
| 645.127 | 3.411832 | 1.215472 | -0.24579 |
| 645.939 | 4.144856 | 1.643408 | -0.80594 |
| 646.752 | 3.51312 | 1.844564 | -1.53532 |
| 647.564 | 3.08851 | 1.620157 | -2.01006 |
| 648.376 | 2.205086 | 1.189768 | -2.19759 |
| 649.188 | 0.618509 | 1.055511 | -1.30943 |
| 650 | -0.07505 | -0.8589 | 0.459442 |

*FIG. 5L*

SHIELD-SUPPORTING FILLER FOR DATA COMMUNICATIONS CABLES

RELATED APPLICATIONS

This application claims the benefit of and priority to U.S. Provisional Patent Application No. 63/021,537, entitled "Shield-Supporting Filler for Data Communications Cables," filed May 7, 2020, the entirety of which is incorporated by reference herein.

FIELD

The present application relates to data cables. In particular, the present application relates to use of a pair separator using controlled sizing of fins or separator arms to shield dimensions, allowing tuning of electronic performance parameters by way of metal proximity and ambient air volume surrounding the pair or pairs.

BACKGROUND

High-bandwidth data cable standards established by industry standards organizations including the Telecommunications Industry Association (TIA), International Organization for Standardization (ISO), and the American National Standards Institute (ANSI) such as ANSI/TIA-568-C.2, include performance requirements for cables commonly referred to as Category 6A type. These high performance Category 6A cables have strict specifications for maximum return loss, attenuation, and crosstalk, amongst other electrical performance parameters. Failure to meet these requirements means that the cable may not be usable for high data rate communications such as 1000BASE-T (Gigabit Ethernet), 10GBASE-T (10-Gigabit Ethernet), or other future emerging standards. Evolving higher performance requirements along with size, weight, green initiatives and cost challenges in the industry now require working with ever smaller dimensions along with the inherently more sensitive, though objective-enabling electrical interactions, between cable components and materials.

SUMMARY

The present disclosure describes methods of manufacture and implementations of balanced twisted pair cables with a barrier tape or shield, which may be conductive or partially conductive, with tuned attenuation, impedance, and coupling properties. Evolving needs are forcing constraints on design and manufacturing such as size, weight, cost, precision, and performance margin which must be balanced for efficient design and costs. Whereas the past technology and practices worked within fairly large relative sizes and tolerances of 10 to 30%, it has become advantageous to narrow these ranges and to take advantage of the electrical interaction and response within ever finer areas of the cable construction to achieve the needed efficiencies. A surprise finding related to the finer resolutions of size and tolerance is captured and utilized by controlling the micro spacing within a cable construction sub-space made up of, and defined by a separator material, separator size, pair construction, shield, and air volume within a highly electrically dynamic geometrically very small area. A filler or pair separator is included within the cable to separate the twisted pairs and provide a support base for the shield, allowing a substantially controlled shape for optimized ground plane uniformity and stability for tuned attenuation, impedance, and coupling properties. The filler orientation, shape, and size provides support for the shield such that a gap or air space is provided between the shield and the twisted pairs with a given minimum size without increasing the maximum cable core size. The length of arms of the filler may be adjusted to fine-tune the size and shape of this gap and control an amount of radial contact or spacing between any twisted pair(s) and the shield, along with air-dielectric volume, for electrical performance tuning due to the non-linear effects of electro-magnetic transmission fields within fine proximities. In some embodiments, twisted pairs may be selected to be adjacent within the cable to optimize electromagnetic performance, e.g. based on lay length. In some embodiments, the filler or pair separator may have one or more arms or fins omitted to reduce overall cable size while fine-tuning or optimizing electrical performance characteristics.

In some aspects, the present disclosure is directed to a data cable for improving electrical performance with a reduced cross-sectional diameter. The data cable includes a filler comprising a plurality of arms radiating from a central portion, each adjacent pair of the plurality of arms bordering a channel between the adjacent pair so as to define a plurality of channels around the filler, each arm of the plurality of arms including a terminal portion. The data cable also includes a plurality of twisted pairs of insulated conductors, each twisted pair of conductors positioned within a channel of the plurality of channels, wherein each arm of the plurality of arms of the filler provides a physical barrier between an adjacent pair of the plurality of twisted pairs of conductors maintaining a separation between the adjacent pair of the plurality of twisted pairs of conductors. The data cable also includes a conductive barrier tape surrounding the filler and plurality of twisted pairs of insulated conductors. The data cable also includes a jacket surrounding the conductive barrier tape, the filler, and the plurality of twisted pairs of conductors. At least one arm of the filler has a length greater than a first distance from the central portion of the filler to a line tangent to an outermost portion of two adjacent twisted pairs of insulated conductors. The at least one arm of the filler is in contact with and supporting the conductive barrier tape at a position farther from the central portion of the filler than the line tangent to the outermost portion of the two adjacent twisted pairs of insulated conductors so as to increase electrical performance of the data cable.

In some implementations, the at least one arm of the filler has a length less than a second distance from the central portion of the filler to an outermost portion of any insulated conductor of the plurality of twisted pairs of insulated conductors, such that the conductive barrier tape is supported by the at least one arm of the filler at a first position between the first distance and the second distance from the central portion of the filler. In a further implementation, a portion of the jacket surrounding the conductive barrier tape adjacent to the at least one arm of the filler is supported by the conductive barrier tape and the at least one arm of the filler at a second position between the first distance and the second distance from the central portion of the filler, so as to reduce a cross-sectional diameter of the data cable.

In some implementations, a first arm of the filler has a length greater than the first distance from the central portion of the filler to the line tangent to the outermost portion of two adjacent twisted pairs of insulated conductors, and wherein a second arm of the filler has a second length greater than a second distance from the central portion of the filler to a second line tangent to an outermost portion of a second two adjacent twisted pairs of insulated conductors. In a further implementation, the length of the first arm of the filler is different from the second length of the second arm of the filler.

In some implementations, a number of the plurality of arms of the filler is less than a number of the plurality of twisted pairs of insulated conductors, such that at least two twisted pairs of insulated conductors are not physically separated by an arm of the plurality of arms of the filler, so as to reduce a cross-sectional diameter of the data cable at a position between the at least two twisted pairs of insulated conductors. In a further implementation, a first twisted pair of the at least two twisted pairs of insulated conductors not physically separated by an arm of the plurality of arms of the filler has a longest lay length of the twisted pairs of insulated conductors, and a second twisted pair of the at least two twisted pairs of insulated conductors not physically separated by an arm of the plurality of arms of the filler has a shortest lay length of the twisted pairs of insulated conductors. In another further implementation, a first twisted pair of the at least two twisted pairs of insulated conductors not physically separated by an arm of the plurality of arms of the filler has a longest lay length of the twisted pairs of insulated conductors, and a second twisted pair of the at least two twisted pairs of insulated conductors not physically separated by an arm of the plurality of arms of the filler has a second shortest lay length of the twisted pairs of insulated conductors. In some implementations, adjacent twisted pairs of insulated conductors not physically separated by an arm of the plurality of arms of the filler have different lay lengths. In some implementations, adjacent twisted pairs of insulated conductors not physically separated by an arm of the plurality of arms of the filler have lay lengths such that a difference between the lay lengths is greater than a threshold value. In some implementations, a first twisted pair of insulated conductors having a first lay length and a second twisted pair of insulated conductors having a second lay length are not physically separated by an arm of the plurality of arms of the filler, and a third twisted pair of insulated conductors has a third lay length greater than the first lay length and less than the second lay length, the third twisted pair of insulated conductors physically separated from the first and second twisted pairs of insulated conductors by an arm of the filler.

In some implementations, a first arm of the plurality of arms of the filler has a central portion having a first lateral width, and the terminal portion of the first arm has a second lateral width different from the first lateral width. In some implementations, an average power summed attenuation to near-end crosstalk ratio (PS-ACRN) electrical characteristic value of the data cable over a frequency range from 200 to 600 MHz is at least 3 decibels greater than an average PS-ACRN electrical characteristic value of a second data cable lacking a filler having at least one arm with a length greater than a first distance from a central portion of the filler of the second data cable to a line tangent to an outermost portion of two adjacent twisted pairs of insulated conductors of the second data cable over the frequency range. In some implementations, an attenuation response of the data cable over a frequency range from 300 to 600 MHz is at least 1 decibel lower than an attenuation response of a second data cable lacking a filler having at least one arm with a length greater than a first distance from a central portion of the filler of the second data cable to a line tangent to an outermost portion of two adjacent twisted pairs of insulated conductors of the second data cable over the frequency range. In some implementations, an average input impedance of the data cable over a range from 50 to 150 MHz is at least 2 ohms higher than an average input impedance of a second data cable lacking a filler having at least one arm with a length greater than a first distance from a central portion of the filler of the second data cable to a line tangent to an outermost portion of two adjacent twisted pairs of insulated conductors of the second data cable over the frequency range.

In another aspect, the present disclosure is directed to a cable, including a filler comprising a plurality of arms radiating from a central portion; a plurality of twisted pairs of insulated conductors, wherein each arm of the plurality of arms of the filler provides a physical barrier between an adjacent pair of the plurality of twisted pairs of conductors; and a conductive barrier tape surrounding the filler and plurality of twisted pairs of insulated conductors. At least one arm of the filler has a length greater than a first distance from the central portion of the filler to a line tangent to an outermost portion of two adjacent twisted pairs of insulated conductors. The at least one arm of the filler is in contact with and supporting the conductive barrier tape at a position farther from the central portion of the filler than the line tangent to the outermost portion of the two adjacent twisted pairs of insulated conductors.

In some implementations, the at least one arm of the filler has a length less than a second distance from the central portion of the filler to an outermost portion of any insulated conductor of the plurality of twisted pairs of insulated conductors, such that the conductive barrier tape is supported by the at least one arm of the filler at a first position between the first distance and the second distance from the central portion of the filler.

In some implementations, a length of a first arm of the filler is different from a length of a second arm of the filler. In some implementations, a number of the plurality of arms of the filler is less than a number of the plurality of twisted pairs of insulated conductors. In a further implementation, a first twisted pair of the at least two twisted pairs of insulated conductors not physically separated by an arm of the plurality of arms of the filler has a longest lay length of the twisted pairs of insulated conductors, and a second twisted pair of the at least two twisted pairs of insulated conductors not physically separated by an arm of the plurality of arms of the filler has either a shortest lay length or second shortest lay length of the twisted pairs of insulated conductors.

In some implementations, a first arm of the plurality of arms of the filler has a non-uniform cross-sectional profile. In some implementations, an average power summed attenuation to near-end crosstalk ratio (PS-ACRN) electrical characteristic value of the data cable over a frequency range from 200 to 600 MHz is at least 3 decibels greater than an average PS-ACRN electrical characteristic value of a second cable lacking a filler having at least one arm with a length greater than a first distance from a central portion of the filler of the second data cable to a line tangent to an outermost portion of two adjacent twisted pairs of insulated conductors of the second cable over the frequency range.

In another aspect, the present disclosure is directed to a cable, including a filler comprising at least one arm radiating from a central portion; a plurality of twisted pairs of insulated conductors, wherein each arm of the filler provides a physical barrier between an adjacent pair of the plurality of twisted pairs of conductors; and a conductive barrier tape surrounding the filler and plurality of twisted pairs of insulated conductors. A first arm of the filler has a length greater than a first distance from the central portion of the filler to a line tangent to an outermost portion of two adjacent twisted pairs of insulated conductors.

In some implementations, the first arm of the filler is in contact with and supporting the conductive barrier tape at a position farther from the central portion of the filler than the line tangent to the outermost portion of the two adjacent twisted pairs of insulated conductors.

In some implementations, the first arm of the filler has a length less than a second distance from the central portion of the filler to an outermost portion of any insulated conductor of the plurality of twisted pairs of insulated conductors. In a further implementation, the conductive barrier tape is supported by the first arm of the filler at a first position between the first distance and the second distance from the central portion of the filler.

In some implementations, the length of the first arm of the filler is different from a length of a second arm of the filler. In some implementations, the filler comprises a number of arms less than a number of the plurality of twisted pairs of insulated conductors. In a further implementation, a first twisted pair of the at least two twisted pairs of insulated conductors not physically separated by an arm of the plurality of arms of the filler has a longest lay length of the twisted pairs of insulated conductors, and a second twisted pair of the at least two twisted pairs of insulated conductors not physically separated by an arm of the plurality of arms of the filler has either a shortest lay length or second shortest lay length of the twisted pairs of insulated conductors.

In some implementations, the first arm of the filler has a non-uniform cross-sectional profile. In some implementations, an average power summed attenuation to near-end crosstalk ratio (PS-ACRN) electrical characteristic value of the data cable over a frequency range from 200 to 600 MHz is at least 3 decibels greater than an average PS-ACRN electrical characteristic value of a second cable lacking a filler having at least one arm with a length greater than a first distance from a central portion of the filler of the second cable to a line tangent to an outermost portion of two adjacent twisted pairs of insulated conductors of the second cable over the frequency range.

BRIEF DESCRIPTION OF THE FIGURES

FIGS. 3E-3N are tables of measured attenuation values for the different embodiments of balanced twisted pair cables of FIGS. 3A-3C;

FIGS. 4C-4L are tables of measured input impedance values for the different embodiments of balanced twisted pair cables of FIG. 4A;

FIGS. 5C-5L are tables of measured PS ACRN values for the different embodiments of balanced twisted pair cables of FIG. 5A.

In the drawings, like reference numbers generally indicate identical, functionally similar, and/or structurally similar elements.

DETAILED DESCRIPTION

Figure 1A:
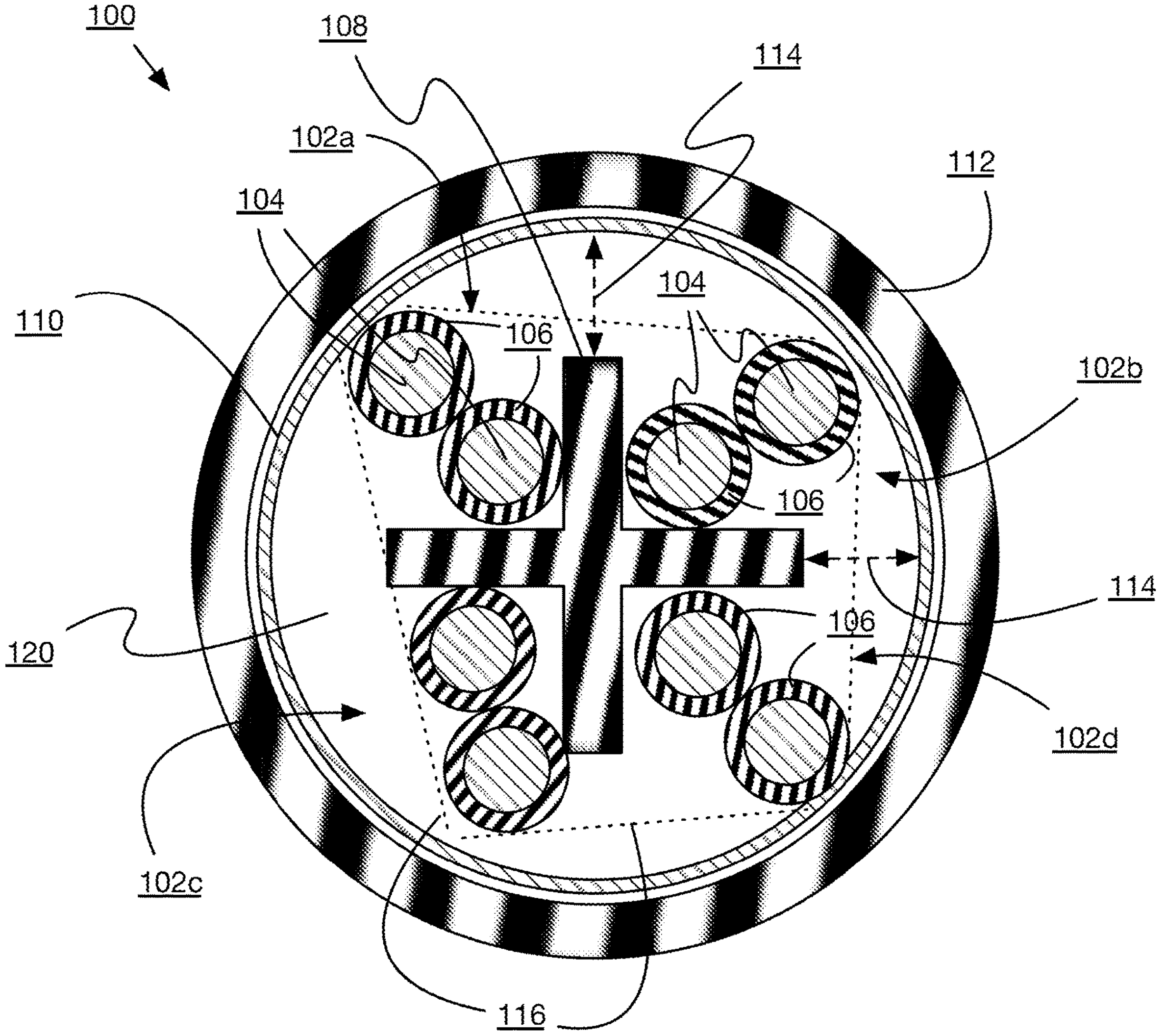
FIG. 1A is a cross section of an embodiment of a balanced twisted pair cable incorporating a filler.

High-bandwidth Category 6A cables and other similar high-bandwidth data cables have strict specifications for maximum return loss and crosstalk, amongst other electrical performance parameters. Crosstalk is the result of electromagnetic interference (EMI) between adjacent pairs of conductors in a cable, whereby signal flow in a first twisted pair of conductors in a multi-pair cable generates an electromagnetic field that is received by a second twisted pair of conductors in the cable and converted back to an electrical signal. Similarly, alien crosstalk is electromagnetic interference between adjacent cables. In typical installations with a large number of cables following parallel paths from switches and routers through cable ladders and trays, many cables with discrete signals may be in close proximity and parallel for long distances, increasing alien crosstalk. Alien crosstalk is frequently measured via two methods: power sum alien near end crosstalk (PSANEXT) is a measurement of interference generated in a test cable by a number of surrounding interfering or "disturbing" cables, typically six, and is measured at the same end of the cable as the interfering transmitter; and power sum alien attenuation to crosstalk ratio, far-end (PSAACRF), which is a ratio of signal attenuation due to resistance and impedance of the conductor pairs, and interference from surrounding disturbing cables.

Return loss is a measurement of a difference between the power of a transmitted signal and the power of the signal reflections caused by variations in impedance of the conductor pairs as well as the characteristic impedance relative to the system impedance. Any random or periodic change in impedance in a conductor pair, caused by factors such as the cable manufacturing process, cable termination at the far end, damage due to tight bends during installation, tight plastic cable ties squeezing pairs of conductors together, or spots of moisture within or around the cable, will cause part of a transmitted signal to be reflected back to the source. The same is true for the overall offset of pair characteristic impedance relative to system impedance.

Failure to meet the return loss and crosstalk requirements means that the cable may not be usable for high data rate communications such as 1000BASE-T (Gigabit Ethernet), 10GBASE-T (10-Gigabit Ethernet), or other future emerging standards. Some attempts at addressing alien and internal crosstalk include internal plastic fillers, sometimes referred to as splines, separators, or crossweb fillers, that provide separation between adjacent pairs of conductors within the cable. However, fillers add significant expense to manufacturing, and increase the thickness and density of the cables.

Conductive shields, typically made of a discontinuous or continuous conductive layer of foil or other conductive material, and potentially including one or more non-conductive layers (e.g. substrates or barriers under and/or on top of the conductive layer) may be utilized, with or without a drain wire in various implementations, to provide an EMI barrier in an attempt to control alien crosstalk and ground current disruption, but add manufacturing complexity depending on implementation. However, shields may magnify the susceptibility of cross-talk, increase delay and delay skew, and significantly reduce the twist lay delta choices to achieve crosstalk levels. However, simply increasing the size of the cable in order to space out the shield from the conductors results in larger, heavier, and more expensive cables, as well as greater variability in performance due to shifting of conductors within the cable. Thus, there are competing interests in having cables as small as possible and having uniform shielding and electrical characteristics.

For example, and referring first to FIG. 1A, illustrated is a cross section of an embodiment of a balanced twisted pair cable 100. The cable includes a plurality of unshielded twisted pairs 102*a*-102*d* (referred to generally as pairs 102) of individual conductors 104 having insulation 106. Conductors 104 may be of any conductive material, such as copper or oxygen-free copper (i.e. having a level of oxygen of 0.001% or less) or any other suitable material, including Ohno Continuous Casting (OCC) copper or silver. Conductor insulation 106 may comprise any type or form of insulation, including fluorinated ethylene propylene (FEP) or polytetrafluoroethylene (PTFE) Teflon®, high density polyethylene (HDPE), low density polyethylene (LDPE), polypropylene (PP), or any other type of suitable insulation. The insulation 106 around each conductor 104 may have a low dielectric constant (e.g. 1-3) relative to air, reducing capacitance between conductors. The insulation 106 may also have a high dielectric strength, such as 400-4000 V/mil, allowing thinner walls to reduce inductance by reducing the distance between the conductors 104 within each pair 102. In some embodiments, each pair 102 may have a different degree of twist or lay (i.e. the distance required for the two conductors to make one 360-degree revolution of a twist), reducing coupling between pairs. In other embodiments, two pairs may have a longer lay (such as two opposite pairs 102*a*, 102*c*), while two other pairs have a shorter lay (such as two opposite pairs 102*b*, 102*d*). Each pair 102 may be placed within a channel bordered or defined by two adjacent arms or fins of a filler 108, said channel sometimes referred to as a groove, void, region, or other similar identifier.

In some embodiments, cable 100 may include a filler 108, sometimes referred to as a spline, separator, or crossweb filler. Filler 108 may be of a non-conductive material such as flame retardant polyethylene (FRPE) or any other such low loss dielectric material, and may be solid or foamed in various implementations. In many implementations, filler 108 may have a plurality of arms, separators, or fins (generally referred to as "arms", though other terms may be utilized) radiating from a central point as shown (e.g. four arms). In some implementations with four arms at right angles to each other, each pair of arms may define a channel or quadrant of the cable containing a corresponding twisted pair of conductors. Similarly, in other implementations with a greater or fewer number arms, regions between adjacent arms may be defined as quadrants, sectors, regions, channels, sub-space, or by similar terms.

In some embodiments, cable 100 may include a conductive barrier tape 110 surrounding filler 108 and pairs 102, which may serve as an EMI barrier to mitigate ground interference. The conductive barrier tape 110 may comprise a continuously conductive tape, a discontinuously conductive tape, a foil, a dielectric material, a combination of a foil and dielectric material, or any other such materials. For example, in some implementations, a conductive material, such as aluminum foil, may be located or contained between two layers of a dielectric material, such as polyester (PET). Intermediate adhesive layers may be included between the dielectric material and conductive material. In some embodiments, a conductive carbon nanotube layer may be used for improved electrical performance and flame resistance with reduced size. In some implementations, the conductive layer may be continuous along a longitudinal length of the cable. In some implementations, the conductive layer may be continuous across a lateral width of the barrier tape (e.g. orthogonal to the longitude of the cable). In some implementations, the conductive layer may be continuous in both a longitudinal and lateral direction. In some implementations, the conductive layer may extend to each lateral edge of the barrier tape. In other implementations, the conductive layer may extend to one lateral edge of the barrier tape; in some such implementations, a top and bottom dielectric layer surrounding the conductive layer may be continuous and wrap around or fold over the conductive layer at the other lateral edge. This may reduce manufacturing complexity in some implementations. In some implementations, edges of the tape may include folds back over themselves. In one embodiment, the tape has three layers in a dielectric/conductive/dielectric configuration, such as polyester (PET)/Aluminum foil/polyester (PET). In some embodiments, the tape may not include a drain wire and may be left unterminated or not grounded during installation.

In some embodiments, the cable 100 may include a jacket 112 surrounding the barrier tape 110, filler 108, and/or pairs 102. Jacket 112 may comprise any type and form of jacketing material, such as polyvinyl chloride (PVC), fluorinated ethylene propylene (FEP) or polytetrafluoroethylene (PTFE) Teflon®, high density polyethylene (HDPE), low density polyethylene (LDPE), or any other type of jacket material. In some embodiments, jacket 112 may be designed to produce a plenum- or riser-rated cable.

Figure 1B:
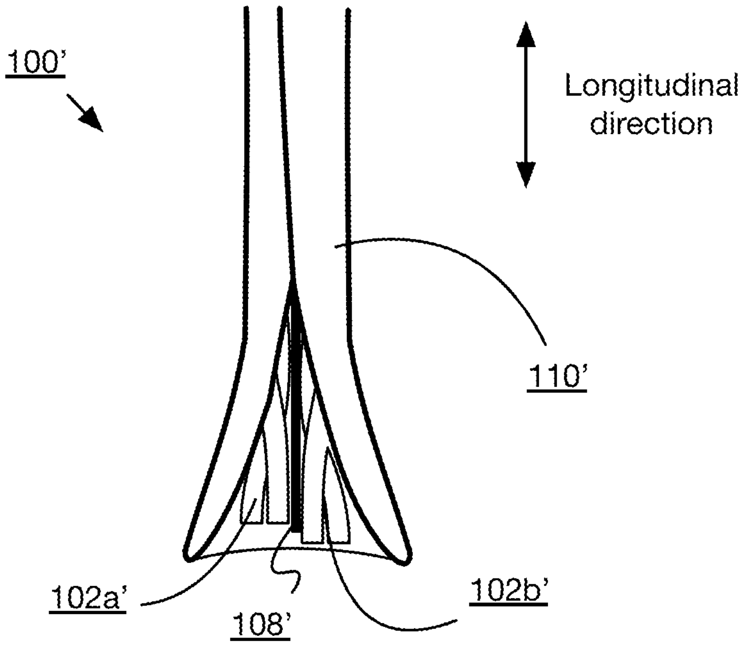
FIG. 1B is a top view of an embodiment of the cable of FIG. 1A with a longitudinally wrapped shield.

Although shown for simplicity in FIG. 1A as a continuous ring, barrier tape 110 may comprise a flat tape material applied around filler 108 and pairs 102, and may have an overlapping portion. For example, FIG. 1B is a top view of an embodiment of the cable 100' of FIG. 1A (as a top view, only conductor pairs 102*a*' and 102*b*' are visible; conductor pairs 102*c*' and 102*d*' are hidden from view beneath the conductor pairs 102*a*' and 102*b*' and filler 108'). As shown, the cable 100' includes a longitudinally wrapped shield 110' surrounding the conductor pairs 102' and filler 108' (a jacket 112 is not illustrated for clarity, and may also be optional in some implementations). Longitudinally wrapped shields as shown are sometimes referred to as "cigarette" wraps or by similar terms and are wrapped around the filler and conductor pairs during manufacturing, with a seam in the shield 110' running longitudinally along the length of the cable (as shown, the seam may overlap an inner portion of the shield in many implementations).

Longitudinally wrapped shields are simple for manufacturing, but may not provide the best performance for avoidance of crosstalk and return loss. For example, external and internal signals may couple to the edge or seam of the shield and travel along the length of the cable. Gaps in the overlapping portions of the shield may also allow small wavelength signals to pass through the shield, reducing its ability to block EMI. Additionally, longitudinally wrapped shields may not be wrapped very tightly, resulting in an air space between the shield and conductor pairs 102'. This may allow the conductor pairs 102 to move relative to each other (although constrained by the filler in two directions, for a cross-shaped filler).

For example, returning briefly to FIG. 1A, in many implementations of cables incorporating fillers 108, the lateral dimensions (height and width) of the filler 108 may be smaller than the diameter of the cable, theoretically resulting in gaps 114 between the filler 108 and barrier tape 110 as shown and creation of an air space 120 (although, in practice and in many implementations, as discussed below, the barrier tape 110 and/or jacket 112 are collapsed down onto the conductor pairs). For example, the cable has a minimum diameter determined by a line through a pair of a conductors (e.g. 102*a*), the center of the filler 108, and a second pair of conductors (e.g. 102*d*). As the conductors and filler are substantially solid and not compressible, when the pairs are oriented such that the conductors are on a diameter of the cable as shown, the cable cannot compress further in this direction. The filler is typically smaller than this diameter for cost savings, as the filler may be a substantial part of the cost of manufacturing of the cable, and it adequately serves to separate the conductor pairs. For example, high flame-rating materials for fillers are highly expensive, so it is typically desirable to reduce the size of the filler as much as possible. However, due to the gaps 114 and resulting air space 120 between the barrier tape 110, the conductor pairs may be able to move relative to each other in a direction away from the filler. For example, in the illustrated example of FIG. 1A, conductor pair 102*c* has space to move to the left, farther from conductor pair 102*d*. This may result in variability in crosstalk between conductor pairs at certain positions along the cable, resulting in impaired performance.

As shown, the theoretical air space 120, sometimes referred to as a gap region, air-dielectric region, sub-space within the cable, or by other similar terms, is due to both the small dimensions of the filler and the surrounding barrier tape 110, along with the maintained position of the barrier tape (and jacket). Because the filler 108 has arms that do not extend past a line 116 (shown as dotted lines) tangent to the outermost surfaces of adjacent conductor pairs (e.g. pairs 102*a* and 102*c*, or 102*c* and 102*d*), a substantial air space 120 with varying volume (particularly longitudinally along the cable as the twisted pairs of conductors are in different orientations) is present between the conductor pairs and the barrier tape 110. If the barrier tape is relatively loose due to the manner in which it is wrapped around the conductors and filler during manufacture, which may apply particularly in some implementations of longitudinally wrapped tapes, or if the barrier tape is fixed to a surrounding stiff jacket, the tape is not pressed down tightly to the conductor pairs 102, potentially allowing this uncontrolled air space 120 to form.

Figure 1C:
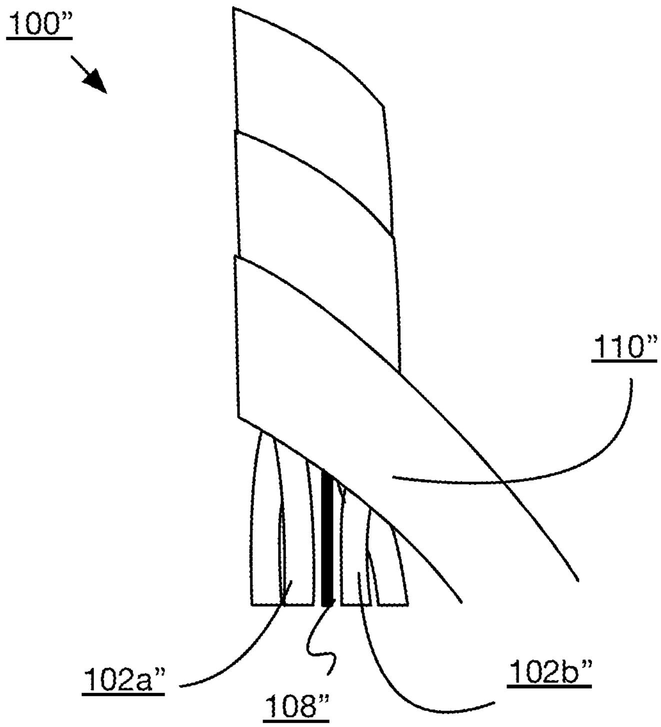
FIG. 1C is a top view of an embodiment of the cable of FIG. 1A with a helically wrapped shield.

However, as discussed above, in many implementations, the barrier tape may be pulled tight during manufacture or pressed down onto the conductor pairs. FIG. 1C is a top view of an embodiment of the cable 100" of FIG. 1A with a helically wrapped shield 110" (as a top view, only conductor pairs 102*a*" and 102*b*" are visible; conductor pairs 102*c*" and 102*d*" are hidden from view beneath the conductor pairs 102*a*" and 102*b*" and filler 108"). As shown, the cable 100" includes a helically wrapped shield 110", sometimes referred to as a spiral-wrapped shield or barrier tape, surrounding the conductor pairs 102" and filler 108" (a jacket 112 is not illustrated for clarity, and may also be optional in some implementations). In many implementations, substantial tension may be applied to the helically wrapped shield 110" during manufacture, allowing the shield to be pressed or squeezed tightly to the conductor pairs. This reduces or eliminates the air space surrounding the conductor pairs, and also “locks down” or prevents the conductor pairs from moving relative to each other, reducing crosstalk.

Figure 1D:
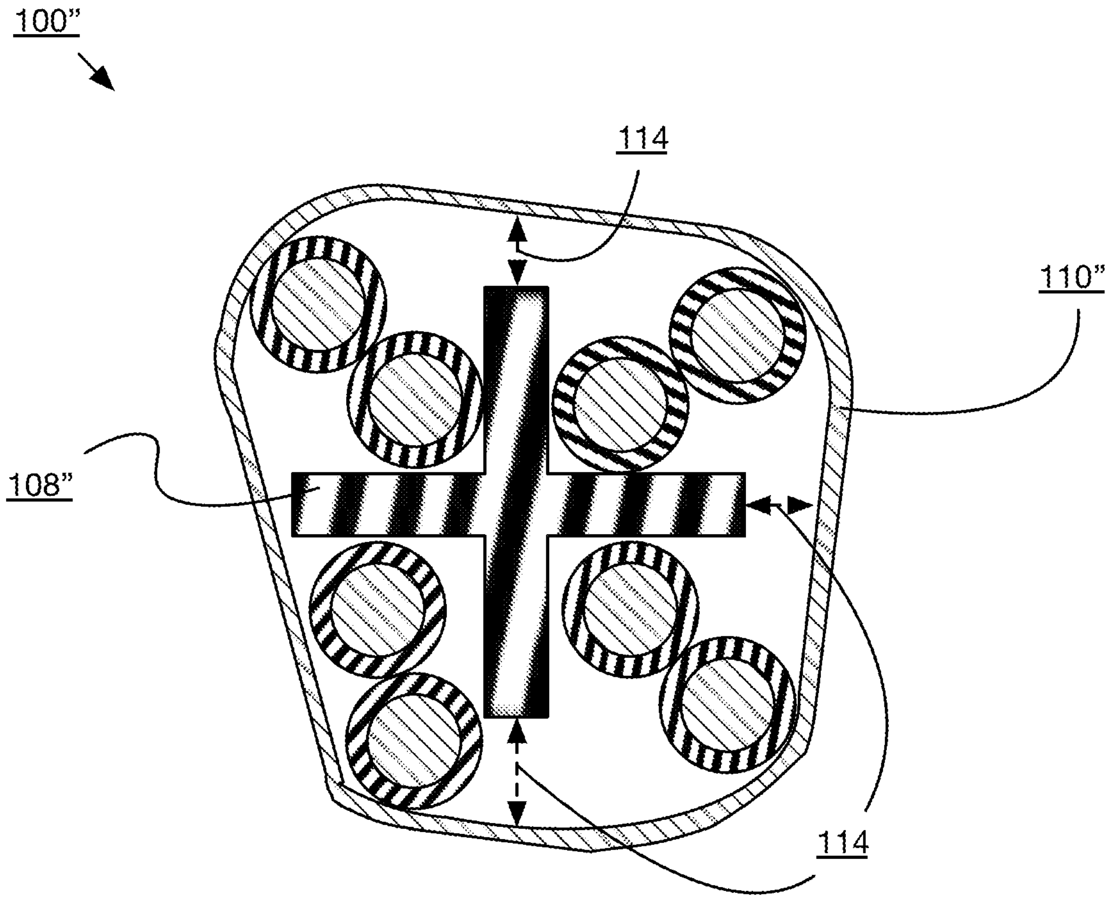
FIG. 1D is a cross section of an embodiment of the cable of FIG. 1C with a collapsed helically wrapped shield.

However with either a helically wrapped tape under tension or a longitudinally wrapped tape compressed down against the conductors, squeezing the shield tightly to the conductor pairs affects the cross-sectional geometry of the cable. FIG. 1D is a cross section of an embodiment of the cable 100" of FIG. 1C with a collapsed helically wrapped shield 110", and lacking an implementation of the shield-supporting filler discussed herein. As shown, while the air gaps 114 are substantially reduced (and almost eliminated on one side), the cable is no longer round. Worse, as each conductor pair twists along the longitudinal length of the cable, the cross-sectional geometry of the cable (and accordingly, the distance of the shield 110" from each conductor) will vary. This lack of uniformity may impair alien crosstalk performance, and result in non-optimized ground plane uniformity and lack of stability for impedance/RL performance. Further, heavier insulation may be required to counteract the effects of increased attenuation and lowered impedance.

Figure 2A:
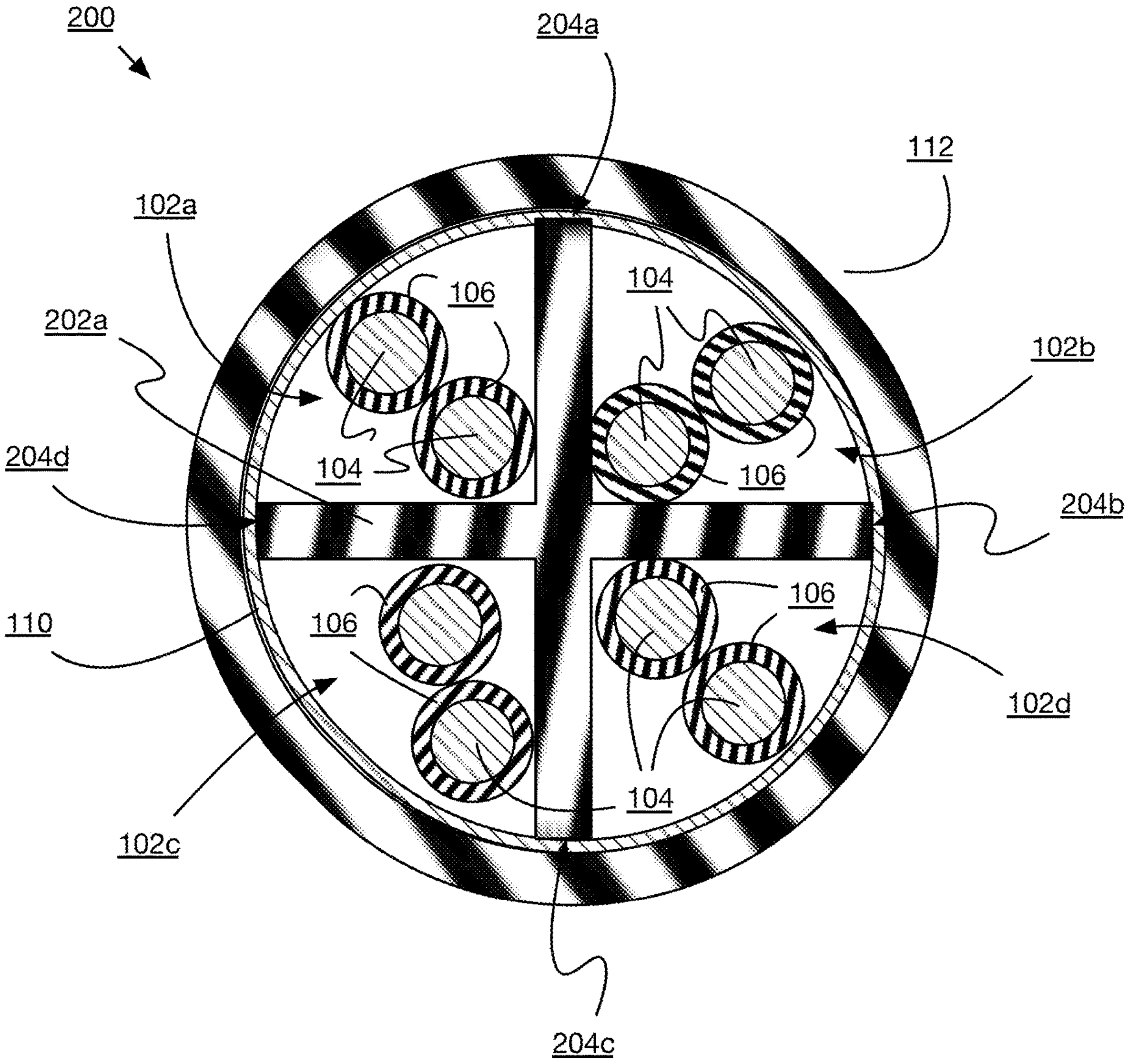
FIG. 2A is a cross section of an embodiment of a balanced twisted pair cable incorporating a shield-supporting filler.

Accordingly, in implementations of cables lacking embodiments of the shield-supporting fillers discussed herein, reduction in the sizing of a filler may result in non-uniform cable cross-sections and impaired electrical performance, These and other problems may be solved by a cable utilizing a well-tuned shield or barrier-tape supporting filler. FIG. 2A is a cross section of an embodiment of a balanced twisted pair cable 200 incorporating a shield-supporting filler 202*a*. As shown, the dimensions of the filler 202*a* are substantially larger than the implementations of FIGS. 1A-1D, such that terminal portions of each arm of the filler 202*a* contact the surrounding shield 110 at contact points 204*a*-204*d*. The shield 110 may be applied helically during manufacture with significant tension, reducing air gaps around the conductor pairs and preventing the conductor pairs from moving relative to each other. In many implementations, as shown, the cable and/or shield 110 may not be perfectly circular, as the tension applied to the shield may cause it to be pulled in closer where room is available due to the orientation of a conductor pair (e.g. as shown, the radius of the cable between contact points 204*c* and 204*d* is slightly smaller than between other adjacent pairs of contact points). While pulling the barrier tape or shield tight against the conductor pairs prevents the conductors from moving relative to each other, decreasing performance variability, the proximity of the shield to the conductors may degrade the electrical characteristics of the cable, and particularly attenuation, impedance, and near end crosstalk (NEXT). However, these characteristics and variability may be optimized by adjusting the length of fins of the filler to support or lift the shield or barrier tape away from the conductors. As shown in the accompanying graphs and tables of FIGS. 3A-5L, there is an unexpected but substantial electrical performance improvement when the filler fin length is optimized, while not increasing the cable core diameter.

Figure 2B:
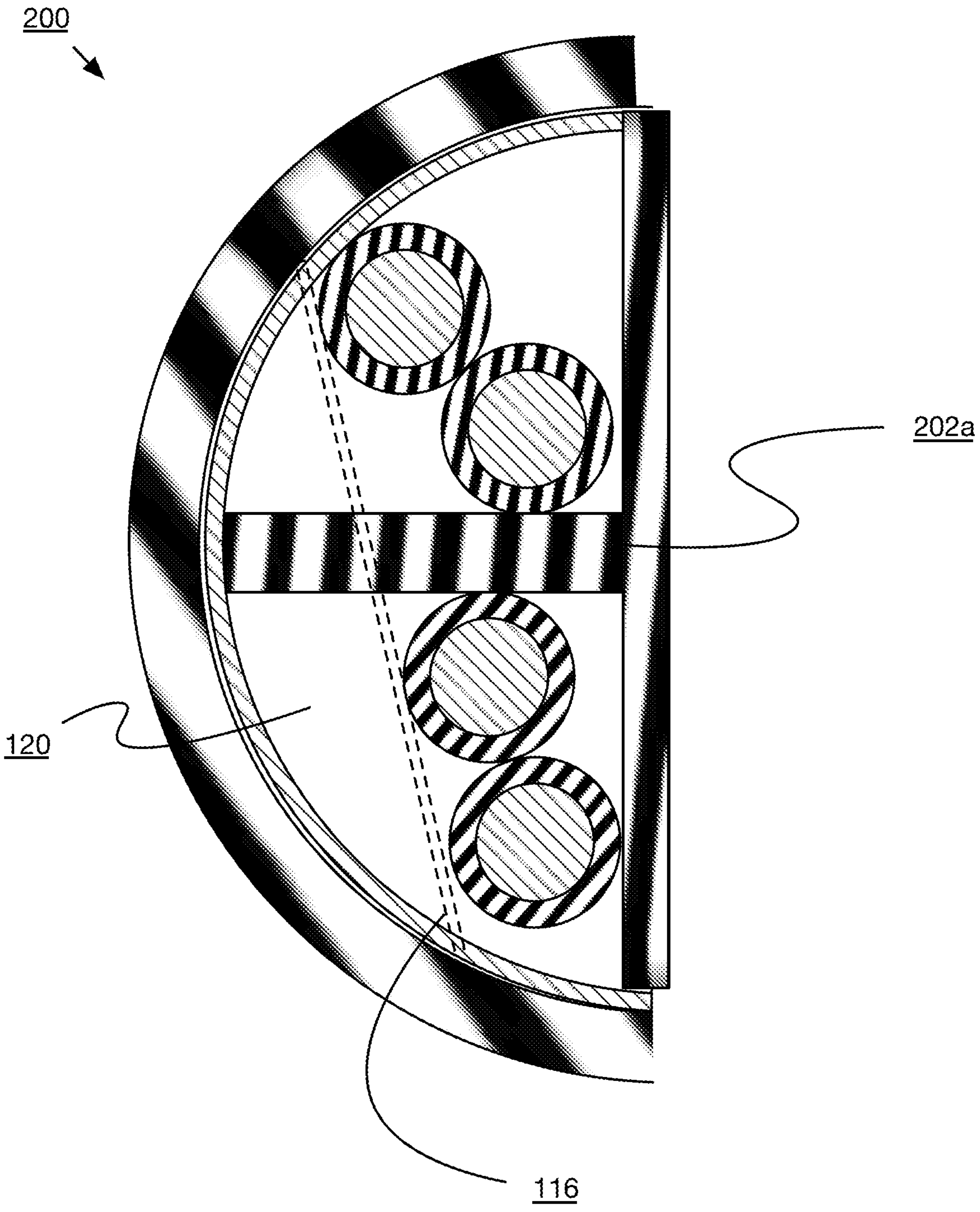
FIG. 2B is an enlarged portion of the embodiment of the balanced twisted pair cable incorporating a shield-supporting filler of FIG. 2A.

FIG. 2B is an enlargement of the left side of the embodiment of the cable illustrated in FIG. 2A. In the example illustrated, the arms of the filler 202*a* have a length approximately equal to the inner radius of the shield 110 or equal to the maximum radius of the cable through a conductor pair, such that the cable is substantially circular. However, other lengths are possible and may be utilized to optimize various characteristics of the cable. For example, the arm length may be shortened to a length that is at least as long as the distance from the center of the filler to the tangent line 116 that is tangential to the outer portions of the conductor pairs (e.g. tangent to a surface of the conductors having the greatest displacement in the direction of the arm, such as the leftmost edges of the left upper and left lower conductor pairs for the left arm, topmost edges of the top left and top right conductor pairs for the top arm, etc.). Reducing the length of the arm to a length smaller than shown but at least as long as this tangent line will reduce the air space 120, but will still ensure a larger air space and more uniform cable than reducing the arm length to a length smaller than the tangent line, as shown in FIG. 1D. As discussed above, having an arm length within this range from the tangent line to the maximum width of a conductor pair results in a cable that is as small as possible without reducing the conductor diameter or width of other components, while retaining substantial uniformity of the cross section of the cable at any point along its longitudinal length.

Using a non-diameter increasing shield-supporting filler provides an additional benefit, in that the spacing of the shield relative to the conductor pairs may be controlled to a greater degree relative to cables utilizing smaller fillers. This allows for more latitude in other characteristics of the cable, such as lay length of conductor pairs. Specifically, in many implementations, by tuning the air space volume and shield radial proximity, and controlling separation of the shield from conductor pairs, longer lay lengths (or looser twists) may be used for many twisted conductor pairs, reducing insulation thickness, and cable size while still accomplishing the particular electrical requirements for the cable standard.

Figure 2C:
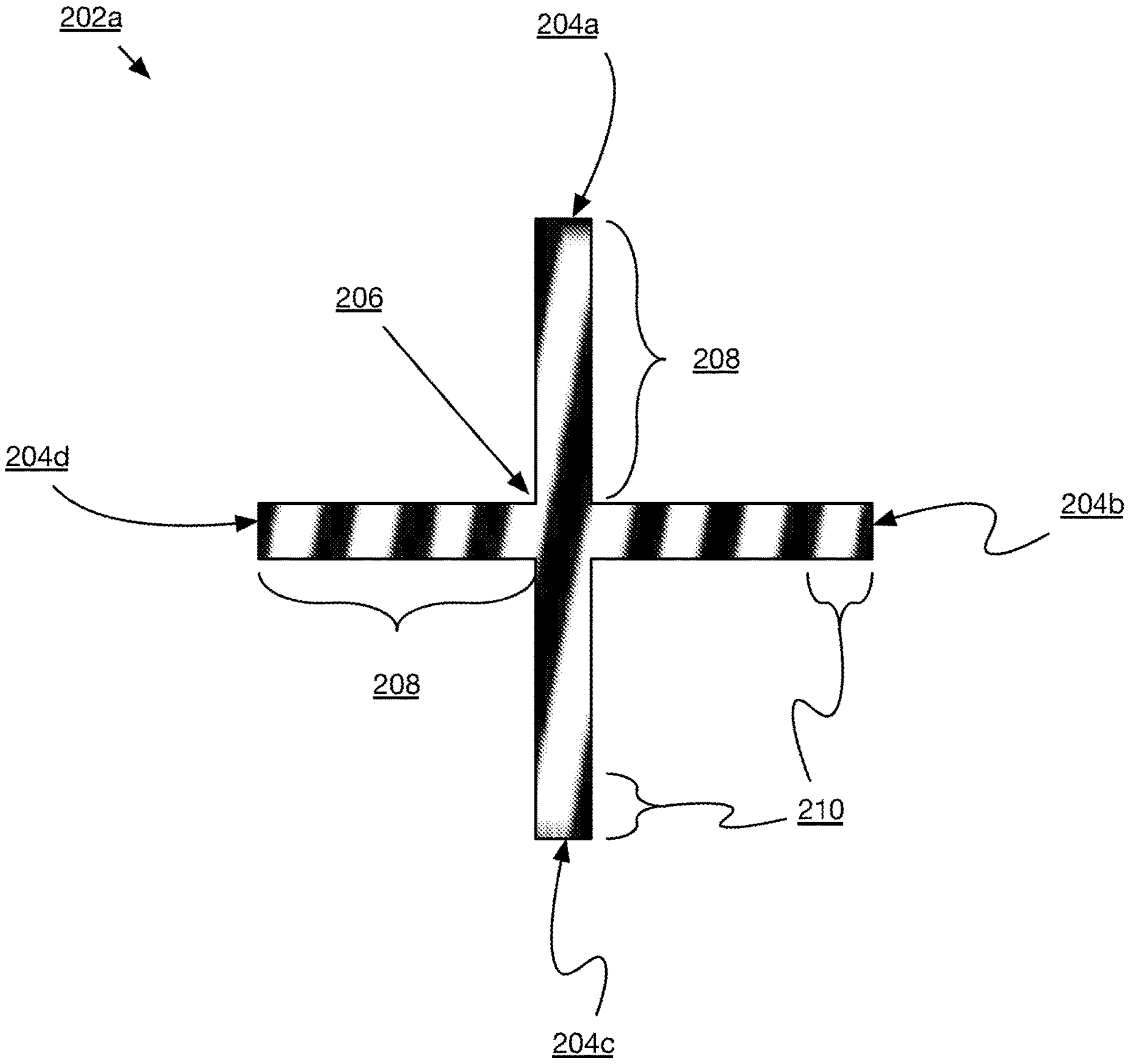
FIG. 2C is a cross section of an embodiment of the shield-supporting filler of FIG. 2A.

FIG. 2C is a cross section of an embodiment of the shield-supporting filler 202*a* of FIG. 2A. As shown, filler 202*a* may have a cross-shaped cross section with a plurality of arms 208 radiating from a central point 206 and having a terminal portion 210 having end surfaces 204*a*-204*d*. The length of each arm 208 may be longer than twice the diameter of an insulated conductor, or longer than the longest dimension across a twisted pair of conductors, such that each arm extends beyond the pairs and contacts the shield at an end surface 204. In some implementations, each arm may be approximately 40% of the total radius of the cable or greater. For example, in some implementations, each arm may have a length approximately equal to the cable diameter minus the total thickness of any jacket and shield, minus the width of the central portion 206 of the filler.

Figure 2D:
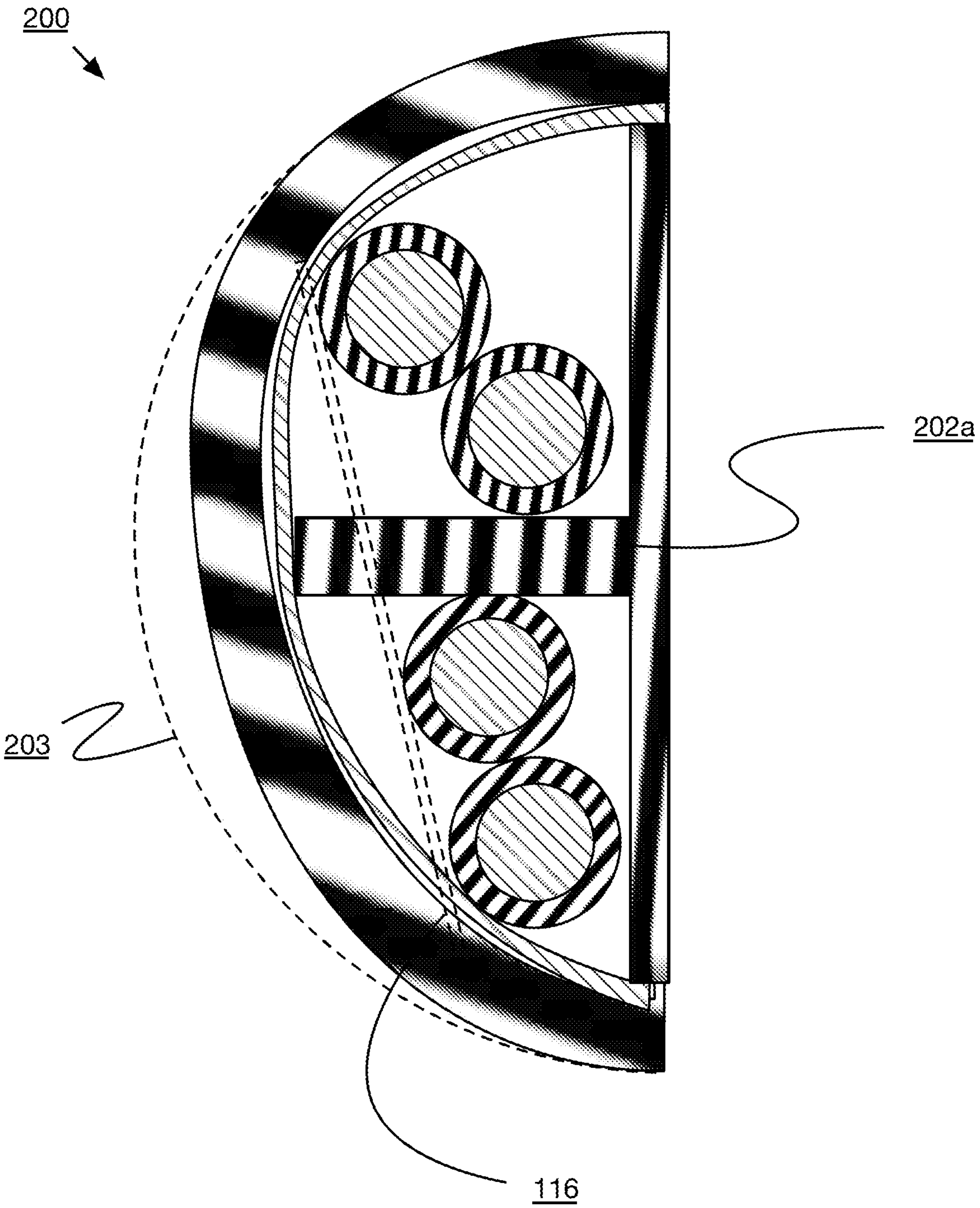
FIG. 2D is an enlarged portion of a cross section of another embodiment of the balanced twisted pair cable including a shield-supporting filler with reduced arm or fin length.

FIG. 2D is an enlarged portion of a cross section of another embodiment of the balanced twisted pair cable including a shield-supporting filler with reduced arm or fin length. In the example implementation shown, the left-pointing filler arm 202*a* is reduced to an intermediate length, greater than a length corresponding to tangent line 116, but less than the length of arm 202*a* shown in FIG. 2B, such that the shield and jacket can be drawn tighter or collapsed to a smaller diameter than the full diameter 203 (shown in dashed line). In the example implementation of FIG. 2D, upwards and downwards pointing arms of the filler are the same length as shown in the implementation of FIG. 2B for comparison purposes. In many instances, these arms would be similarly shortened.

Figure 2E:
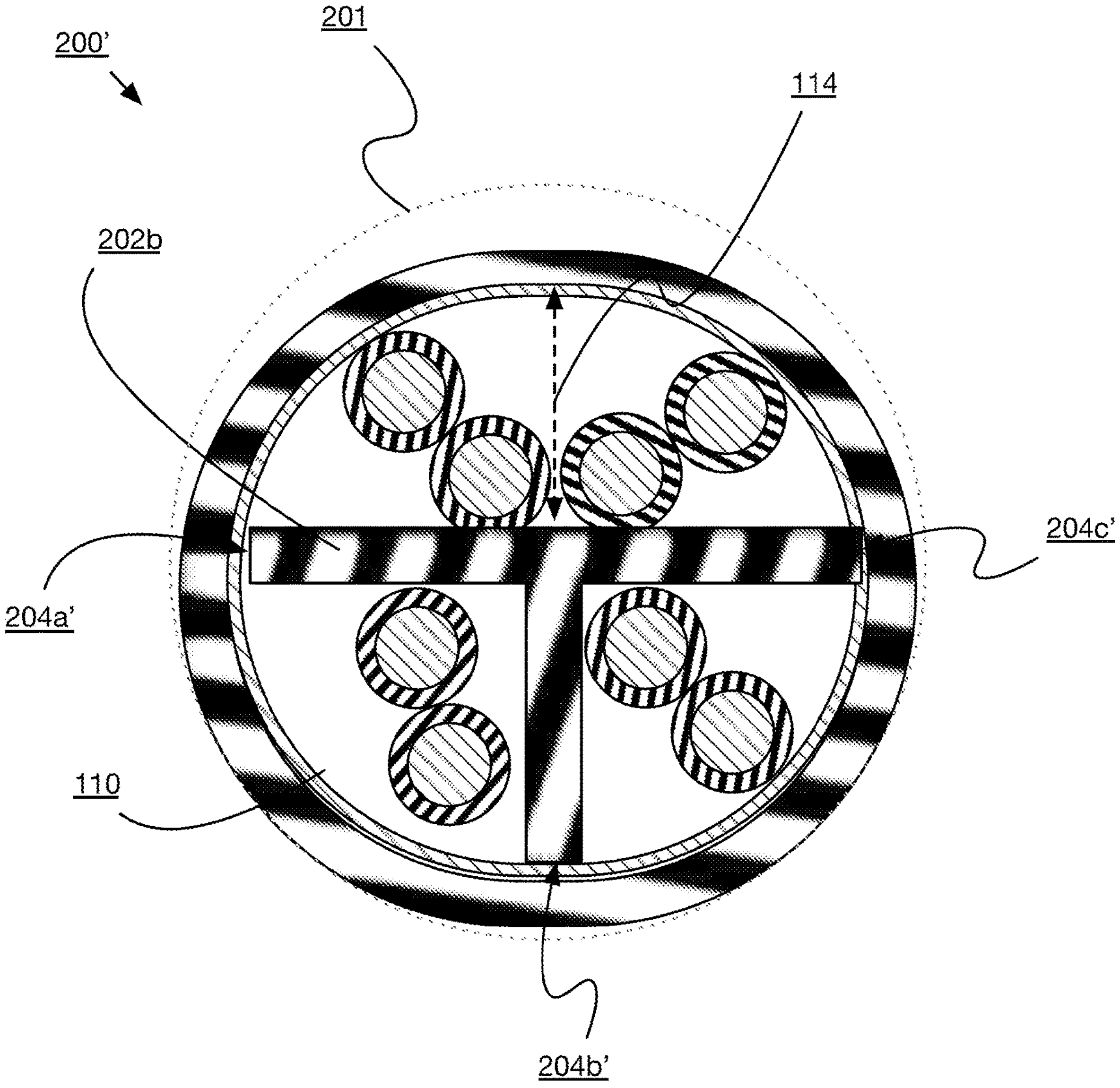
FIG. 2E is a cross section of another embodiment of a balanced twisted pair cable incorporating a shield-supporting filler with an omitted arm or fin.

Although shown with four arms in a cross-shape, other geometries may be used for the filler to reduce cost while still supporting the shield at a plurality of contact points 204. For example, FIG. 2E is a cross section of another embodiment of a balanced twisted pair cable 200' incorporating a shield-supporting filler 202*b* with three arms in a T-shape. The filler 202*b* supports the shield 110 at three contact points 204*a*'-204*c* rather than four as in FIG. 2A. While the cross section of the cable is less cylindrical than that of FIG. 2A (compare to the circular profile 201 shown in dotted line), being compressed at the top, the performance of the cable may still be sufficient, and may result in a reduced size cable. The cable is also lighter due to the reduced material of the filler. Furthermore, while the conductor pairs at the top of the conductor may be pressed closer together during manufacture due to the tension on the shield, the non-separated pairs may be selected to reduce NEXT effects. For example, this may be done by selecting the pair having the longest lay length (e.g. lay #1) and the pair having the shortest lay length (e.g. lay #4) or second-shortest lay length (e.g. lay #3), or the pair having the shortest lay length (e.g. lay #4) and the pair having the second longest-lay length (e.g. lay #2), to be adjacent and not separated by a filler arm. Different pairs may be selected, with a requirement in many implementations that any adjacent pairs not separated by a filler arm do not have the most similar lay lengths (e.g. not lay lengths #1 and #2; #2 and #3; or #3 and #4, but any other combination). Although specific lengths are not mentioned above, in many implementations, simply organizing the pairs such that similar lengths are not adjacent may help achieve this benefit. In some implementations, adjacent pairs may be selected based on other relationships between the lay lengths (e.g. not integer multiples of a common wave length, etc.).

Figure 2F:
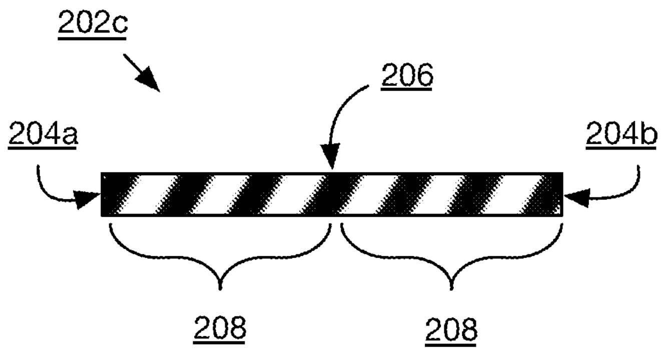
FIGS. 2F-2L are cross-sections of embodiments of fillers.

Similarly, FIG. 2F is a cross section of another embodiment of a shield-supporting filler 202*c* having two arms 208 in a line, with two contact points 204*a*-204*b*. The conductor pairs on each side of the filler 202*c* may be selected as above to reduce crosstalk effects (e.g. a longest lay length pair and second shortest lay length pair on one side of the filler, and a second longest lay length pair and shortest lay length pair on the other side of the filler). While the cable may be somewhat flatter or oval shaped as a result of tension on the shield during helical wrapping, this may be sufficient for many uses, while attaining substantially reduced effective diameter and weight of the cable.

Figure 2G:
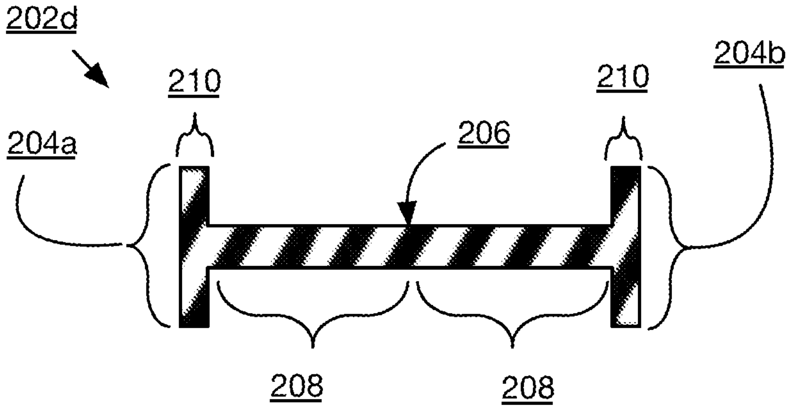
Figure 2H:
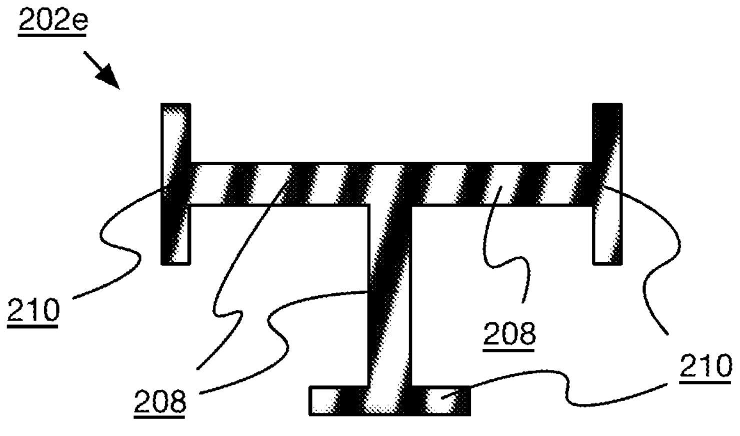
Figure 2I:
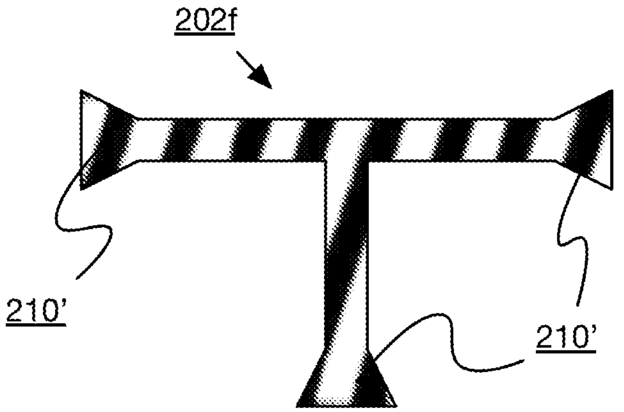

Each terminal portion 210 of each arm 208 may be blunt, as shown in the implementations of FIGS. 2A-2F, or may have other shapes. For example, FIG. 2G illustrates a cross section of an implementation of a shield-supporting filler 202*d* with T-shaped terminal portions 210, resulting in wider contact portions 204*a*-204*b*. FIG. 2H similarly illustrates a cross-section of an implementation of a T-shaped shield-supporting filler 202*e* with three arms, each terminating in a T-shaped terminal portion 210. FIG. 2I illustrates a cross-section of an implementation of a T-shaped shield supporting filler 202*f* with three arms, each terminating in a trapezoidal or anvil-shaped terminal portion 210'.

Figure 2J:
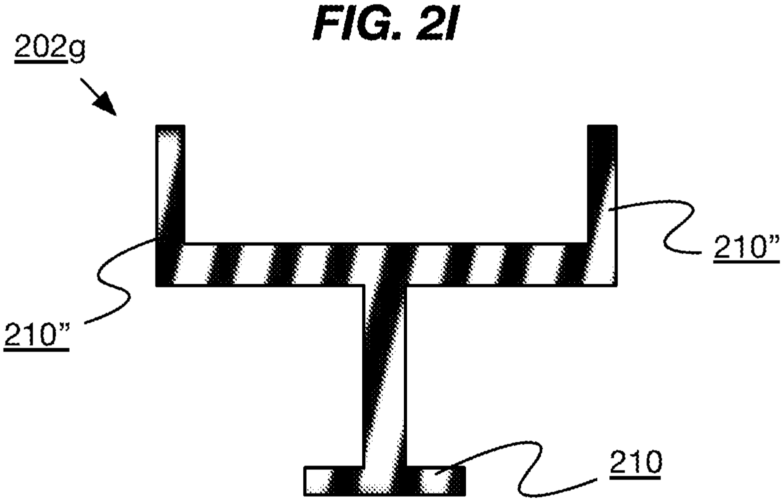
Figure 2K:
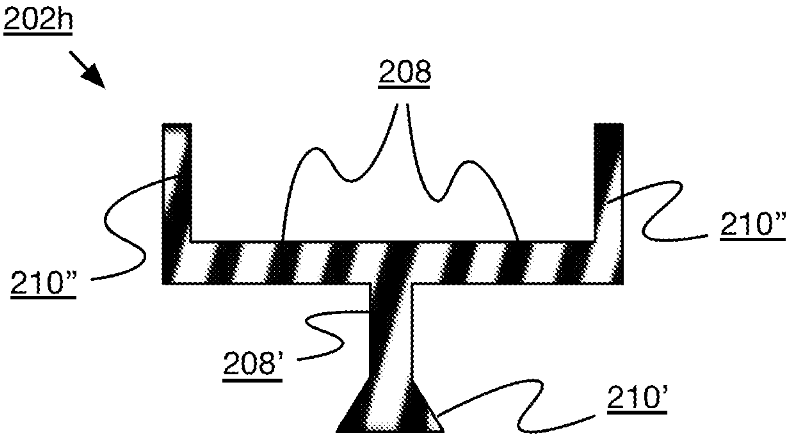
Figure 2L:
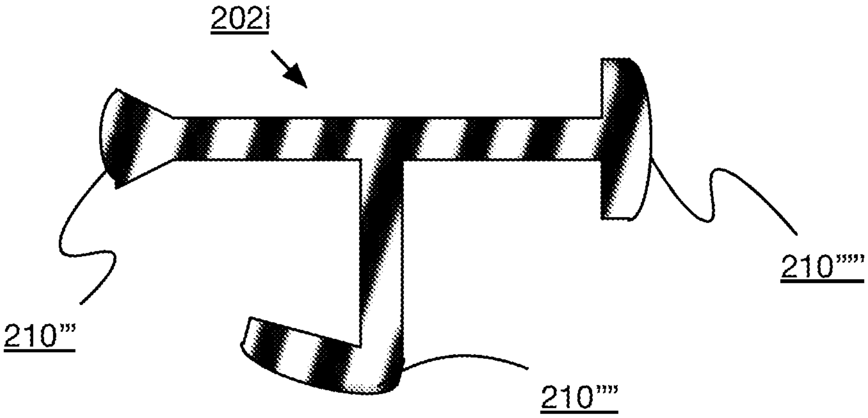

Furthermore, each arm does not need to be identical in profile. For example, FIG. 2J illustrates a cross-section of an implementation of a T-shaped shield supporting filler 202*g* with three arms, in which two arms terminate in L-shaped terminal portions 210", with a third arm terminating in a T-shaped portion 210. Similarly, FIG. 2K illustrates a cross-section of an implementation of a T-shaped shield supporting filler 202*h* with three arms, with two arms terminating in T-shaped portions 210'' and one arm terminating in an anvil shaped portion 210'. Terminal portions may thus be anvil-shaped, rounded, T-shaped, L-shaped, blunt, or otherwise shaped. Although shown symmetric, in some embodiments, the terminal portions may have asymmetric profiles. Similarly, although shown flat, in some embodiments, end surfaces of the terminal portions may be curved to match an inner surface of the shield. For example, FIG. 2L illustrates a cross-section of an implementation of a filler having rounded or curved end surfaces of terminal portions 210''', 210'''', and 210''''' to provide more continuous contact with an inner surface of a shield.

Furthermore, the arms may be of different lengths in some implementations, as shown above in the embodiment of FIG. 2D. For example, as shown in FIG. 2K, the bottom arm 208' is shorter than side arms 208. Each arm may still contact and support a tightly wrapped shield, as discussed above. While this may result in a less cylindrical cable, the performance of the cable may be sufficient, and the cable may further have reduced weight and cost relative to a cable with identical arms.

Figure 3A:
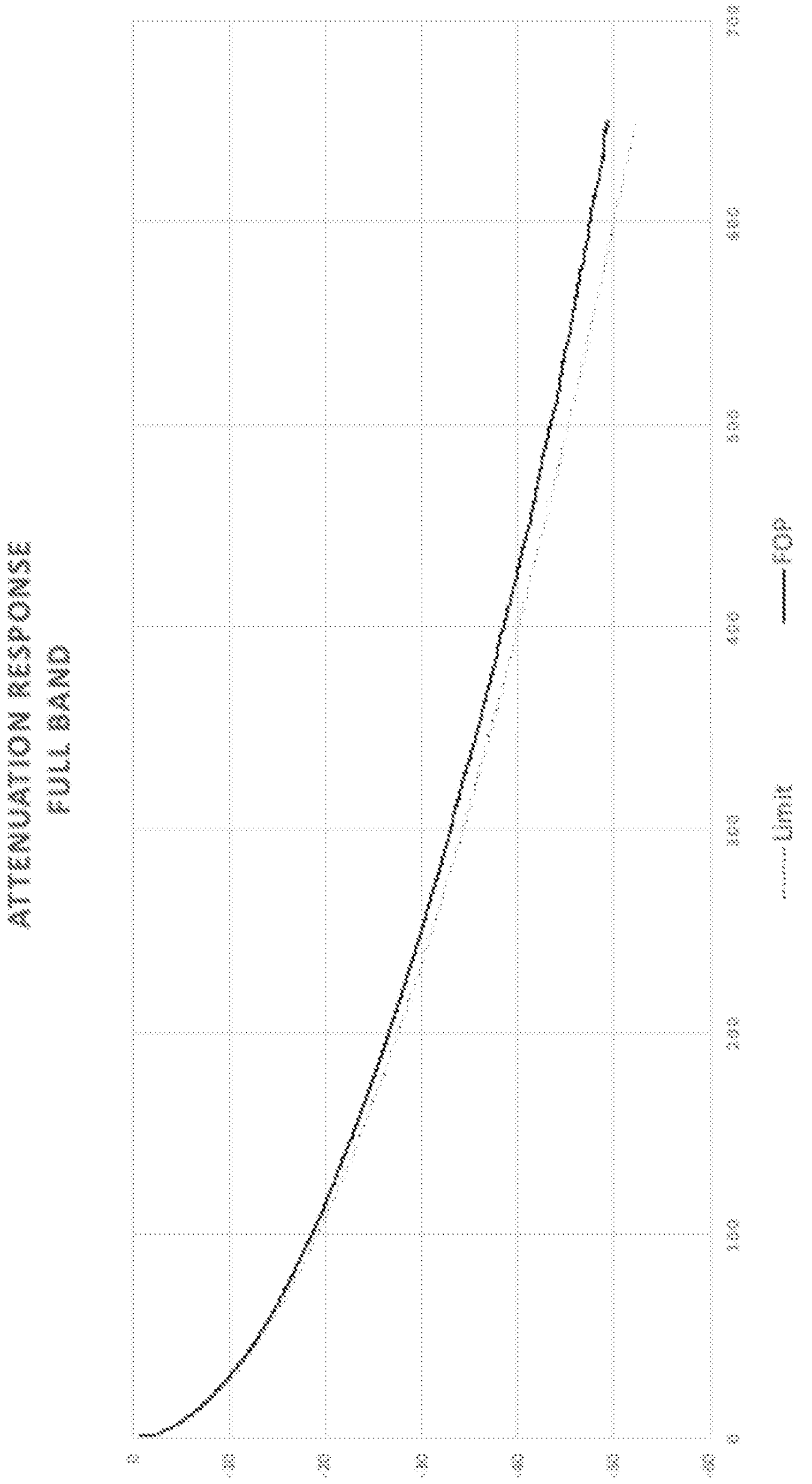
FIGS. 3A-3C are graphs of attenuation response over frequency for different embodiments of balanced twisted pair cables.
Figure 3B:
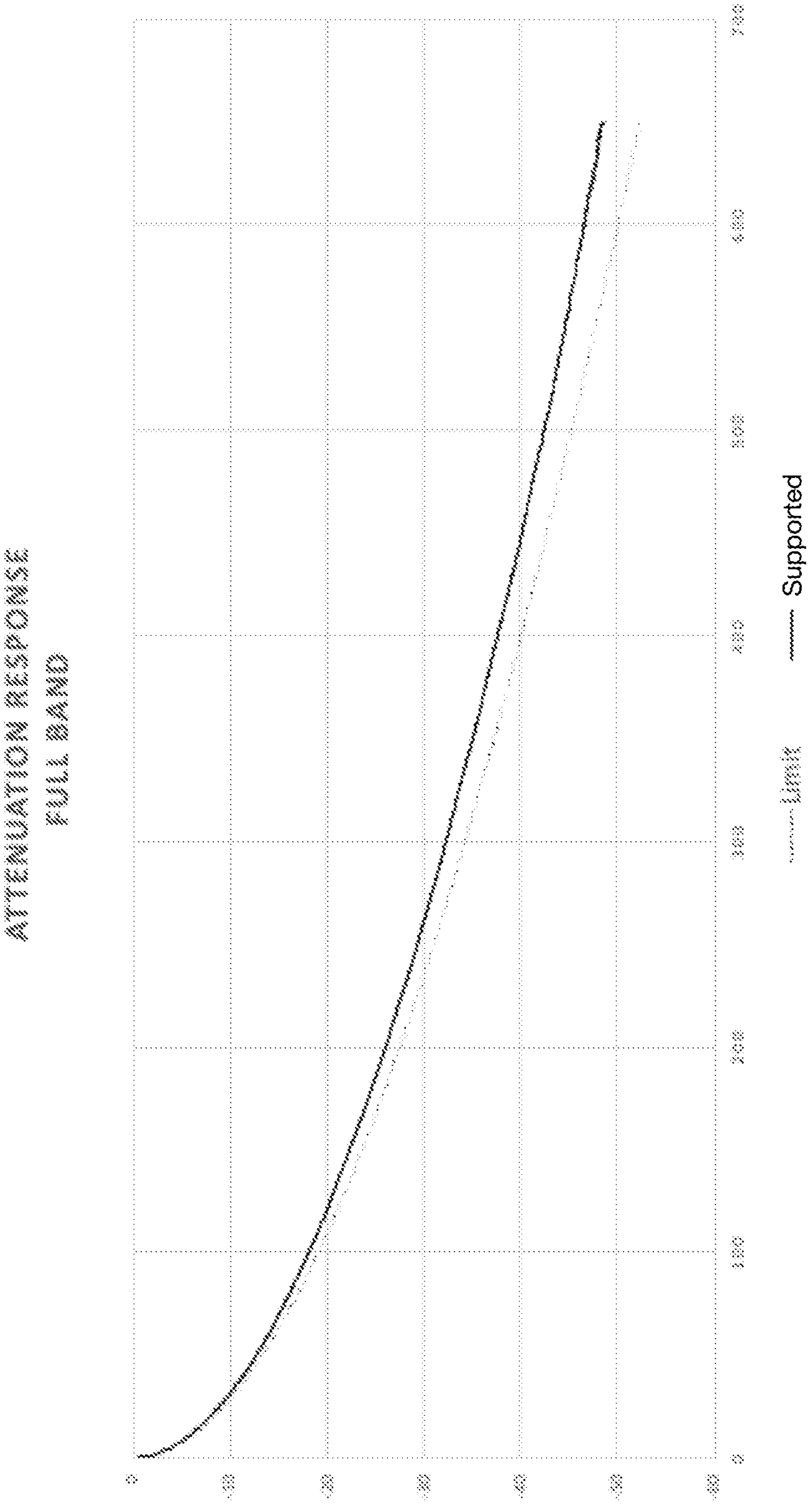
Figure 3C:
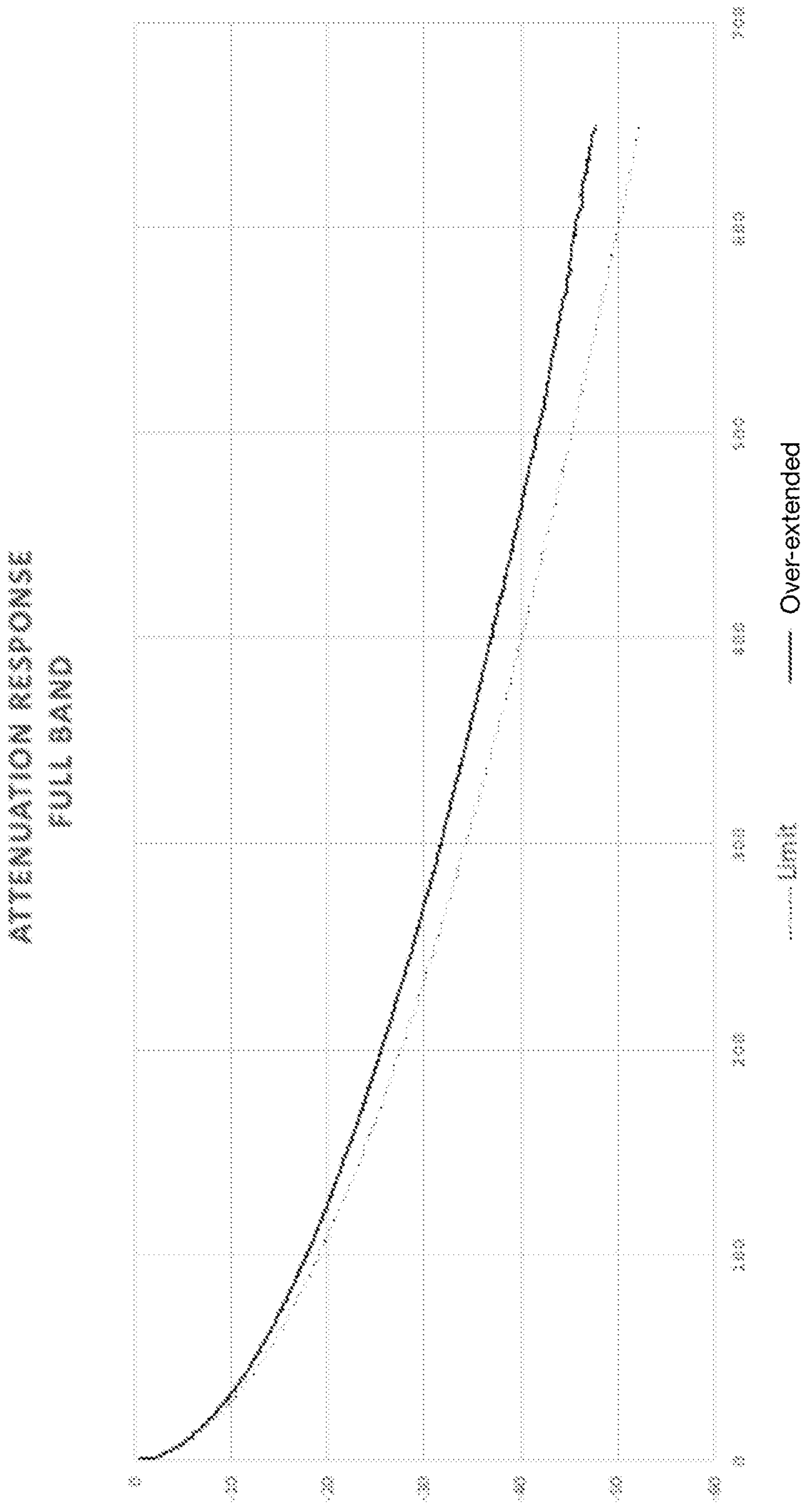

FIGS. 3A-3C are graphs of attenuation response over frequency for different embodiments of balanced twisted pair cables (specific measured values at each frequency for the different embodiments are listed in the tables of FIGS. 3E-3N). Specifically, FIG. 3A illustrates attenuation over frequency for an embodiment of a balanced twisted pair cable in which a foil shield is not supported by a filler, but instead is wrapped directly over the twisted pairs of conductors with no or minimal intervening air space (e.g. as shown in the example embodiment of FIG. 1D), referred to as foil-over-pairs or "FOP". The attenuation response is shown relative to a standard attenuation limit ("Limit", shown in dotted line) in dB at each frequency in MHz, defined as:

$$-\left(\left(1.82*\sqrt{\text{frequency}}\right)+(0.0091*\text{frequency})+\frac{0.25}{\sqrt{\text{frequency}}}\right).$$

In other implementations, other standard limits or comparisons may be utilized.

Similarly, FIG. 3B illustrates attenuation over frequency for an embodiment of a balanced twisted pair cable in which a foil shield or barrier is partially lifted by arms or fins of a filler or separator to an intermediate point, above a tangent line between adjacent conductor pairs, but not to a full diameter of the cable (e.g. as shown in the embodiments of FIG. 2D or 2E), referred to as "supported". The standard attenuation limit is shown for comparison purposes. As shown, the supported cable has less attenuation than the FOP cable, particularly at higher frequencies.

FIG. 3C is a graph illustrating attenuation over frequency for an embodiment of a balanced twisted pair cable in which a foil shield or barrier is over-extended to more easily meet the electrical performance requirements of a specification for the cable, though having a large effective diameter. In such an embodiment, the foil shield or barrier may be in contact with each arm or fin of the filler or separator at a full diameter of the cable (e.g. as shown in the embodiment of FIG. 2A), referred to as "over-extended". The standard attenuation limit is shown for comparison purposes. As shown, the over-extended cable has even less attenuation than the FOP or supported cables, particularly at higher frequencies. However, the over-extended cable also has a cross-sectional diameter larger than the FOP or supported cable implementations, and requires more filler material.

Figure 3D:
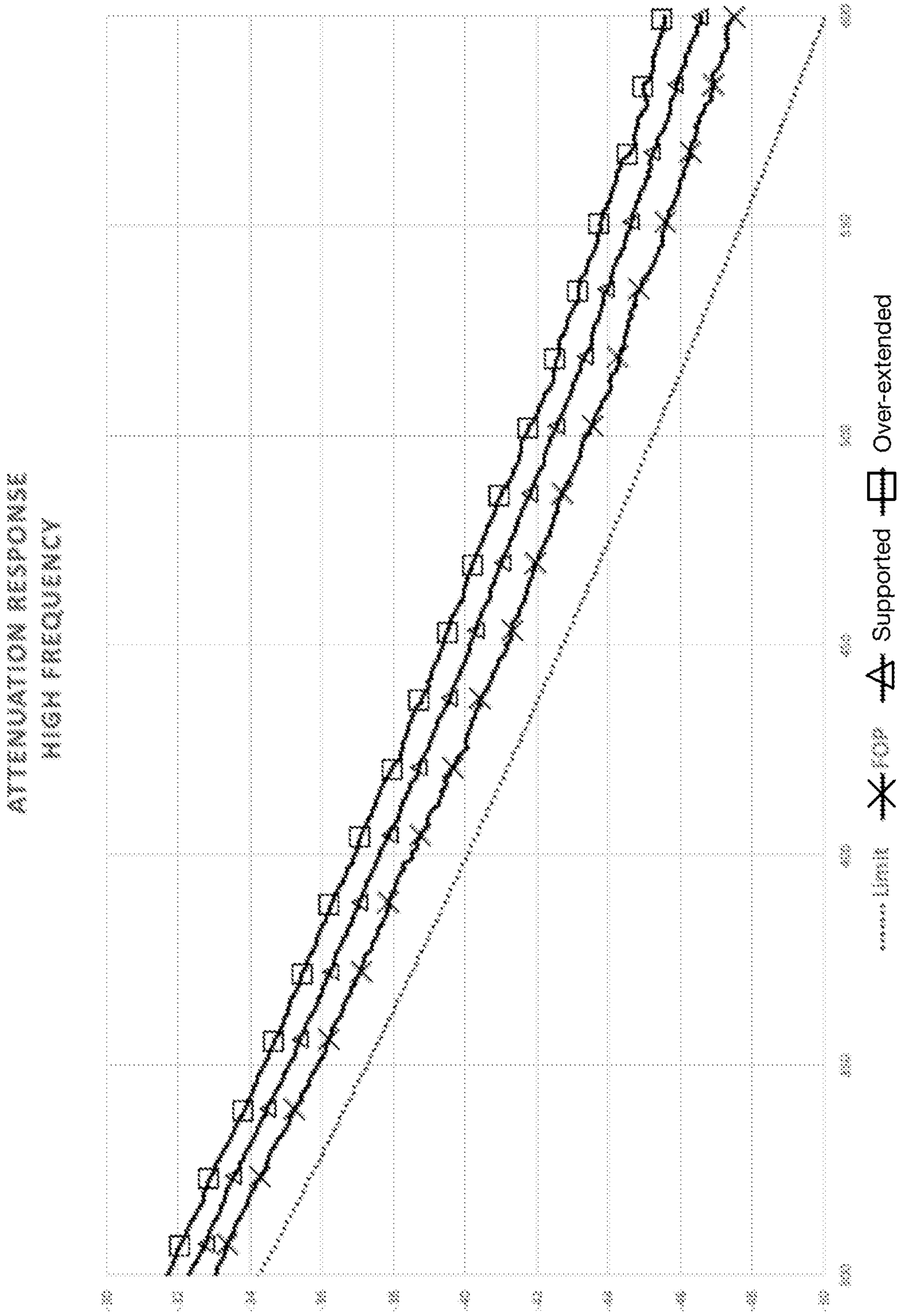
FIG. 3D is a graph illustrating a portion of the graphs of FIGS. 3A-3C for a given frequency range.

To further highlight the attenuation distinctions between the embodiments, FIG. 3D is a graph illustrating a portion of the graphs of FIGS. 3A-3C within the range of 300 to 600 MHz, with the FOP cable measurements shown as a line with X's; the supported cable measurements shown as a line with triangles; and the over-extended cable measurements shown as a line with squares; and the attenuation limit shown in dotted line. As shown, the supported cable provides an intermediate compromise in attenuation between the FOP cable and the over-extended cable.

Figure 4A:
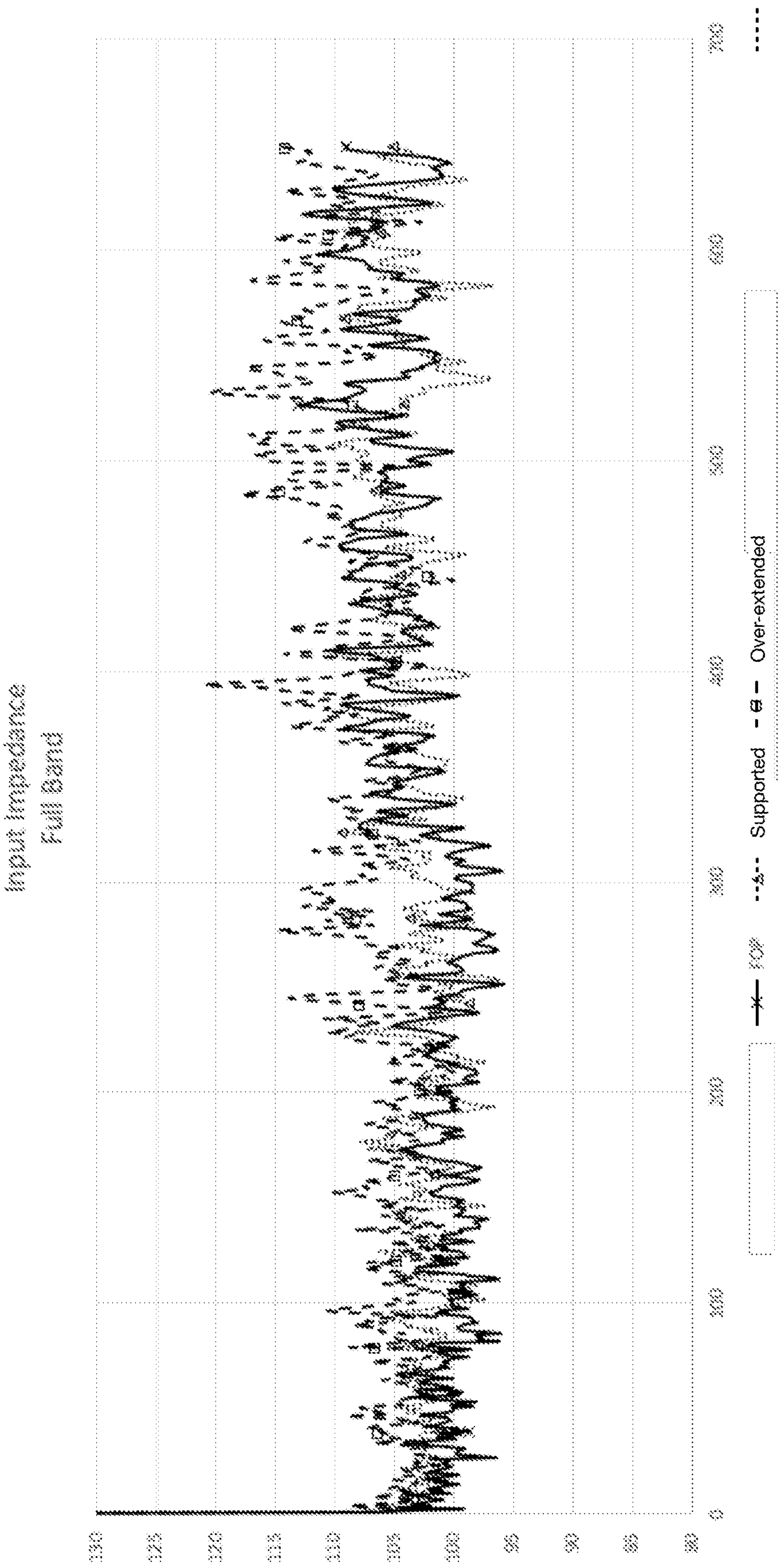
FIG. 4A is a graph of input impedance over frequency for different embodiments of balanced twisted pair cables.
Figure 4B:
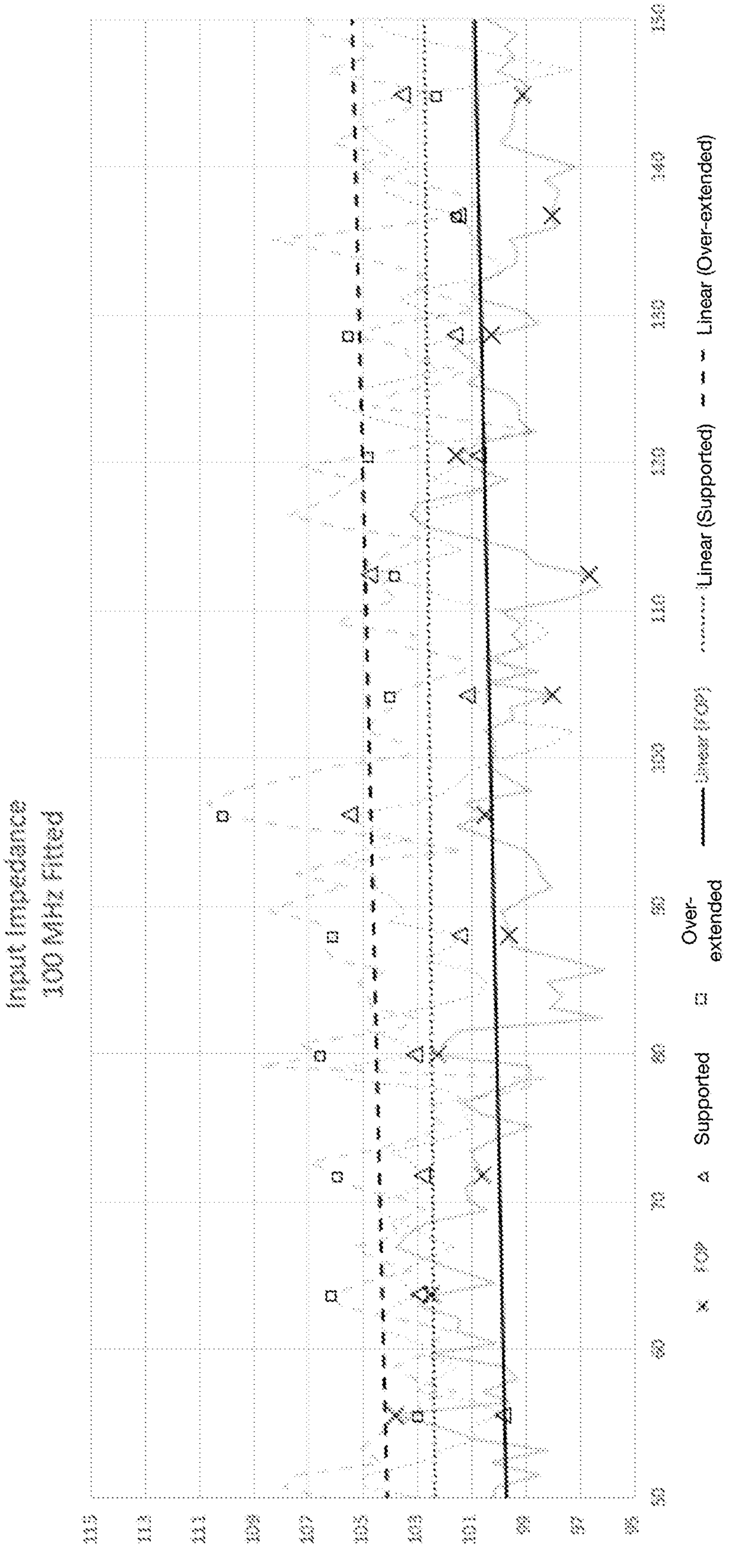
FIG. 4B is a graph illustrating a portion of the graph of FIG. 4A for a given frequency range.

FIG. 4A is a graph of input impedance over frequency for the FOP, supported, and over-extended embodiments of balanced twisted pair cables as discussed above (specific measured values at each frequency for the different embodiments are listed in the tables of FIGS. 4C-4L). While highly variable, on average, the input impedance was measured as slightly lower for FOP embodiments and slightly higher for over-extended embodiments, with supported embodiments being an intermediate compromise. This is particularly evident in the graph of FIG. 4B, which illustrates a 100 MHz band from 50 MHz to 150 MHz of the graph of FIG. 4A, along with linear trendlines (in solid line for FOP, dotted line for supported, and dashed line for over-extended embodiments). As shown, the supported embodiment has less reduction of input impedance than the FOP embodiment, while still reducing cable diameter and material cost.

Figure 5A:
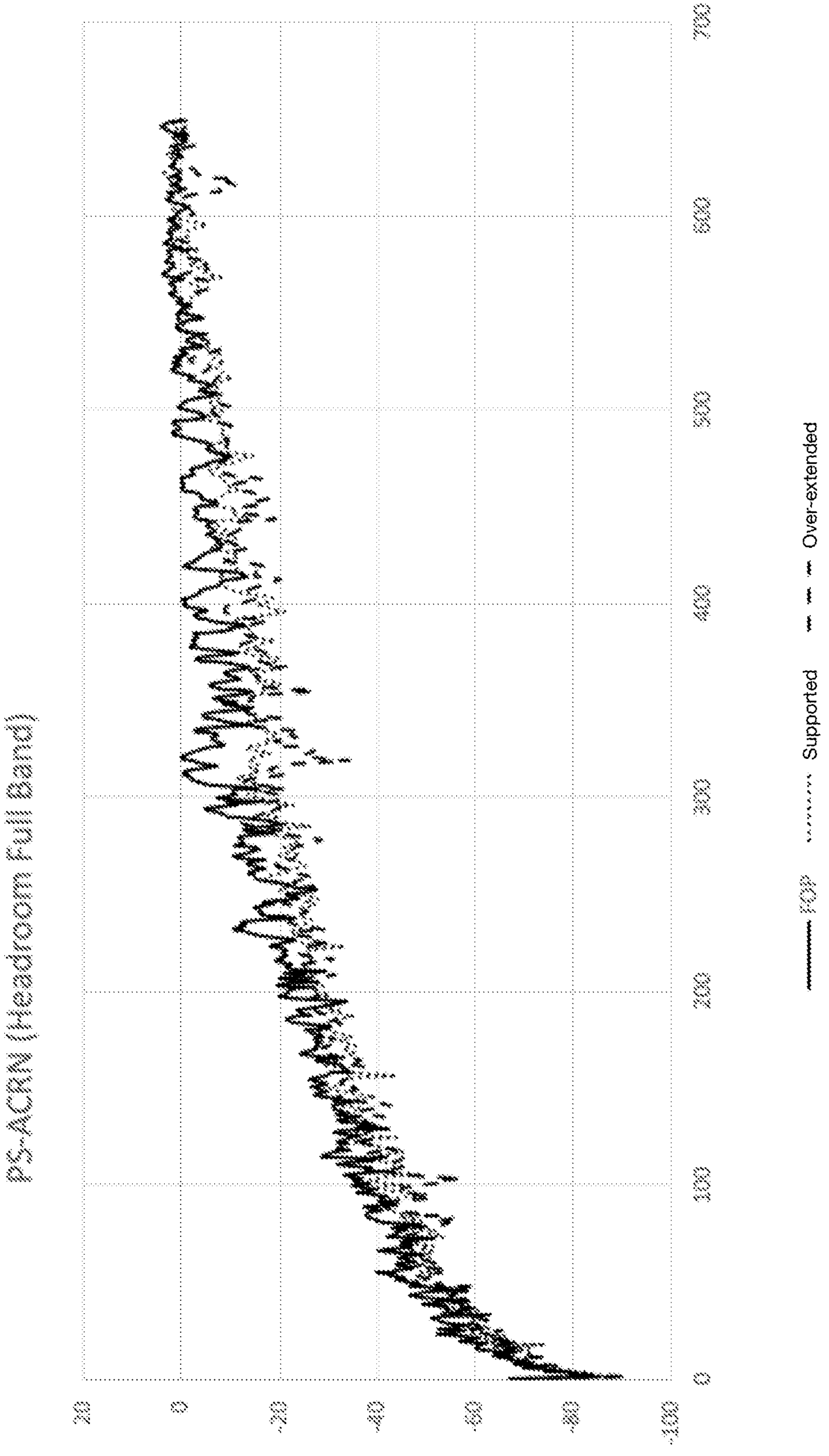
FIG. 5A is a graph of power sum attenuation to crosstalk ratio near-end (PS ACRN) over frequency for different embodiments of balanced twisted pair cables.
Figure 5B:
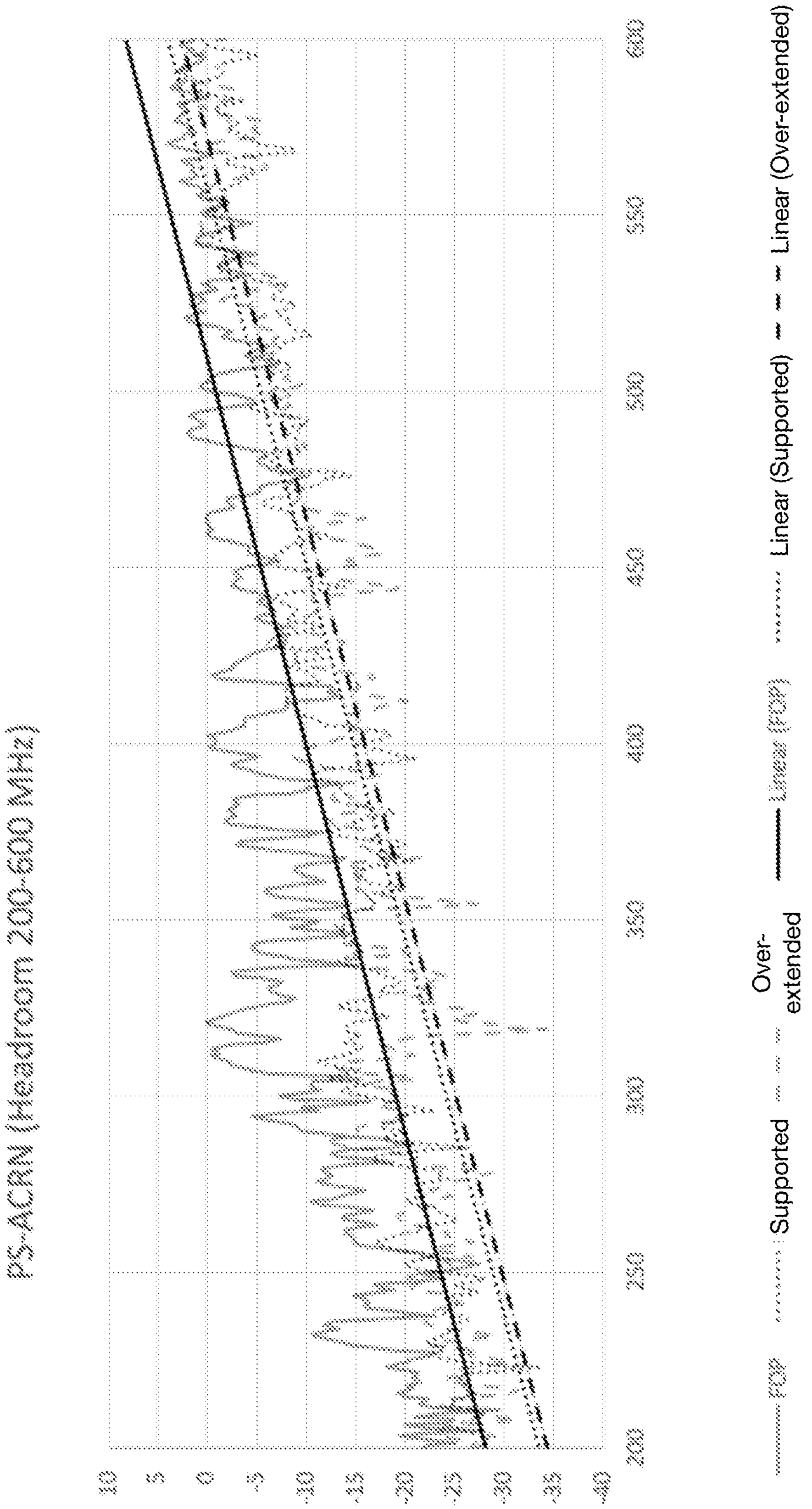
FIG. 5B is a graph illustrating a portion of the graph of FIG. 5A for a given frequency range.

FIG. 5A is a graph of power sum attenuation to crosstalk ratio near-end (PS ACRN) over frequency for different embodiments of balanced twisted pair cables (specific measured values at each frequency for the different embodiments are listed in the tables of FIG. 5C-5L). PS ACRN (sometimes written as PS ACR-N) describes the ratio between signal strength reduced by attenuation at the receiver end of a link, sometimes referred to as insertion loss, and near-end crosstalk, which is at its strongest at this point. The larger this ratio is, the higher quality the link is and the more data that can be reliably transmitted via the cable. Various standards including the Cat 6A Ethernet standard (TIA/EIA-568.2-D, incorporated by reference herein) have PS ACRN requirements for cables. As shown, the ratio is lower (smaller −dB values) for FOP embodiments and higher for supported and over-extended embodiments). To clarify this distinction, FIG. 5B is a graph illustrating a portion of the graph of FIG. 5A for the range from 200-600 MHz, along with linear trendlines (in solid line for FOP, dotted line for supported, and dashed line for over-extended embodiments). The performance for supported embodiments is very similar to over-extended embodiments, while utilizing less filler material, reducing manufacturing cost, weight, and cable diameter.

Accordingly, the present disclosure addresses problems of cable to cable or "alien" crosstalk and signal Return Loss by allowing for tightly wrapped shields or barrier tapes without significantly collapsing the cross-sectional geometry of the cable and maintaining a substantially cylindrical profile. Although discussed primarily in terms of Cat 6A balanced twisted pair cable, shield-supporting fillers may be used with other types of cable including any unshielded twisted pair, shielded twisted pair, or any other such types of cable incorporating any type of dielectric, semi-conductive, or conductive tape. Similarly, although primarily discussed with helically wound shields, in some implementations, cables may be constructed with longitudinal shields, either solely or bound using binders. Shields may include drain wires, either internal or external to the shield in various implementations. In some implementations, shields and/or jackets of any configuration (e.g. helical or longitudinal) may be applied tightly to lock conductors in place against a filler.

The above description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

As shown in FIG. 2A, a first insulator 106 of the conductor pair 102*b* can include a first portion of an outer surface that contacts a first arm of the filler 202*a*. Additionally, a second portion of the outer surface of the first insulator 106 of the conductor pair 102*b* can contact a second arm of the filler 202*a*. A second insulator 106 of the conductor pair 102*b* can include an outer surface that contacts at least a portion of the conductive barrier tape 110. A first insulator 106 of the conductor pair 102*a* can include an outer surface that contacts the first arm of the filler 202*a*. A first insulator 106 of the conductor pair 102*d* can include an outer surface that contacts the second arm of the filler 202*a*.

What is claimed:

1. A data cable for improving electrical performance with a reduced cross-sectional diameter, comprising:

a filler comprising a plurality of arms radiating from a central portion of the filler to define a plurality of channels;

a plurality of twisted pairs of insulated conductors, a first twisted pair of insulated conductors of the plurality of twisted pairs of insulated conductors disposed in a first channel of the plurality of channels;

a conductive barrier tape surrounding the filler and the plurality of twisted pairs of insulated conductors; and a jacket surrounding the conductive barrier tape, the filler, and the plurality of twisted pairs of insulated conductors, wherein at least a portion of the jacket is asymmetrical;

wherein at least one arm of the filler has a length greater than a first distance from the central portion of the filler to a line tangent to an outermost portion of two adjacent twisted pairs of insulated conductors of the plurality of twisted pairs of insulated conductors;

wherein the at least one arm of the filler is in contact with and supporting the conductive barrier tape at a position farther from the central portion of the filler than the line tangent to the outermost portion of the two adjacent twisted pairs of insulated conductors of the plurality of twisted pairs of insulated conductors so as to increase electrical performance of the data cable; and wherein a first portion of an outer surface of a first insulator of the first twisted pair of insulated conductors of the plurality of twisted pairs of insulated conductors contacts a first arm of the plurality of arms, wherein a second portion of the outer surface of the first insulator of the first twisted pair of insulated conductors of the plurality of twisted pairs of insulated conductors contacts a second arm of the plurality of arms, wherein an outer surface of a second insulator of the first twisted pair of insulated conductors of the plurality of twisted pairs of insulated conductors contacts at least a portion of the conductive barrier tape, and wherein an outer surface of a first insulator of a second twisted pair of insulated conductors of the plurality of twisted pairs of insulated conductors contacts at least one of the first arm of the plurality of arms or the second arm of the plurality of arms.

2. The data cable of claim 1, wherein the at least one arm of the filler has a length less than a second distance from the central portion of the filler to an outermost portion of any insulated conductor of the plurality of twisted pairs of insulated conductors, such that the conductive barrier tape is supported by the at least one arm of the filler at a first position between the first distance and the second distance from the central portion of the filler.

3. The data cable of claim 2, wherein a portion of the jacket surrounding the conductive barrier tape adjacent to the at least one arm of the filler is supported by the conductive barrier tape and the at least one arm of the filler at a second position between the first distance and the second distance from the central portion of the filler, so as to reduce a cross-sectional diameter of the data cable.

4. The data cable of claim 1, wherein the first arm of the plurality of arms is the at least one arm of the filler having the length greater than the first distance from the central portion of the filler to the line tangent to the outermost portion of the two adjacent twisted pairs of insulated conductors, and wherein a second arm of the plurality of arms has a second length greater than a second distance from the central portion of the filler to a second line tangent to an outermost portion of a second two adjacent twisted pairs of insulated conductors of the plurality of twisted pairs of insulated conductors.

5. The data cable of claim 4, wherein the length of the first arm of the plurality of arms is different from the second length of the second arm of the plurality of arms.

6. The data cable of claim 1, wherein a number of the plurality of arms of the filler is less than a number of the plurality of twisted pairs of insulated conductors, such that at least two twisted pairs of insulated conductors are not physically separated by at least one arm of the plurality of arms of the filler, so as to reduce a cross-sectional diameter of the data cable at a position between the at least two twisted pairs of insulated conductors.

7. The data cable of claim 6, wherein a first twisted pair of the at least two twisted pairs of insulated conductors not physically separated by the at least one arm of the plurality of arms of the filler has a longest lay length of the plurality of twisted pairs of insulated conductors, and wherein a second twisted pair of the at least two twisted pairs of insulated conductors not physically separated by the at least one arm of the plurality of arms of the filler has a shortest lay length of the plurality of twisted pairs of insulated conductors.

8. The data cable of claim 6, wherein a first twisted pair of the at least two twisted pairs of insulated conductors not physically separated by the at least one arm of the plurality of arms of the filler has a longest lay length of the plurality of twisted pairs of insulated conductors, and wherein a second twisted pair of the at least two twisted pairs of insulated conductors not physically separated by the at least one arm of the plurality of arms of the filler has a second shortest lay length of the plurality of twisted pairs of insulated conductors.

9. The data cable of claim 1, wherein the first arm of the plurality of arms of the filler has a central portion having a first lateral width, and wherein a terminal portion of the first arm has a second lateral width different from the first lateral width.

10. The data cable of claim 1, wherein an average power summed attenuation to near-end crosstalk ratio (PS-ACRN) electrical characteristic value of the data cable over a frequency range from 200 to 600 MHz is at least 3 decibels greater than an average PS-ACRN electrical characteristic value of a second data cable lacking a filler having at least one arm with a length greater than a first distance from a central portion of the filler of the second data cable to a line tangent to an outermost portion of two adjacent twisted pairs of insulated conductors of the second data cable over the frequency range.

11. A cable, comprising:

a filler comprising a plurality of arms radiating from a central portion of the filler;

a plurality of twisted pairs of insulated conductors, wherein each arm of the plurality of arms of the filler provides a physical barrier between an adjacent pair of the plurality of twisted pairs of conductors;

a conductive barrier tape surrounding the filler and the plurality of twisted pairs of insulated conductors; and a jacket surrounding the conductive barrier tape, the filler, and the plurality of twisted pairs of insulated conductors, wherein at least a portion of the jacket is asymmetrical;

wherein at least one arm of the filler has a length greater than a first distance from the central portion of the filler to a line tangent to an outermost portion of two adjacent twisted pairs of insulated conductors of the plurality of twisted pairs of insulated conductors;

wherein the at least one arm of the filler is in contact with and supporting the conductive barrier tape at a position farther from the central portion of the filler than the line tangent to the outermost portion of the two adjacent twisted pairs of insulated conductors of the plurality of twisted pairs of insulated conductors;

wherein a first portion of an outer surface of a first insulator of a first twisted pair of insulated conductors of the plurality of twisted pairs of insulated conductors contacts a first arm of the plurality of arms, wherein a second portion of the outer surface of the first insulator of the first twisted pair of insulated conductors of the plurality of twisted pairs of insulated conductors contacts a second arm of the plurality of arms, wherein an outer surface of a second insulator of the first twisted pair of insulated conductors of the plurality of twisted pairs of insulated conductors contacts at least a portion of the conductive barrier tape, and wherein an outer surface of a first insulator of a second twisted pair of insulated conductors of the plurality of twisted pairs of insulated conductors contacts at least one of the first arm of the plurality of arms or the second arm of the plurality of arms.

12. The cable of claim 11, wherein the at least one arm of the filler has a length less than a second distance from the central portion of the filler to an outermost portion of any insulated conductor of the plurality of twisted pairs of insulated conductors, such that the conductive barrier tape is supported by the at least one arm of the filler at a first position between the first distance and the second distance from the central portion of the filler.

13. The cable of claim 11, wherein a length of the first arm of the plurality of arms is different from a length of the second arm of the plurality of arms.

14. The cable of claim 11, wherein a number of the plurality of arms of the filler is less than a number of the plurality of twisted pairs of insulated conductors.

15. The cable of claim 14, wherein a first twisted pair of at least two twisted pairs of insulated conductors that are not physically separated by at least one arm of the plurality of arms of the filler has a longest lay length of the plurality of twisted pairs of insulated conductors, and wherein a second twisted pair of the at least two twisted pairs of insulated conductors that are not physically separated by the at least one arm of the plurality of arms of the filler has either a shortest lay length or second shortest lay length of the plurality of twisted pairs of insulated conductors.

16. The cable of claim 11, wherein the first arm of the plurality of arms of the filler has a non-uniform cross-sectional profile.

17. The cable of claim 11, wherein an average power summed attenuation to near-end crosstalk ratio (PS-ACRN) electrical characteristic value of the cable over a frequency range from 200 to 600 MHz is at least 3 decibels greater than an average PS-ACRN electrical characteristic value of a second cable lacking a filler having at least one arm with a length greater than a first distance from a central portion of the filler of the second cable to a line tangent to an outermost portion of two adjacent twisted pairs of insulated conductors of the second cable over the frequency range.

18. A cable, comprising:

a filler comprising a plurality of arms radiating from a central portion of the filler;

a plurality of twisted pairs of insulated conductors, wherein the plurality of arms of the filler provide a physical barrier between an adjacent pair of the plurality of twisted pairs of insulated conductors;

a conductive barrier tape surrounding the filler and the plurality of twisted pairs of insulated conductors;

a jacket surrounding the conductive barrier tape, the filler, and the plurality of twisted pairs of insulated conductors;

wherein the cable has a maximum diameter through two twisted pairs of insulated conductors of the plurality of twisted pairs of insulated conductors in opposition across the filler, and an average diameter of the cable is less than the maximum diameter of the cable;

wherein a first arm of the plurality of arms has a length greater than a first distance from the central portion of the filler to a line tangent to an outermost portion of two adjacent twisted pairs of insulated conductors of the plurality of twisted pairs of insulated conductors; and wherein an outer surface of a first insulator of a first twisted pair of insulated conductors of the plurality of twisted pairs of insulated conductors contacts the first arm of the plurality of arms and an outer surface of a second insulator of the first twisted pair of insulated conductors of the plurality of twisted pairs of insulated conductors contacts at least a portion of the conductive barrier tape, and wherein an outer surface of a first insulator of a second twisted pair of insulated conductors of the plurality of twisted pairs of insulated conductors contacts the first arm of the plurality of arms.

19. The cable of claim 18, wherein the first arm of the filler is in contact with and supporting the conductive barrier tape at a position farther from the central portion of the filler than the line tangent to the outermost portion of the two adjacent twisted pairs of insulated conductors.

20. The cable of claim 18, wherein the first arm of the filler has a length less than a second distance from the central portion of the filler to an outermost portion of any insulated conductor of the plurality of twisted pairs of insulated conductors.

21. The cable of claim 20, wherein the conductive barrier tape is supported by the first arm of the filler at a first position between the first distance and the second distance from the central portion of the filler.

22. The cable of claim 18, wherein the length of the first arm of the plurality of arms is different from a length of a second arm of the plurality of arms.

23. The cable of claim 18, wherein the filler comprises a number of arms less than a number of the plurality of twisted pairs of insulated conductors.

24. The cable of claim 23, wherein a first twisted pair of at least two twisted pairs of insulated conductors that are not physically separated by at least one arm of the plurality of arms of the filler has a longest lay length of the plurality of twisted pairs of insulated conductors, and wherein a second twisted pair of the at least two twisted pairs of insulated conductors that are not physically separated by the at least one arm of the plurality of arms of the filler has either a shortest lay length or second shortest lay length of the plurality of twisted pairs of insulated conductors.

25. The cable of claim 18, wherein the first arm of the filler has a non-uniform cross-sectional profile.

26. The cable of claim 18, wherein an average power summed attenuation to near-end crosstalk ratio (PS-ACRN) electrical characteristic value of the cable over a frequency range from 200 to 600 MHz is at least 3 decibels greater than an average PS-ACRN electrical characteristic value of a second cable lacking a filler having at least one arm with a length greater than a first distance from a central portion of the filler of the second cable to a line tangent to an outermost portion of two adjacent twisted pairs of insulated conductors of the second cable over the frequency range.

27. A cable, comprising:

a plurality of twisted pairs of insulated conductors;

a filler comprising a plurality of arms radiating from a central portion of the filler;

a conductive barrier tape surrounding the filler and the plurality of twisted pairs of insulated conductors;

a jacket surrounding the conductive barrier tape, the filler, and the plurality of twisted pairs of insulated conductors;

wherein the cable has a maximum diameter through two twisted pairs of insulated conductors of the plurality of twisted pairs of insulated conductors in opposition across the filler, and an average diameter of the cable is less than the maximum diameter of the cable;

wherein a first arm of the plurality of arms extends from the central portion into a region bordered by a first twisted pair of insulated conductors of the plurality of twisted pairs of insulated conductors, a second twisted pair of insulated conductors of the plurality of twisted pairs of insulated conductors, and a portion of the conductive barrier tape;

wherein the first arm of the filler is in radial contact with the portion of the conductive barrier tape and supports the portion of the conductive barrier tape at a position beyond a line tangent to the first twisted pair of insulated conductors and the second twisted pair of insulated conductors;

wherein a length of the first arm of the plurality of arms is selected to adjust a volume of the region bordered by the first twisted pair of insulated conductors, the second twisted pair of insulated conductors, and the portion of the conductive barrier tape, so as to control non-linear effects on electrical performance of the cable caused by electro-magnetic interactions between the plurality of twisted pairs of insulated conductors, the conductive barrier tape, and an air dielectric within the region;

wherein an outer surface of a first insulator of the first twisted pair of insulated conductors of the plurality of twisted pairs of insulated conductors contacts the first arm of the plurality of arms and an outer surface of a second insulator of the first twisted pair of insulated conductors of the plurality of twisted pairs of insulated conductors contacts at least a portion of the conductive barrier tape, and wherein an outer surface of a first insulator of the second twisted pair of insulated conductors of the plurality of twisted pairs of insulated conductors contacts the first arm of the plurality of arms.

28. The cable of claim 27, wherein the first arm of the filler supports the portion of the conductive barrier tape at a position closer to a center of the cable than a maximum radius of the cable.

29. The cable of claim 27, wherein the first arm of the filler provides a physical barrier between the first twisted pair of insulated conductors and the second twisted pair of insulated conductors.

30. The cable of claim 27, wherein the length of the first arm of the plurality of arms is greater than a first distance from the central portion of the filler to the line tangent to the first twisted pair of insulated conductors of the plurality of twisted pairs of insulated conductors and the second twisted pair of insulated conductors of the plurality of twisted pairs of insulated conductors.

31. The cable of claim 27, wherein the volume of the region is adjusted such that an average power summed attenuation to near-end crosstalk ratio (PS-ACRN) electrical characteristic value of the cable over a frequency range from 200 to 600 MHz is at least 3 decibels greater than an average PS-ACRN electrical characteristic value of a second cable lacking a filler having at least one arm that supports the portion of a conductive barrier tape of the second cable at a position beyond a line tangent to an adjacent twisted pair of insulated conductors of the second cable.

* * * * *